US012108470B2

(12) United States Patent
Talebi Fard et al.

(10) Patent No.: US 12,108,470 B2
(45) Date of Patent: Oct. 1, 2024

(54) APPLICATION TRIGGERING FOR A WIRELESS DEVICE

(71) Applicant: Ofinno, LLC, Reston, VA (US)

(72) Inventors: Peyman Talebi Fard, Sterling, VA (US); Esmael Hejazi Dinan, McLean, VA (US); Jayshree Bharatia, Plano, TX (US); Jinsook Ryu, Oakton, VA (US); Weihua Qiao, Herndon, VA (US); Kyungmin Park, Vienna, VA (US)

(73) Assignee: Ofinno, LLC, Reston, VA (US)

( * ) Notice: Subject to any disclaimer, the term of this patent is extended or adjusted under 35 U.S.C. 154(b) by 409 days.

(21) Appl. No.: 17/322,090

(22) Filed: May 17, 2021

(65) Prior Publication Data

US 2021/0274575 A1 Sep. 2, 2021

Related U.S. Application Data

(63) Continuation of application No. PCT/US2019/061941, filed on Nov. 18, 2019.

(60) Provisional application No. 62/768,455, filed on Nov. 16, 2018.

(51) Int. Cl.
*H04W 76/12* (2018.01)

(52) U.S. Cl.
CPC .................................. *H04W 76/12* (2018.02)

(58) Field of Classification Search
CPC ...... H04W 76/11; H04W 76/12; H04W 76/27
See application file for complete search history.

(56) References Cited

U.S. PATENT DOCUMENTS

| 11,019,668 B2* | 5/2021 | Talebi Fard ............ H04W 8/02 |
| 2012/0252518 A1 | 10/2012 | Karampatsis et al. |
| 2012/0302229 A1 | 11/2012 | Rönneke |
| 2013/0051338 A1 | 2/2013 | Ryu et al. |

(Continued)

FOREIGN PATENT DOCUMENTS

WO 2018127190 A1 7/2018

OTHER PUBLICATIONS

3GPP TS 23.501 V15.3.0 (Sep. 2018); 3rd Generation Partnership Project; Technical Specification Group Services and System Aspects; System Architecture for the 5G System; Stage 2 (Release 15).

(Continued)

*Primary Examiner* — Liton Miah
(74) *Attorney, Agent, or Firm* — Willis H. Chang; Kavon Nasabzadeh; Jacob L. Mangan

(57) ABSTRACT

A session management function (SMF) receives a request message from a network exposure function (NEF). The request message is for a delivery of a trigger to a wireless device. The request message includes a trigger payload and a trigger indication. The trigger payload includes information for an application on the wireless device. The trigger indication identifies that the request message carries the trigger payload. The SMF sends, via an access and mobility management function (AMF), a non-access stratum (NAS) message to the wireless device. The NAS message includes the trigger indication and the trigger payload. The SMF receives, from the wireless device via the AMF and based on the trigger payload, a request to establish a packet data unit session for the application.

18 Claims, 31 Drawing Sheets

(56) References Cited

U.S. PATENT DOCUMENTS

| | | | |
|---|---|---|---|
| 2013/0308564 A1 | 11/2013 | Jain et al. | |
| 2014/0219182 A1 | 8/2014 | Chandramouli et al. | |
| 2015/0271623 A1 | 9/2015 | Kim et al. | |
| 2018/0270896 A1 | 9/2018 | Faccin et al. | |
| 2019/0116517 A1* | 4/2019 | Liu | H04W 8/24 |
| 2019/0159227 A1* | 5/2019 | Talebi Fard | H04W 76/00 |
| 2019/0306251 A1* | 10/2019 | Talebi Fard | H04W 76/10 |
| 2020/0100147 A1* | 3/2020 | Youn | H04W 36/0064 |
| 2020/0120589 A1* | 4/2020 | Velev | H04W 48/18 |
| 2020/0322857 A1* | 10/2020 | Park | H04W 76/22 |
| 2021/0211960 A1* | 7/2021 | Ryu | H04W 36/14 |

OTHER PUBLICATIONS

3GPP TS 23.502 V1.2.0 (Sep. 2017); 3rd Generation Partnership Project; Technical Specification Group Services and System Aspects; Procedures for the 5G System; Stage 2 (Release 15).

3GPP TS 23.502 V15.3.0 (Sep. 2018); 3rd Generation Partnership Project; Technical Specification Group Services and System Aspects; Procedures for the 5G System; Stage 2 (Release 15).

3GPP TR 23.724 V1.1.0 (Oct. 2018); 3rd Generation Partnership Project; Technical Specification Group Services and System Aspects; Study on Cellular IoT support and evolution for the 5G System (Release 16).

3GPP TS 23.040 V14.0.0 (Mar. 2017); 3rd Generation Partnership Project; Technical Specification Group Core Network and Terminals; Technical realization of the Short Message Service (SMS) (Release 14).

3GPP TS 23.501 V15.2.0 (Jun. 2018); 3rd Generation Partnership Project; Technical Specification Group Services and System Aspects; System Architecture for the 5G System; Stage 2 (Release 15).

3GPP TS 23.502 V15.2.0 (Jun. 2018); 3rd Generation Partnership Project; Technical Specification Group Services and System Aspects; Procedures for the 5G System; Stage 2 (Release 15).

3GPP TS 23.682 V16.0.0 (Sep. 2018); 3rd Generation Partnership Project; Technical Specification Group Services and System Aspects; Architecture enhancements to facilitate communications with packet data networks and applications (Release 16).

S2-160962; SA WG2 Meeting #113AH; Feb. 23-26, 2016, Sophia Antipolis, France; Based on S2-160832.

S2-160969; SA WG2 Meeting #113AH; Feb. 23-26, 2016, Sophia Antipolis, France.

S2-162135; TSG SA WG2 Meeting #114; Sophia Antipolis, France, Apr. 11-15, 2016; resubmission of S2-161653.

S2-163166; TSG SA WG2 Meeting #115; Nanjing, P.R. China, May 23-27, 2016; revision of S2-163051.

S2-163723; 3GPP TSG-SA2 Meeting #116; Vienna, Austria, Jul. 11-15, 2016.

S2-177384; 3GPP TSG SA WG2 Meeting #123; Oct. 23-27, 2017, Ljubljana, Slovenia; was S2-175780 was S2-174436; Source: Huawei, HiSilicon; Title: TS 23.502: AF influenced PDU session establishment and DN; authentication/authorization via NEF; Document for: Approval; Agenda Item: 6.5.3; Work Item / Release: 5GS_Ph1/Rel-15.

S2-186903; SA WG2 Meeting #128; Jul. 2-6, 2018, Vilnius, LT.

S2-187188; SA WG2 Meeting #128; Jul. 2-6, 2018, Vilnius, Lithuania; Source: Samsung; Title: Solution update: NIDD service activation for AMF and SMF; Document for: Approval; Agenda Item: 6.9; Work Item / Release: FS_CIoT_5G / Rel-16.

S2-188387; SA WG2 Meeting #128bis; Aug. 20-24, 2018, Sophia Antipolis, France; Source: Huawei, HiSilicon, Telecom Italia, China Mobile, CATT; Title: Solution for Group Communication for IoT-V2X SIDs Document for. Approval; Agenda Item: 6.9/6.6; Work Item / Release: FS_CIoT_5G / Rel-16 FS_eV2XArch / Rel-16.

S2-1810560; SA WG2 Meeting #129; Oct. 15-19, 2018, Dongguan, P. R. China; Source: CATT;Title: Evaluation of Solution 2; Document for: Approval; Agenda Item: 6.9; Work Item / Release: FS_CIoT_5G / Rel-16.

S2-1810639; SA WG2 Meeting #129; Oct. 15-19, 2018, Dongguan, China; Source: Huawei, HiSilicon, Telecom Italia; Title: KI#14: Update of Solution #B2; Document for: pCR; Agenda Item: 6.6/6.9; Work Item / Release: FS_eV2XARC/FS_CIoT_5G.

S2-1811095; SA WG2 Meeting #129; Oct. 15-19, 2018, Dongguan, China; Source: Sony; Title: EDT and RAI support in solution 6; Document for: Discussion; Agenda Item: 6.9; Work Item / Release: 5GS_Ph/ Rel-15.

S2-1811456; SA WG2 Meeting #129; Oct. 15-19, 2018, Dongguan, China; Source: Sony; Title: EDT and RAI support in solution 6; Document for: Discussion; Agenda Item: 6.9; Work Item / Release: 5GS_Ph/ Rel-15.

International Search Report and Written Opinion for PCT/US2019!061941 mailed on Feb. 28, 2020.

* cited by examiner

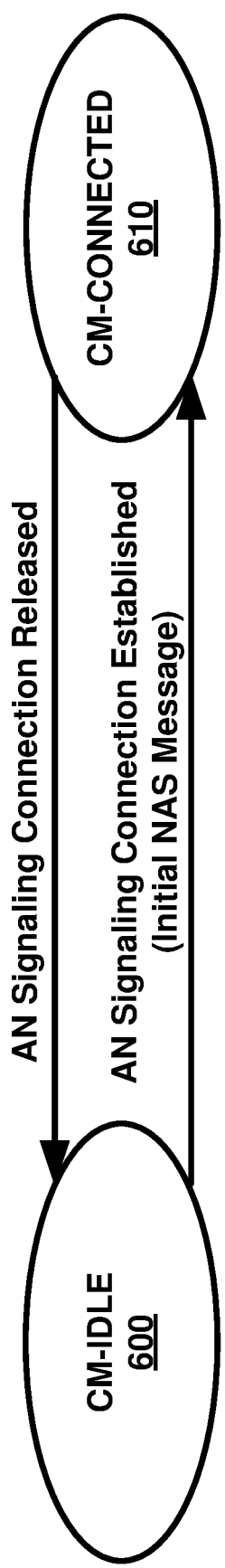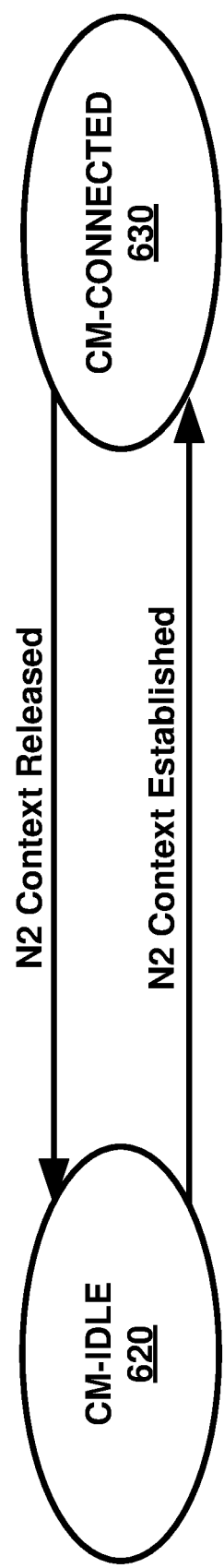
FIG. 6A — CM State Transition in UE
FIG. 6B — CM State Transition in AMF Receive, by a SMF from a NEF, a request message for a delivery of a trigger to a wireless device, where the request message comprises:
a trigger payload comprising information for an application on the wireless device; and
a trigger indication identifying that the request message carries the trigger payload.
2910

Send, by the SMF to the wireless device, a NAS message comprising: the trigger indication, and the trigger payload
2920

FIG. 29

Receive, by an NEF from an AF, a 1st request message for delivery of a trigger payload comprising information for an application on a wireless device to establish a PDU session
3010

Send, from an NEF to a SMF, a 2nd request message for delivery of the trigger payload to the wireless device, where the 2nd request message comprises:
a trigger indication identifying the 2nd request message carries the trigger payload, and
the trigger payload
3020

FIG. 30

APPLICATION TRIGGERING FOR A WIRELESS DEVICE

CROSS-REFERENCE TO RELATED APPLICATIONS

This application is a continuation of International Application No. PCT/US2019/061941, filed Nov. 18, 2019, which claims the benefit of U.S. Provisional Application No. 62/768,455, filed Nov. 16, 2018, each of which are hereby incorporated by reference in their entireties.

BRIEF DESCRIPTION OF THE DRAWINGS

Examples of several of the various embodiments of the present invention are described herein with reference to the drawings.

FIG. 6A and FIG. 6B depict two connection management state models in UE 100 and AMF 155 as per an aspect of embodiments of the present disclosure.

FIG. 29 is a flow diagram of an aspect of an example embodiment of the present disclosure.

FIG. 30 is a flow diagram of an aspect of an example embodiment of the present disclosure.

DETAILED DESCRIPTION

Example embodiments of the present invention enable implementation of enhanced features and functionalities in 5G systems. Embodiments of the technology disclosed herein may be employed in the technical field of 5G systems and network slicing for communication systems. More particularly, the embodiments of the technology disclosed herein may relate to 5G core network and 5G systems for network slicing in communication systems. Throughout the present disclosure, UE, wireless device, and mobile device are used interchangeably.

Figure 1:
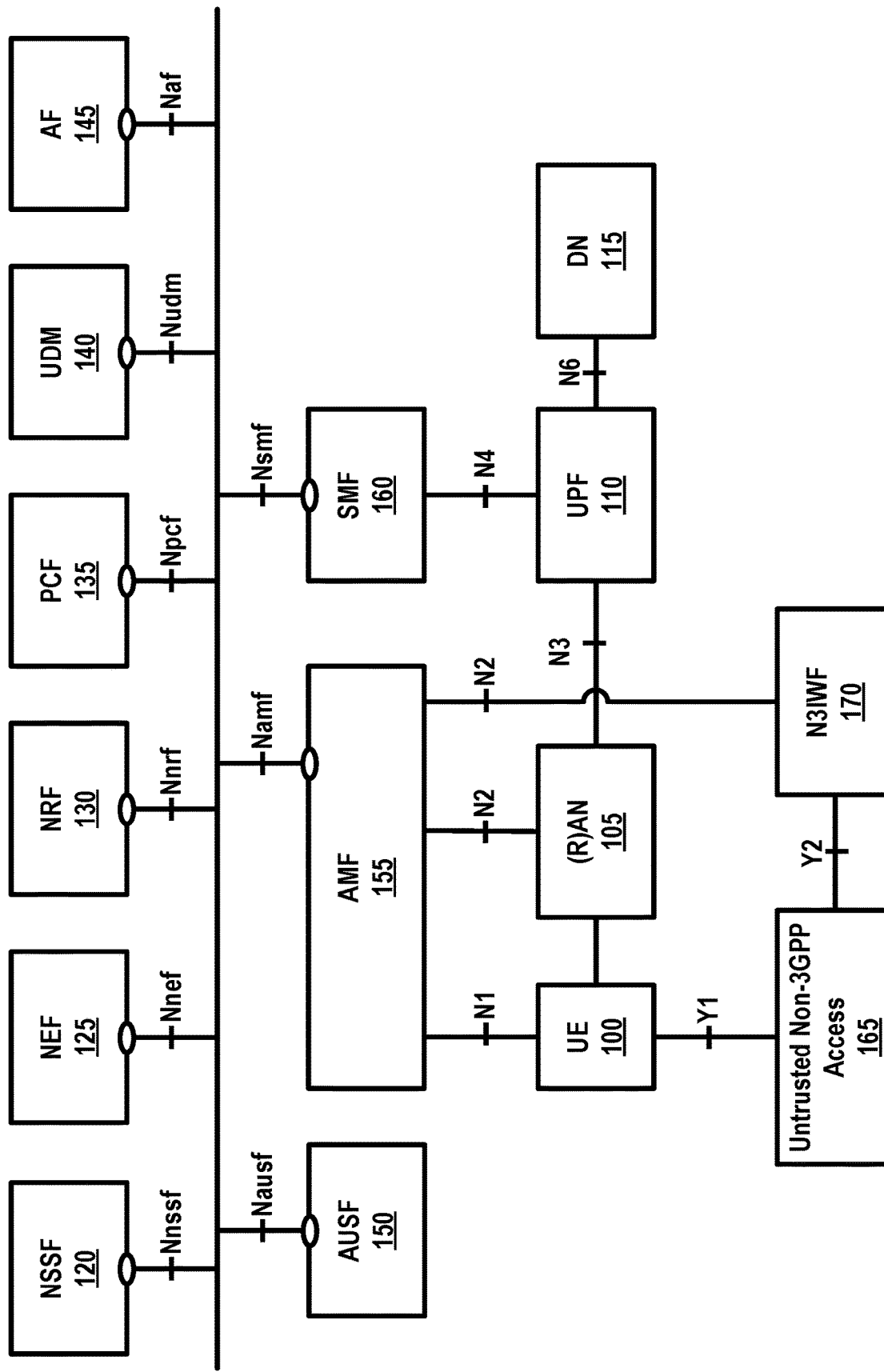
FIG. 1 is a diagram of an example 5G system architecture as per an aspect of an embodiment of the present disclosure.
Figure 2:
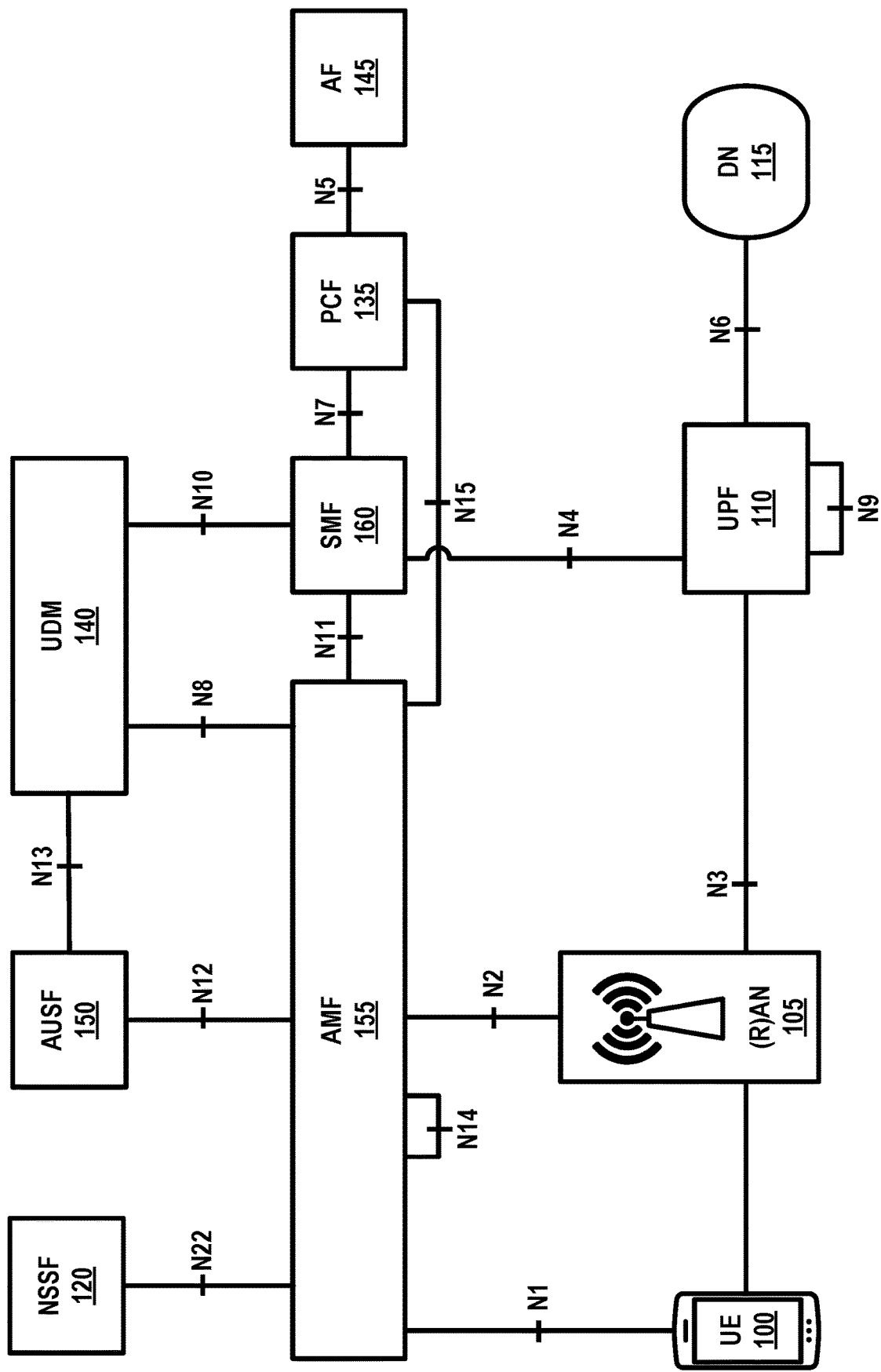
FIG. 2 is a diagram of an example 5G System architecture as per an aspect of an embodiment of the present disclosure.

The following acronyms are used throughout the present disclosure:

5G 5th generation mobile networks
5GC 5G Core Network
5GS 5G System
5G-AN 5G Access Network
5QI 5G QoS Indicator
AF Application Function
AMF Access and Mobility Management Function
AN Access Network
CDR Charging Data Record
CCNF Common Control Network Functions
CIoT Cellular IoT
CN Core Network
CP Control Plane
DDN Downlink Data Notification
DL Downlink
DN Data Network
DNN Data Network Name
F-TEID Fully Qualified TEID
GPSI Generic Public Subscription Identifier
GTP GPRS Tunneling Protocol
GUTI Globally Unique Temporary Identifier
IMSI International Mobile Subscriber Identity
LADN Local Area Data Network
LI Lawful Intercept
MEI Mobile Equipment Identifier
MICO Mobile Initiated Connection Only
MME Mobility Management Entity
MO Mobile Originated
MSISDN Mobile Subscriber ISDN
MT Mobile Terminating
N3IWF Non-3GPP InterWorking Function
NAI Network Access Identifier
NAS Non- Access Stratum
NB-IoT Narrow Band IoT
NEF Network Exposure Function
NF Network Function NGAP Next Generation Application Protocol
NR New Radio
NRF Network Repository Function
NSI Network Slice Instance
NSSAI Network Slice Selection Assistance Information
NSSF Network Slice Selection Function
OCS Online Charging System
OFCS Offline Charging System
PCF Policy Control Function
PDU Packet/Protocol Data Unit
PEI Permanent Equipment Identifier
PLMN Public Land Mobile Network
RAN Radio Access Network
QFI QoS Flow Identity
RM Registration Management
S1-AP S1 Application Protocol
SBA Service Based Architecture
SEA Security Anchor Function
SCM Security Context Management
SMF Session Management Function
SMSF SMS Function
S-NSSAI Single Network Slice Selection Assistance information
SUCI Served User Correlation ID
SUPI Subscriber Permanent Identifier
TEID Tunnel Endpoint Identifier
UE User Equipment
UL Uplink
UL CL Uplink Classifier
UPF User Plane Function Example FIG. 1 and FIG. 2 depict a 5G system comprising of access networks and 5G core network. An example 5G access network may comprise an access network connecting to a 5G core network. An access network may comprise an NG-RAN 105 and/or non-3GPP AN 165. An example 5G core network may connect to one or more 5G access networks 5G-AN and/or NG-RANs. 5G core network may comprise functional elements or network functions as in example FIG. 1 and example FIG. 2 where interfaces may be employed for communication among the functional elements and/or network elements.

Figure 3:
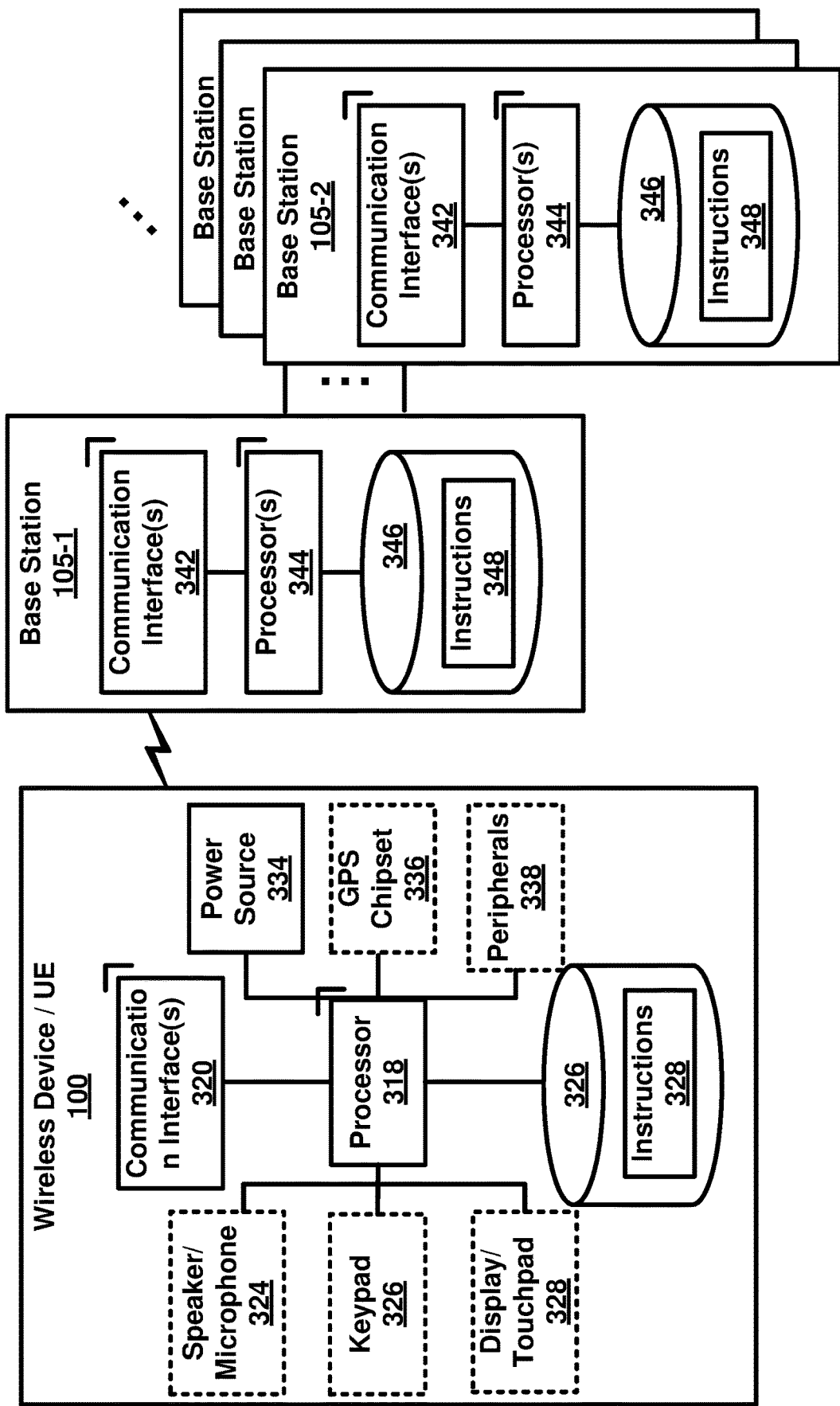
FIG. 3 is a system diagram of an example wireless device and a network node in a 5G system as per an aspect of an embodiment of the present disclosure.
Figure 4:
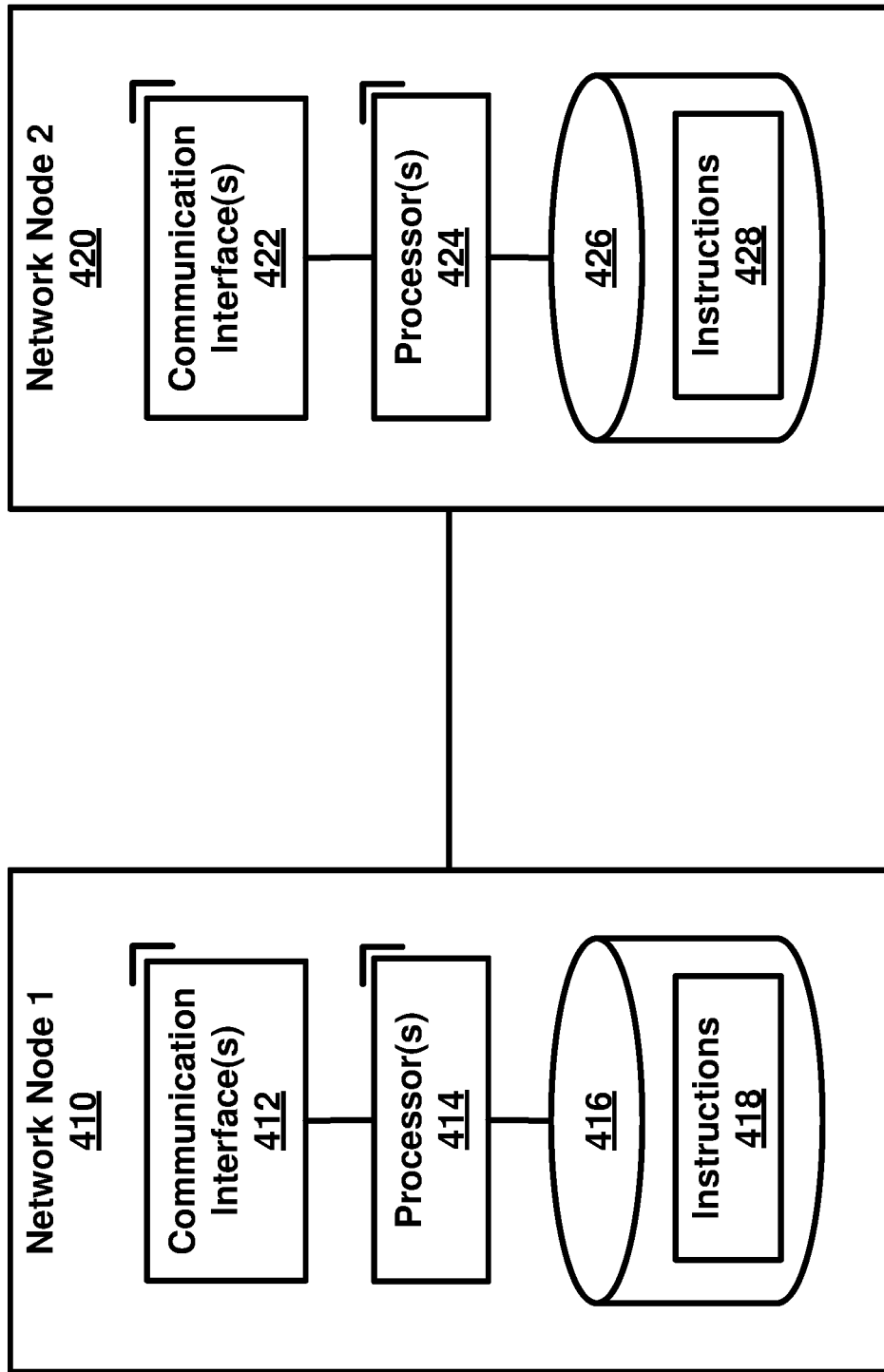
FIG. 4 is a system diagram of an example network node as per an aspect of an embodiment of the present disclosure.

In an example, a network function may be a processing function in a network, which may have a functional behavior and/or interfaces. A network function may be implemented either as a network element on a dedicated hardware, and/or a network node as depicted in FIG. 3 and FIG. 4, or as a software instance running on a dedicated hardware and/or shared hardware, or as a virtualized function instantiated on an appropriate platform.

In an example, access and mobility management function, AMF 155, may include the following functionalities (some of the AMF 155 functionalities may be supported in a single instance of an AMF 155): termination of RAN 105 CP interface (N2), termination of NAS (N1), NAS ciphering and integrity protection, registration management, connection management, reachability management, mobility management, lawful intercept (for AMF 155 events and interface to LI system), provide transport for session management, SM messages between UE 100 and SMF 160, transparent proxy for routing SM messages, access authentication, access authorization, provide transport for SMS messages between UE 100 and SMSF, security anchor function, SEA, interaction with the AUSF 150 and the UE 100, receiving the intermediate key established as a result of the UE 100 authentication process, security context management, SCM, that receives a key from the SEA that it uses to derive access network specific keys, and/or the like.

In an example, the AMF 155 may support non-3GPP access networks through N2 interface with N3IWF 170, NAS signaling with a UE 100 over N3IWF 170, authentication of UEs connected over N3IWF 170, management of mobility, authentication, and separate security context state(s) of a UE 100 connected via non-3GPP access 165 or connected via 3GPP access 105 and non-3GPP access 165 simultaneously, support of a coordinated RM context valid over 3GPP access 105 and non 3GPP access 165, support of CM management contexts for the UE 100 for connectivity over non-3GPP access, and/or the like.

In an example, an AMF 155 region may comprise one or multiple AMF 155 sets. The AMF 155 set may comprise some AMF 155 that serve a given area and/or network slice(s). In an example, multiple AMF 155 sets may be per AMF 155 region and/or network slice(s). Application identifier may be an identifier that may be mapped to a specific application traffic detection rule. Configured NSSAI may be an NSSAI that may be provisioned in a UE 100. DN 115 access identifier (DNAI), for a DNN, may be an identifier of a user plane access to a DN 115. Initial registration may be related to a UE 100 registration in RM-DEREGISTERED 500, 520 states. N2AP UE 100 association may be a logical per UE 100 association between a 5G AN node and an AMF 155. N2AP UE-TNLA-binding may be a binding between a N2AP UE 100 association and a specific transport network layer, TNL association for a given UE 100.

In an example, session management function, SMF 160, may include one or more of the following functionalities (one or more of the SMF 160 functionalities may be supported in a single instance of a SMF 160): session management (e.g. session establishment, modify and release, including tunnel maintain between UPF 110 and AN 105 node), UE 100 IP address allocation & management (including optional authorization), selection and control of UP function(s), configuration of traffic steering at UPF 110 to route traffic to proper destination, termination of interfaces towards policy control functions, control part of policy enforcement and QoS. lawful intercept (for SM events and interface to LI System), termination of SM parts of NAS messages, downlink data notification, initiation of AN specific SM information, sent via AMF 155 over N2 to (R)AN 105, determination of SSC mode of a session, roaming functionality, handling local enforcement to apply QoS SLAs (VPLMN), charging data collection and charging interface (VPLMN), lawful intercept (in VPLMN for SM events and interface to LI System), support for interaction with external DN 115 for transport of signaling for PDU session authorization/authentication by external DN 115, and/or the like.

In an example, a user plane function, UPF 110, may include one or more of the following functionalities (some of the UPF 110 functionalities may be supported in a single instance of a UPF 110): anchor point for Intra-/Inter-RAT mobility (when applicable), external PDU session point of interconnect to DN 115, packet routing & forwarding, packet inspection and user plane part of policy rule enforcement, lawful intercept (UP collection), traffic usage reporting, uplink classifier to support routing traffic flows to a data network, branching point to support multi-homed PDU session(s), QoS handling for user plane, uplink traffic verification (SDF to QoS flow mapping), transport level packet marking in the uplink and downlink, downlink packet buffering, downlink data notification triggering, and/or the like.

In an example, the UE 100 IP address management may include allocation and release of the UE 100 IP address and/or renewal of the allocated IP address. The UE 100 may set a requested PDU type during a PDU session establishment procedure based on its IP stack capabilities and/or configuration. In an example, the SMF 160 may select PDU type of a PDU session. In an example, if the SMF 160 receives a request with PDU type set to IP, the SMF 160 may select PDU type IPv4 or IPv6 based on DNN configuration and/or operator policies. In an example, the SMF 160 may provide a cause value to the UE 100 to indicate whether the other IP version is supported on the DNN. In an example, if the SMF 160 receives a request for PDU type IPv4 or IPv6 and the requested IP version is supported by the DNN the SMF 160 may select the requested PDU type.

In an example embodiment, the 5GC elements and UE 100 may support the following mechanisms: during a PDU session establishment procedure, the SMF 160 may send the IP address to the UE 100 via SM NAS signaling. The IPv4 address allocation and/or IPv4 parameter configuration via DHCPv4 may be employed once PDU session may be established. IPv6 prefix allocation may be supported via IPv6 stateless autoconfiguration, if IPv6 is supported. In an example, 5GC network elements may support IPv6 parameter configuration via stateless DHCPv6.

The 5GC may support the allocation of a static IPv4 address and/or a static IPv6 prefix based on subscription information in a UDM 140 and/or based on the configuration on a per-subscriber, per-DNN basis.

User plane function(s) (UPF 110) may handle the user plane path of PDU sessions. A UPF 110 that provides the interface to a data network may support functionality of a PDU session anchor.

In an example, a policy control function, PCF 135, may support unified policy framework to govern network behavior, provide policy rules to control plane function(s) to enforce policy rules, implement a front end to access subscription information relevant for policy decisions in a user data repository (UDR), and/or the like.

A network exposure function, NEF 125, may provide means to securely expose the services and capabilities provided by the 3GPP network functions, translate between information exchanged with the AF 145 and information exchanged with the internal network functions, receive information from other network functions, and/or the like.

In an example, an network repository function, NRF 130 may support service discovery function that may receive NF discovery request from NF instance, provide information about the discovered NF instances (be discovered) to the NF instance, and maintain information about available NF instances and their supported services, and/or the like.

In an example, an NSSF 120 may select a set of network slice instances serving the UE 100, may determine allowed NSSAI. In an example, the NSSF 120 may determine the AMF 155 set to be employed to serve the UE 100, and/or, based on configuration, determine a list of candidate AMF 155(*s*) 155 by querying the NRF 130.

In an example, stored data in a UDR may include at least user subscription data, including at least subscription identifiers, security credentials, access and mobility related subscription data, session related subscription data, policy data, and/or the like.

In an example, an AUSF 150 may support authentication server function (AUSF 150).

In an example, an application function, AF 145, may interact with the 3GPP core network to provide services. In an example, based on operator deployment, application functions may be trusted by the operator to interact directly with relevant network functions. Application functions not allowed by the operator to access directly the network functions may use an external exposure framework (e.g., via the NEF 125) to interact with relevant network functions.

In an example, control plane interface between the (R)AN 105 and the 5G core may support connection of multiple different kinds of AN(s) (e.g. 3GPP RAN 105, N3IWF 170 for Un-trusted access 165) to the 5GC via a control plane protocol. In an example, an N2 AP protocol may be employed for both the 3GPP access 105 and non-3GPP access 165. In an example, control plane interface between the (R)AN 105 and the 5G core may support decoupling between AMF 155 and other functions such as SMF 160 that may need to control the services supported by AN(s) (e.g. control of the UP resources in the AN 105 for a PDU session).

In an example, the 5GC may provide policy information from the PCF 135 to the UE 100. In an example, the policy information may comprise: access network discovery and selection policy, UE 100 route selection policy (URSP), SSC mode selection policy (SSCMSP), network slice selection policy (NSSP), DNN selection policy, non-seamless offload policy, and/or the like.

Figure 5A:
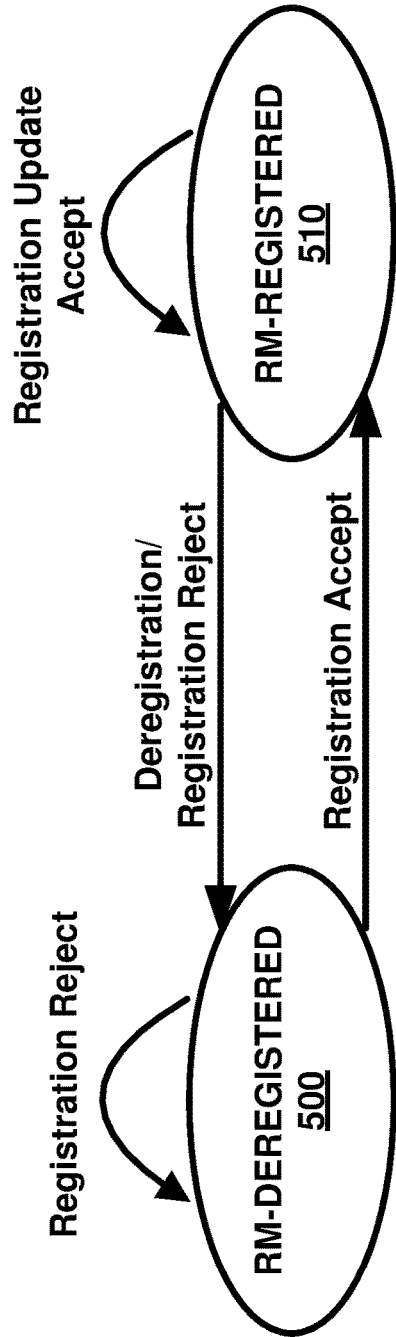
FIG. 5A and FIG. 5B depict two registration management state models in UE 100 and AMF 155 as per an aspect of embodiments of the present disclosure.
Figure 5B:
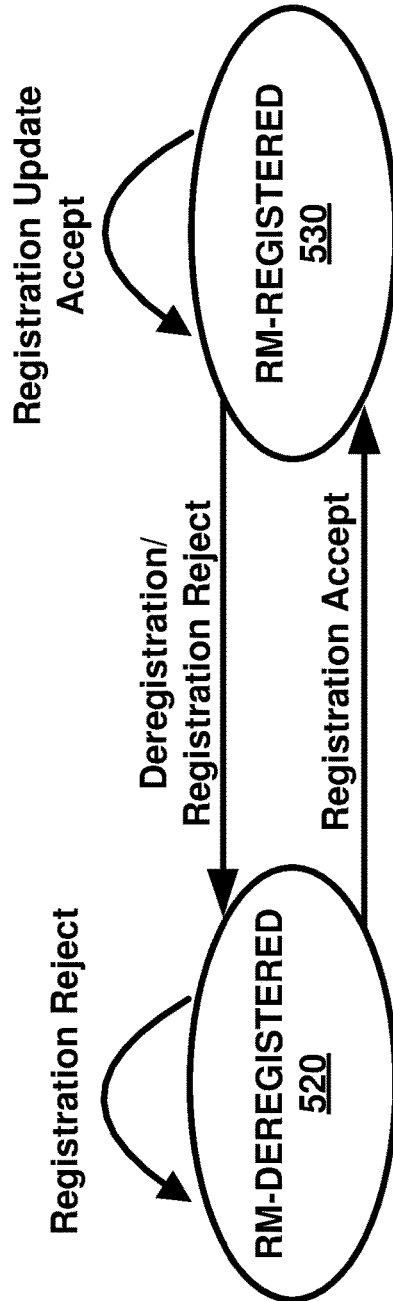

In an example, as depicted in example FIG. 5A and FIG. 5B, the registration management, RM may be employed to register or de-register a UE/user 100 with the network, and establish the user context in the network. Connection management may be employed to establish and release the signaling connection between the UE 100 and the AMF 155.

In an example, a UE 100 may register with the network to receive services that require registration. In an example, the UE 100 may update its registration with the network periodically in order to remain reachable (periodic registration update), or upon mobility (e.g., mobility registration update), or to update its capabilities or to re-negotiate protocol parameters.

Figure 8:
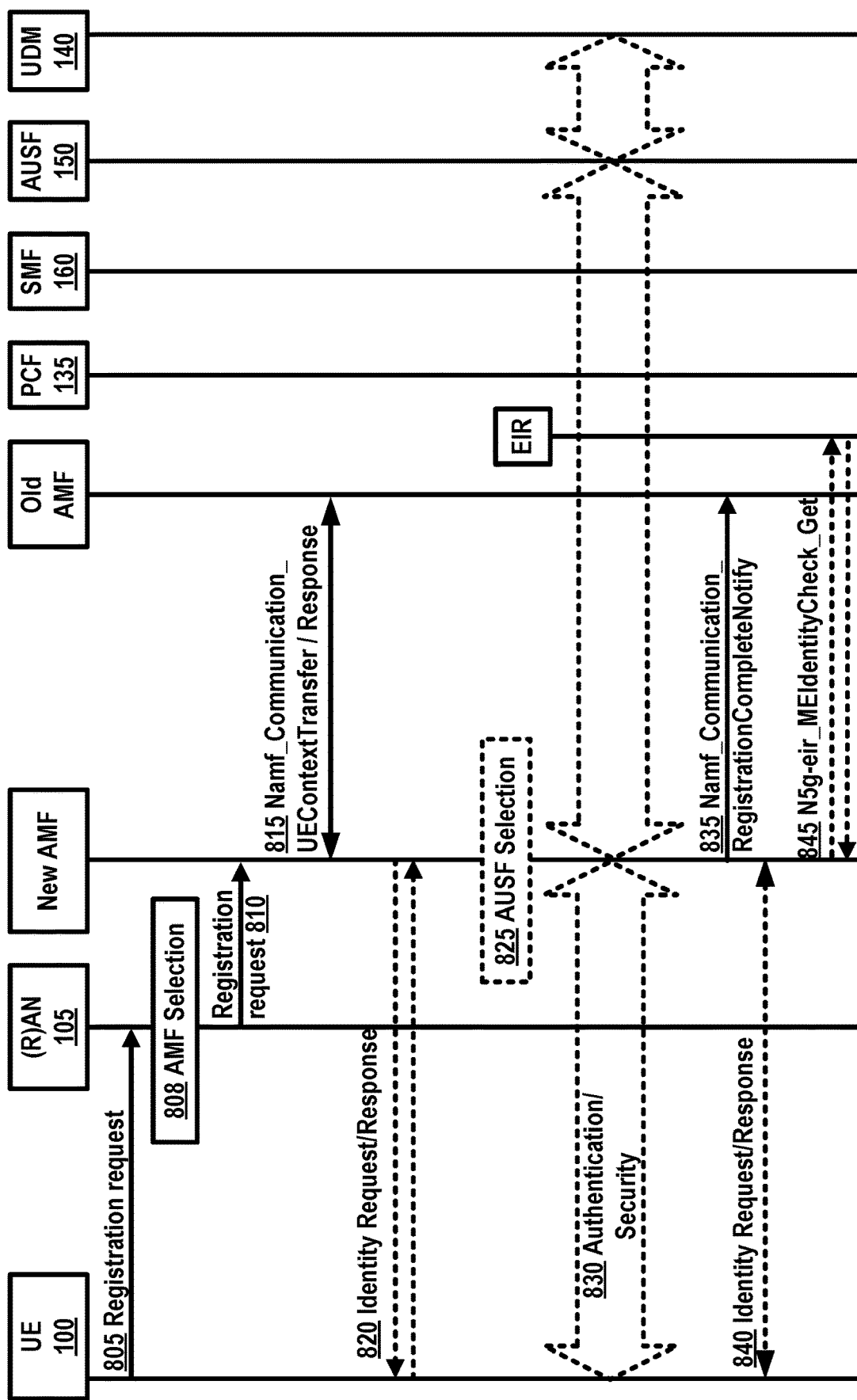
FIG. 8 is an example call flow as per an aspect of an embodiment of the present disclosure.
Figure 9:
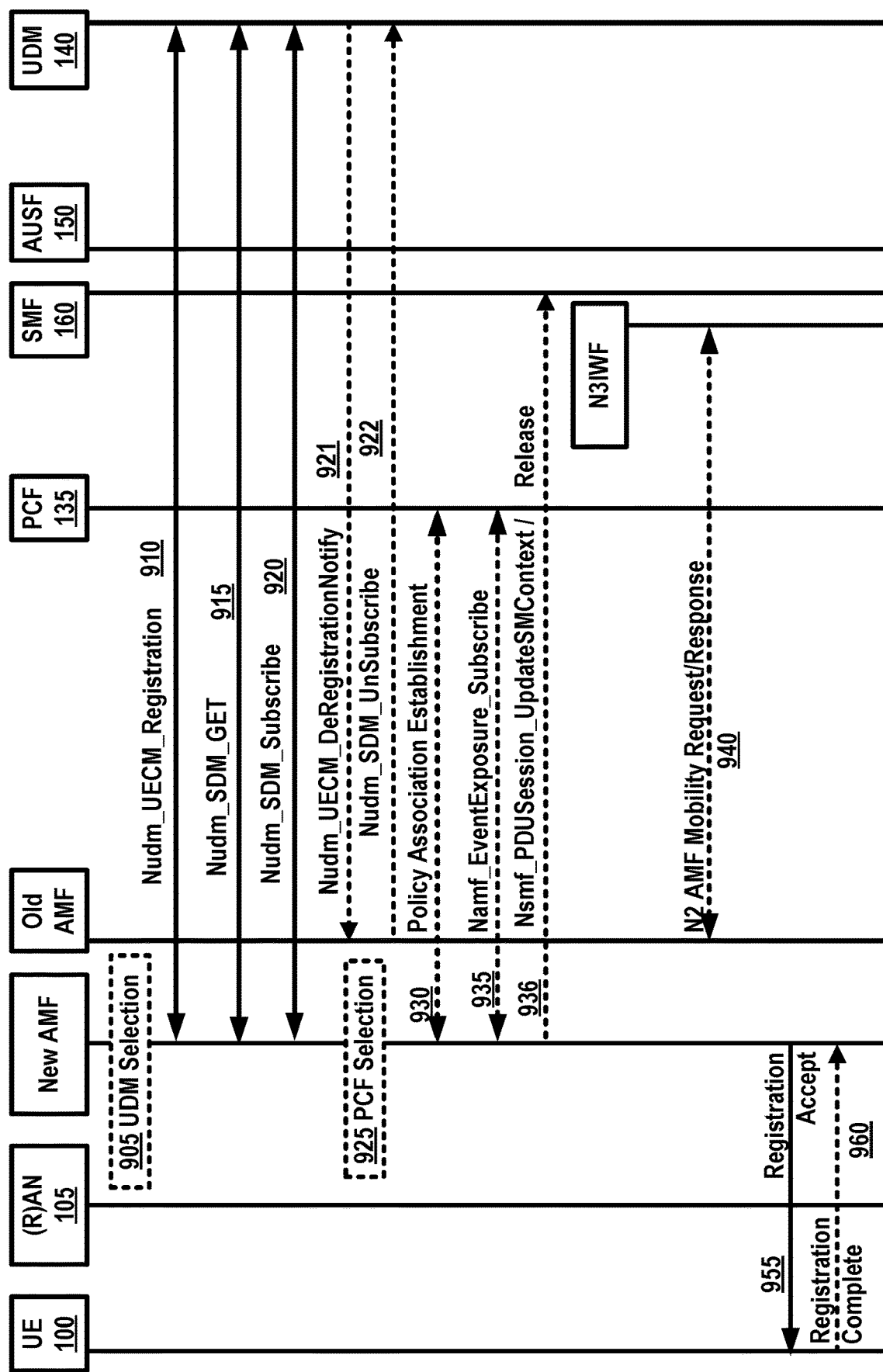
FIG. 9 is an example call flow as per an aspect of an embodiment of the present disclosure.

In an example, an initial registration procedure as depicted in example FIG. 8 and FIG. 9 may involve execution of network access control functions (e.g. user authentication and access authorization based on subscription profiles in UDM 140). Example FIG. 9 is a continuation of the initial registration procedure depicted in FIG. 8. As a result of the initial registration procedure, the identity of the serving AMF 155 may be registered in a UDM 140.

In an example, the registration management, RM procedures may be applicable over both 3GPP access 105 and non 3GPP access 165.

An example FIG. 5A may depict the RM states of a UE 100 as observed by the UE 100 and AMF 155. In an example embodiment, two RM states may be employed in the UE 100 and the AMF 155 that may reflect the registration status of the UE 100 in the selected PLMN: RM-DEREGISTERED 500, and RM-REGISTERED 510. In an example, in the RM DEREGISTERED state 500, the UE 100 may not be registered with the network. The UE 100 context in the AMF 155 may not hold valid location or routing information for the UE 100 so the UE 100 may not be reachable by the AMF 155. In an example, the UE 100 context may be stored in the UE 100 and the AMF 155. In an example, in the RM REGISTERED state 510, the UE 100 may be registered with the network. In the RM-REGISTERED 510 state, the UE 100 may receive services that may require registration with the network.

In an example embodiment, two RM states may be employed in AMF 155 for the UE 100 that may reflect the registration status of the UE 100 in the selected PLMN: RM-DEREGISTERED 520, and RM-REGISTERED 530.

As depicted in example FIG. 6A and FIG. 6B, connection management, CM, may comprise establishing and releasing a signaling connection between a UE 100 and an AMF 155 over N1 interface. The signaling connection may be employed to enable NAS signaling exchange between the UE 100 and the core network. The signaling connection between the UE 100 and the AMF 155 may comprise both the AN signaling connection between the UE 100 and the (R)AN 105 (e.g. RRC connection over 3GPP access) and the N2 connection for the UE 100 between the AN and the AMF 155.

As depicted in example FIG. 6A and FIG. 6B, two CM states may be employed for the NAS signaling connectivity of the UE 100 with the AMF 155, CM-IDLE 600, 620 and CM-CONNECTED 610, 630. A UE 100 in CM-IDLE 600 state may be in RM-REGISTERED 510 state and may have no NAS signaling connection established with the AMF 155 over N1. The UE 100 may perform cell selection, cell reselection, PLMN selection, and/or the like. A UE 100 in CM-CONNECTED 610 state may have a NAS signaling connection with the AMF 155 over N1.

In an example embodiment two CM states may be employed for the UE 100 at the AMF 155, CM-IDLE 620 and CM-CONNECTED 630.

In an example, an RRC inactive state may apply to NG-RAN (e.g. it may apply to NR and E-UTRA connected to 5G CN). The AMF 155, based on network configuration, may provide assistance information to the NG RAN 105, to assist the NG RAN's 105 decision whether the UE 100 may be sent to RRC inactive state. When a UE 100 is CM-CONNECTED 610 with RRC inactive state, the UE 100 may resume the RRC connection due to uplink data pending, mobile initiated signaling procedure, as a response to RAN 105 paging, to notify the network that it has left the RAN 105 notification area, and/or the like.

In an example, a NAS signaling connection management may include establishing and releasing a NAS signaling connection. A NAS signaling connection establishment function may be provided by the UE 100 and the AMF 155 to establish the NAS signaling connection for the UE 100 in CM-IDLE 600 state. The procedure of releasing the NAS signaling connection may be initiated by the 5G (R)AN 105 node or the AMF 155.

In an example, reachability management of a UE 100 may detect whether the UE 100 is reachable and may provide the UE 100 location (e.g. access node) to the network to reach the UE 100. Reachability management may be done by paging the UE 100 and the UE 100 location tracking. The UE 100 location tracking may include both UE 100 registration area tracking and UE 100 reachability tracking. The UE 100 and the AMF 155 may negotiate UE 100 reachability characteristics in CM-IDLE 600, 620 state during registration and registration update procedures.

In an example, two UE 100 reachability categories may be negotiated between a UE 100 and an AMF 155 for CM-IDLE 600, 620 state. 1) UE 100 reachability allowing mobile device terminated data while the UE 100 is CM-IDLE 600 mode. 2) Mobile initiated connection only (MICO) mode. The 5GC may support a PDU connectivity service that provides exchange of PDUs between the UE 100 and a data network identified by a DNN. The PDU connectivity service may be supported via PDU sessions that are established upon request from the UE 100.

In an example, a PDU session may support one or more PDU session types. PDU sessions may be established (e.g. upon UE 100 request), modified (e.g. upon UE 100 and 5GC request) and/or released (e.g. upon UE 100 and 5GC request) using NAS SM signaling exchanged over N1 between the UE 100 and the SMF 160. Upon request from an application server, the 5GC may be able to trigger a specific application in the UE 100. When receiving the trigger, the UE 100 may send it to the identified application in the UE 100. The identified application in the UE 100 may establish a PDU session to a specific DNN.

Figure 7:
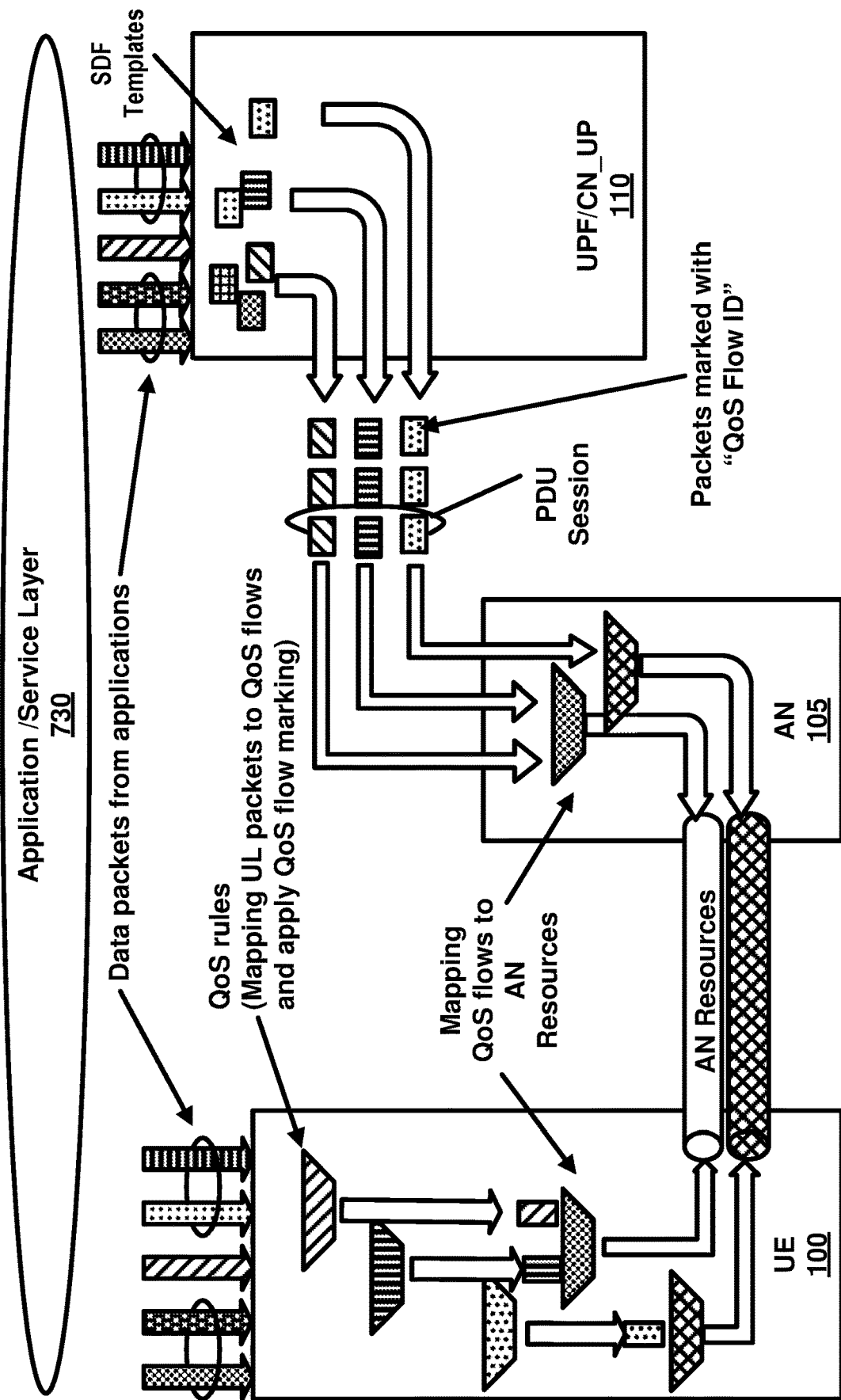
FIG. 7 is diagram for classification and marking traffic as per an aspect of an embodiment of the present disclosure.

In an example, the 5G QoS model may support a QoS flow based framework as depicted in example FIG. 7. The 5G QoS model may support both QoS flows that require a guaranteed flow bit rate and QoS flows that may not require a guaranteed flow bit rate. In an example, the 5G QoS model may support reflective QoS. The QoS model may comprise flow mapping or packet marking at the UPF 110 (CN_UP) 110, AN 105 and/or the UE 100. In an example, packets may arrive from and/or destined to the application/service layer 730 of UE 100, UPF 110 (CN_UP) 110, and/or the AF 145.

In an example, the QoS flow may be a granularity of QoS differentiation in a PDU session. A QoS flow ID, QFI, may be employed to identify the QoS flow in the 5G system. In an example, user plane traffic with the same QFI within a PDU session may receive the same traffic forwarding treatment. The QFI may be carried in an encapsulation header on N3 and/or N9 (e.g. without any changes to the end-to-end packet header). In an example, the QFI may be applied to PDUs with different types of payload. The QFI may be unique within a PDU session.

In an example, the QoS parameters of a QoS flow may be provided to the (R)AN 105 as a QoS profile over N2 at PDU session establishment, QoS flow establishment, or when NG-RAN is used at every time the user plane is activated. In an example, a default QoS rule may be required for every PDU session. The SMF 160 may allocate the QFI for a QoS flow and may derive QoS parameters from the information provided by the PCF 135. In an example, the SMF 160 may provide the QFI together with the QoS profile containing the QoS parameters of a QoS flow to the (R)AN 105.

In an example, 5G QoS flow may be a granularity for QoS forwarding treatment in the 5G system. Traffic mapped to the same 5G QoS flow may receive the same forwarding treatment (e.g. scheduling policy, queue management policy, rate shaping policy, RLC configuration, and/or the like). In an example, providing different QoS forwarding treatment may require separate 5G QoS flows.

In an example, a 5G QoS indicator may be a scalar that may be employed as a reference to a specific QoS forwarding behavior (e.g. packet loss rate, packet delay budget) to be provided to a 5G QoS flow. In an example, the 5G QoS indicator may be implemented in the access network by the 5QI referencing node specific parameters that may control the QoS forwarding treatment (e.g. scheduling weights, admission thresholds, queue management thresholds, link layer protocol configuration, and/or the like.).

In an example, 5GC may support edge computing and may enable operator(s) and 3rd party services to be hosted close to the UE's access point of attachment. The 5G core network may select a UPF 110 close to the UE 100 and may execute the traffic steering from the UPF 110 to the local data network via a N6 interface. In an example, the selection and traffic steering may be based on the UE's 100 subscription data, UE 100 location, the information from application function AF 145, policy, other related traffic rules, and/or the like. In an example, the 5G core network may expose network information and capabilities to an edge computing application function. The functionality support for edge computing may include local routing where the 5G core network may select a UPF 110 to route the user traffic to the local data network, traffic steering where the 5G core network may select the traffic to be routed to the applications in the local data network, session and service continuity to enable UE 100 and application mobility, user plane selection and reselection, e.g. based on input from application function, network capability exposure where 5G core network and application function may provide information to each other via NEf 125, QoS and charging where PCF 135 may provide rules for QoS control and charging for the traffic routed to the local data network, support of local area data network where 5G core network may provide support to connect to the LADN in a certain area where the applications are deployed, and/or the like.

An example 5G system may be a 3GPP system comprising of 5G access network 105, 5G core network and a UE 100, and/or the like. Allowed NSSAI may be an NSSAI provided by a serving PLMN during e.g. a registration procedure, indicating the NSSAI allowed by the network for the UE 100 in the serving PLMN for the current registration area.

In an example, a PDU connectivity service may provide exchange of PDUs between a UE 100 and a data network. A PDU session may be an association between the UE 100 and the data network, DN 115, that may provide the PDU connectivity service. The type of association may be IP, Ethernet and/or unstructured.

Establishment of user plane connectivity to a data network via network slice instance(s) may comprise the following: performing a RM procedure to select an AMF 155 that supports the required network slices, and establishing one or more PDU session(s) to the required data network via the network slice instance(s).

In an example, the set of network slices for a UE 100 may be changed at any time while the UE 100 may be registered with the network, and may be initiated by the network, or the UE 100.

In an example, a periodic registration update may be UE 100 re-registration at expiry of a periodic registration timer. A requested NSSAI may be a NSSAI that the UE 100 may provide to the network.

In an example, a service based interface may represent how a set of services may be provided/exposed by a given NF.

In an example, a service continuity may be an uninterrupted user experience of a service, including the cases where the IP address and/or anchoring point may change. In an example, a session continuity may refer to continuity of a PDU session. For PDU session of IP type session continuity may imply that the IP address is preserved for the lifetime of the PDU session. An uplink classifier may be a UPF 110 functionality that aims at diverting uplink traffic, based on filter rules provided by the SMF 160, towards data network, DN 115.

In an example, the 5G system architecture may support data connectivity and services enabling deployments to use techniques such as e.g. network function virtualization and/or software defined networking. The 5G system architecture may leverage service-based interactions between control plane (CP) network functions where identified. In 5G system architecture, separation of the user plane (UP) functions from the control plane functions may be considered. A 5G system may enable a network function to interact with other NF(s) directly if required.

In an example, the 5G system may reduce dependencies between the access network (AN) and the core network (CN). The architecture may comprise a converged access-agnostic core network with a common AN-CN interface which may integrate different 3GPP and non-3GPP access types.

In an example, the 5G system may support a unified authentication framework, stateless NFs, where the compute resource is decoupled from the storage resource, capability exposure, and concurrent access to local and centralized services. To support low latency services and access to local data networks, UP functions may be deployed close to the access network.

In an example, the 5G system may support roaming with home routed traffic and/or local breakout traffic in the visited PLMN. An example 5G architecture may be service-based and the interaction between network functions may be represented in two ways. (1) As service-based representation (depicted in example FIG. 1), where network functions within the control plane, may enable other authorized network functions to access their services. This representation may also include point-to-point reference points where necessary. (2) Reference point representation, showing the interaction between the NF services in the network functions described by point-to-point reference point (e.g. N11) between any two network functions.

In an example, a network slice may comprise the core network control plane and user plane network functions, the 5G Radio Access Network; the N3IWF functions to the non-3GPP Access Network, and/or the like. Network slices may differ for supported features and network function implementation. The operator may deploy multiple network slice instances delivering the same features but for different groups of UEs, e.g. as they deliver a different committed service and/or because they may be dedicated to a customer. The NSSF 120 may store the mapping information between slice instance ID and NF ID (or NF address).

In an example, a UE 100 may simultaneously be served by one or more network slice instances via a 5G-AN. In an example, the UE 100 may be served by k network slices (e.g. k=8, 16, etc.) at a time. An AMF 155 instance serving the UE 100 logically may belong to a network slice instance serving the UE 100.

In an example, a PDU session may belong to one specific network slice instance per PLMN. In an example, different network slice instances may not share a PDU session. Different slices may have slice-specific PDU sessions using the same DNN.

An S-NSSAI (Single Network Slice Selection Assistance information) may identify a network slice. An S-NSSAI may comprise a slice/service type (SST), which may refer to the expected network slice behavior in terms of features and services; and/or a slice differentiator (SD). A slice differentiator may be optional information that may complement the slice/service type(s) to allow further differentiation for selecting a network slice instance from potentially multiple network slice instances that comply with the indicated slice/service type. In an example, the same network slice instance may be selected employing different S-NSSAIs. The CN part of a network slice instance(s) serving a UE 100 may be selected by CN.

In an example, subscription data may include the S-NSSAI(s) of the network slices that the UE 100 subscribes to. One or more S-NSSAIs may be marked as default S-NSSAI. In an example, k S-NSSAI may be marked default S-NSSAI (e.g. k=8, 16, etc.). In an example, the UE 100 may subscribe to more than 8 S-NSSAIs.

In an example, a UE 100 may be configured by the HPLMN with a configured NSSAI per PLMN. Upon successful completion of a UE's registration procedure, the UE 100 may obtain from the AMF 155 an Allowed NSSAI for this PLMN, which may include one or more S-NSSAIs.

In an example, the Allowed NSSAI may take precedence over the configured NSSAI for a PLMN. The UE 100 may use the S-NSSAIs in the allowed NSSAI corresponding to a network slice for the subsequent network slice selection related procedures in the serving PLMN.

In an example, the establishment of user plane connectivity to a data network via a network slice instance(s) may comprise: performing a RM procedure to select an AMF 155 that may support the required network slices, establishing one or more PDU sessions to the required data network via the network slice instance(s), and/or the like.

In an example, when a UE 100 registers with a PLMN, if the UE 100 for the PLMN has a configured NSSAI or an allowed NSSAI, the UE 100 may provide to the network in RRC and NAS layer a requested NSSAI comprising the S-NSSAI(s) corresponding to the slice(s) to which the UE 100 attempts to register, a temporary user ID if one was assigned to the UE, and/or the like. The requested NSSAI may be configured-NSSAI, allowed-NSSAI, and/or the like.

In an example, when a UE 100 registers with a PLMN, if for the PLMN the UE 100 has no configured NSSAI or allowed NSSAI, the RAN 105 may route NAS signaling from/to the UE 100 to/from a default AMF 155.

In an example, the network, based on local policies, subscription changes and/or UE 100 mobility, may change the set of permitted network slice(s) to which the UE 100 is registered. In an example, the network may perform the change during a registration procedure or trigger a notification towards the UE 100 of the change of the supported network slices using an RM procedure (which may trigger a registration procedure). The network may provide the UE 100 with a new allowed NSSAI and tracking area list.

In an example, during a registration procedure in a PLMN, in case the network decides that the UE 100 may be served by a different AMF 155 based on network slice(s) aspects, the AMF 155 that first received the registration request may redirect the registration request to another AMF 155 via the RAN 105 or via direct signaling between the initial AMF 155 and the target AMF 155.

In an example, the network operator may provision the UE 100 with network slice selection policy (NSSP). The NSSP may comprise one or more NSSP rules.

In an example, if a UE 100 has one or more PDU sessions established corresponding to a specific S-NSSAI, the UE 100 may route the user data of the application in one of the PDU sessions, unless other conditions in the UE 100 may prohibit the use of the PDU sessions. If the application provides a DNN, then the UE 100 may consider the DNN to determine which PDU session to use. In an example, if the UE 100 does not have a PDU session established with the specific S-NSSAI, the UE 100 may request a new PDU session corresponding to the S-NSSAI and with the DNN that may be provided by the application. In an example, in order for the RAN 105 to select a proper resource for supporting network slicing in the RAN 105, the RAN 105 may be aware of the network slices used by the UE 100.

In an example, an AMF 155 may select an SMF 160 in a network slice instance based on S-NSSAI, DNN and/or other information e.g. UE 100 subscription and local operator policies, and/or the like, when the UE 100 triggers the establishment of a PDU session. The selected SMF 160 may establish the PDU session based on S-NSSAI and DNN.

In an example, in order to support network-controlled privacy of slice information for the slices the UE 100 may access, when the UE 100 is aware or configured that privacy considerations may apply to NSSAI, the UE 100 may not include NSSAI in NAS signaling unless the UE 100 has a NAS security context and the UE 100 may not include NSSAI in unprotected RRC signaling.

In an example, for roaming scenarios, the network slice specific network functions in VPLMN and HPLMN may be selected based on the S-NSSAI provided by the UE 100 during PDU connection establishment. If a standardized S-NSSAI is used, selection of slice specific NF instances may be done by one or more PLMN(s) based on the provided S-NSSAI. In an example, the VPLMN may map the S-NSSAI of HPLMN to a S-NSSAI of VPLMN based on roaming agreement (e.g., including mapping to a default S-NSSAI of VPLMN). In an example, the selection of slice specific NF instance in VPLMN may be done based on the S-NSSAI of VPLMN. In an example, the selection of any slice specific NF instance in HPLMN may be based on the S-NSSAI of HPLMN.

As depicted in example FIG. 8 and FIG. 9, a registration procedure may be performed by the UE 100 to get authorized to receive services, to enable mobility tracking, to enable reachability, and/or the like.

In an example, the UE 100 may send to the (R)AN 105 an AN message 805 (comprising AN parameters, RM-NAS registration request (registration type, SUCI or SUPI or 5G-GUTI, last visited TAI (if available), security parameters, requested NSSAI, mapping of requested NSSAI, UE 100 5GC capability, PDU session status, PDU session(s) to be re-activated, Follow on request, MICO mode preference, and/or the like), and/or the like). In an example, in case of NG-RAN, the AN parameters may include e.g. SUCI or SUPI or the 5G-GUTI, the Selected PLMN ID and requested NSSAI, and/or the like. In an example, the AN parameters may comprise establishment cause. The establishment cause may provide the reason for requesting the establishment of an RRC connection. In an example, the registration type may indicate if the UE 100 wants to perform an initial registration (i.e. the UE 100 is in RM-DEREGISTERED state), a mobility registration update (e.g., the UE 100 is in RM-REGISTERED state and initiates a registration procedure due to mobility), a periodic registration update (e.g., the UE 100 is in RM-REGISTERED state and may initiate a registration procedure due to the periodic registration update timer expiry) or an emergency registration (e.g., the UE 100 is in limited service state). In an example, if the UE 100 performing an initial registration (i.e., the UE 100 is in RM-DEREGISTERED state) to a PLMN for which the UE 100 does not already have a 5G-GUTI, the UE 100 may include its SUCI or SUPI in the registration request. The SUCI may be included if the home network has provisioned the public key to protect SUPI in the UE. If the UE 100 received a UE 100 configuration update command indicating that the UE 100 needs to re-register and the 5G-GUTI is invalid, the UE 100 may perform an initial registration and may include the SUPI in the registration request message. For an emergency registration, the SUPI may be included if the UE 100 does not have a valid 5G-GUTI available; the PEI may be included when the UE 100 has no SUPI and no valid 5G-GUTI. In other cases, the 5G-GUTI may be included and it may indicate the last serving AMF 155. If the UE 100 is already registered via a non-3GPP access in a PLMN different from the new PLMN (e.g., not the registered PLMN or an equivalent PLMN of the registered PLMN) of the 3GPP access, the UE 100 may not provide over the 3GPP access the 5G-GUTI allocated by the AMF 155 during the registration procedure over the non-3GPP access. If the UE 100 is already registered via a 3GPP access in a PLMN (e.g., the registered PLMN), different from the new PLMN (i.e. not the registered PLMN or an equivalent PLMN of the registered PLMN) of the non-3GPP access, the UE 100 may not provide over the non-3GPP access the 5G-GUTI allocated by the AMF 155 during the registration procedure over the 3GPP access. The UE 100 may provide the UE's usage setting based on its configuration. In case of initial registration or mobility registration update, the UE 100 may include the mapping of requested NSSAI, which may be the mapping of one or more S-NSSAI of the requested NSSAI to the S-NSSAIs of the configured NSSAI for the HPLMN, to ensure that the network is able to verify whether the S-NSSAI(s) in the requested NSSAI are permitted based on the subscribed S-NSSAIs. If available, the last visited TAI may be included in order to help the AMF 155 produce registration area for the UE. In an example, the security parameters may be used for authentication and integrity protection. requested NSSAI may indicate the network slice selection assistance information. The PDU session status may indicates the previously established PDU sessions in the UE. When the UE 100 is connected to the two AMF 155 belonging to different PLMN via 3GPP access and non-3GPP access then the PDU session status may indicate the established PDU session of the current PLMN in the UE. The PDU session(s) to be re-activated may be included to indicate the PDU session(s) for which the UE 100 may intend to activate UP connections. A PDU session corresponding to a LADN may not be included in the PDU session(s) to be re-activated when the UE 100 is outside the area of availability of the LADN. The follow on request may be included when the UE 100 may have pending uplink signaling and the UE 100 may not include PDU session(s) to be re-activated, or the registration type may indicate the UE 100 may want to perform an emergency registration.

In an example, if a SUPI is included or the 5G-GUTI does not indicate a valid AMF 155, the (R)AN 105, based on (R)AT and requested NSSAI, if available, may selects 808 an AMF 155. If UE 100 is in CM-CONNECTED state, the (R)AN 105 may forward the registration request message to the AMF 155 based on the N2 connection of the UE. If the (R)AN 105 may not select an appropriate AMF 155, it may forward the registration request to an AMF 155 which has been configured, in (R)AN 105, to perform AMF 155 selection 808.

In an example, the (R)AN 105 may send to the new AMF 155 an N2 message 810 (comprising: N2 parameters, RM-NAS registration request (registration type, SUPI or 5G-GUTI, last visited TAI (if available), security parameters, requested NSSAI, mapping of requested NSSAI, UE 100 5GC capability, PDU session status, PDU session(s) to be re-activated, follow on request, and MICO mode preference), and/or the like). In an example, when NG-RAN is used, the N2 parameters may comprise the selected PLMN ID, location information, cell identity and the RAT type related to the cell in which the UE 100 is camping. In an example, when NG-RAN is used, the N2 parameters may include the establishment cause.

In an example, the new AMF 155 may send to the old AMF 155 an Namf_Communication_UEContextTransfer (complete registration request) 815. In an example, if the UE's 5G-GUTI was included in the registration request and the serving AMF 155 has changed since last registration procedure, the new AMF 155 may invoke the Namf_Communication_UEContextTransfer service operation 815 on the old AMF 155 including the complete registration request IE, which may be integrity protected, to request the UE's SUPI and MM Context. The old AMF 155 may use the integrity protected complete registration request IE to verify if the context transfer service operation invocation corresponds to the UE 100 requested. In an example, the old AMF 155 may transfer the event subscriptions information by one or more NF consumer, for the UE, to the new AMF 155. In an example, if the UE 100 identifies itself with PEI, the SUPI request may be skipped.

In an example, the old AMF 155 may send to new AMF 155 a response 815 to Namf_Communication_UEContextTransfer (SUPI, MM context, SMF 160 information, PCF ID). In an example, the old AMF 155 may respond to the new AMF 155 for the Namf_Communication_UEContextTransfer invocation by including the UE's SUPI and MM context. In an example, if old AMF 155 holds information about established PDU sessions, the old AMF 155 may include SMF 160 information including S-NSSAI(s), SMF 160 identities and PDU session ID. In an example, if old AMF 155 holds information about active NGAP UE-TNLA bindings to N3IWF, the old AMF 155 may include information about the NGAP UE-TNLA bindings.

In an example, if the SUPI is not provided by the UE 100 nor retrieved from the old AMF 155 the identity request procedure 820 may be initiated by the AMF 155 sending an identity request message to the UE 100 requesting the SUCI.

In an example, the UE 100 may respond with an identity response message 820 including the SUCI. The UE 100 may derive the SUCI by using the provisioned public key of the HPLMN.

In an example, the AMF 155 may decide to initiate UE 100 authentication 825 by invoking an AUSF 150. The AMF 155 may select an AUSF 150 based on SUPI or SUCI. In an example, if the AMF 155 is configured to support emergency registration for unauthenticated SUPIs and the UE 100 indicated registration type emergency registration the AMF 155 may skip the authentication and security setup or the AMF 155 may accept that the authentication may fail and may continue the registration procedure.

In an example, the authentication 830 may be performed by Nudm_UEAuthenticate_Get operation. The AUSF 150 may discover a UDM 140. In case the AMF 155 provided a SUCI to AUSF 150, the AUSF 150 may return the SUPI to AMF 155 after the authentication is successful. In an example, if network slicing is used, the AMF 155 may decide if the registration request needs to be rerouted where the initial AMF 155 refers to the AMF 155. In an example, the AMF 155 may initiate NAS security functions. In an example, upon completion of NAS security function setup, the AMF 155 may initiate NGAP procedure to enable 5G-AN use it for securing procedures with the UE. In an example, the 5G-AN may store the security context and may acknowledge to the AMF 155. The 5G-AN may use the security context to protect the messages exchanged with the UE.

In an example, new AMF 155 may send to the old AMF 155 Namf_Communication_RegistrationCompleteNotify 835. If the AMF 155 has changed, the new AMF 155 may notify the old AMF 155 that the registration of the UE 100 in the new AMF 155 may be completed by invoking the Namf_Communication_RegistrationCompleteNotify service operation. If the authentication/security procedure fails, then the registration may be rejected, and the new AMF 155 may invoke the Namf_Communication_RegistrationCompleteNotify service operation with a reject indication reason code towards the old AMF 155. The old AMF 155 may continue as if the UE 100 context transfer service operation was never received. If one or more of the S-NSSAIs used in the old registration area may not be served in the target registration area, the new AMF 155 may determine which PDU session may not be supported in the new registration area. The new AMF 155 may invoke the Namf_Communication_RegistrationCompleteNotify service operation including the rejected PDU session ID and a reject cause (e.g. the S-NSSAI becomes no longer available) towards the old AMF 155. The new AMF 155 may modify the PDU session status correspondingly. The old AMF 155 may inform the corresponding SMF 160(s) to locally release the UE's SM context by invoking the Nsmf_PDUSession_ReleaseSMContext service operation.

In an example, the new AMF 155 may send to the UE 100 an identity request/response 840 (e.g., PEI). If the PEI was not provided by the UE 100 nor retrieved from the old AMF 155, the identity request procedure may be initiated by AMF 155 sending an identity request message to the UE 100 to retrieve the PEI. The PEI may be transferred encrypted unless the UE 100 performs emergency registration and may not be authenticated. For an emergency registration, the UE 100 may have included the PEI in the registration request.

In an example, the new AMF 155 may initiate ME identity check 845 by invoking the N5g-eir_EquipmentIdentityCheck_Get service operation 845.

In an example, the new AMF 155, based on the SUPI, may select 905 a UDM 140. The UDM 140 may select a UDR instance. In an example, the AMF 155 may selects a UDM 140.

In an example, if the AMF 155 has changed since the last registration procedure, or if the UE 100 provides a SUPI which may not refer to a valid context in the AMF 155, or if the UE 100 registers to the same AMF 155 it has already registered to a non-3GPP access (e.g., the UE 100 is registered over a non-3GPP access and may initiate the registration procedure to add a 3GPP access), the new AMF 155 may register with the UDM 140 using Nudm_UECM_Registration 910 and may subscribe to be notified when the UDM 140 may deregister the AMF 155. The UDM 140 may store the AMF 155 identity associated to the access type and may not remove the AMF 155 identity associated to the other access type. The UDM 140 may store information provided at registration in UDR, by Nudr_UDM_Update. In an example, the AMF 155 may retrieve the access and mobility subscription data and SMF 160 selection subscription data using Nudm_SDM_Get 915. The UDM 140 may retrieve this information from UDR by Nudr_UDM_Query (access and mobility subscription data). After a successful response is received, the AMF 155 may subscribe to be notified using Nudm_SDM_Subscribe 920 when the data requested may be modified. The UDM 140 may subscribe to UDR by Nudr_UDM_Subscribe. The GPSI may be provided to the AMF 155 in the subscription data from the UDM 140 if the GPSI is available in the UE 100 subscription data. In an example, the new AMF 155 may provide the access type it serves for the UE 100 to the UDM 140 and the access type may be set to 3GPP access. The UDM 140 may store the associated access type together with the serving AMF 155 in UDR by Nudr_UDM_Update. The new AMF 155 may create an MM context for the UE 100 after getting the mobility subscription data from the UDM 140. In an example, when the UDM 140 stores the associated access type together with the serving AMF 155, the UDM 140 may initiate a Nudm_UECM_DeregistrationNotification 921 to the old AMF 155 corresponding to 3GPP access. The old AMF 155 may remove the MM context of the UE. If the serving NF removal reason indicated by the UDM 140 is initial registration, then the old AMF 155 may invoke the Namf_EventExposure_Notify service operation towards all the associated SMF 160s of the UE 100 to notify that the UE 100 is deregistered from old AMF 155. The SMF 160 may release the PDU session(s) on getting this notification. In an example, the old AMF 155 may unsubscribe with the UDM 140 for subscription data using Nudm_SDM_unsubscribe 922.

In an example, if the AMF 155 decides to initiate PCF 135 communication, e.g. the AMF 155 has not yet obtained access and mobility policy for the UE 100 or if the access and mobility policy in the AMF 155 are no longer valid, the AMF 155 may select 925 a PCF 135. If the new AMF 155 receives a PCF ID from the old AMF 155 and successfully contacts the PCF 135 identified by the PCF ID, the AMF 155 may select the (V-)PCF identified by the PCF ID.

If the PCF 135 identified by the PCF ID may not be used (e.g. no response from the PCF 135) or if there is no PCF ID received from the old AMF 155, the AMF 155 may select 925 a PCF 135.

In an example, the new AMF 155 may perform a policy association establishment 930 during registration procedure. If the new AMF 155 contacts the PCF 135 identified by the (V-)PCF ID received during inter-AMF 155 mobility, the new AMF 155 may include the PCF-ID in the Npcf_AMPolicyControl Get operation. If the AMF 155 notifies the mobility restrictions (e.g. UE 100 location) to the PCF 135 for adjustment, or if the PCF 135 updates the mobility restrictions itself due to some conditions (e.g. application in use, time and date), the PCF 135 may provide the updated mobility restrictions to the AMF 155.

In an example, the PCF 135 may invoke Namf_EventExposure_Subscribe service operation 935 for UE 100 event subscription.

In an example, the AMF 155 may send to the SMF 160 an Nsmf_PDUSession_UpdateSMContext 936. In an example, the AMF 155 may invoke the Nsmf_PDUSession_UpdateSMContext if the PDU session(s) to be re-activated is included in the registration request. The AMF 155 may send Nsmf_PDUSession_UpdateSMContext request to SMF 160(s) associated with the PDU session(s) to activate user plane connections of the PDU session(s). The SMF 160 may decide to trigger e.g. the intermediate UPF 110 insertion, removal or change of PSA. In the case that the intermediate UPF 110 insertion, removal, or relocation is performed for the PDU session(s) not included in PDU session(s) to be re-activated, the procedure may be performed without N11 and N2 interactions to update the N3 user plane between (R)AN 105 and 5GC. The AMF 155 may invoke the Nsmf_PDUSession_ReleaseSMContext service operation towards the SMF 160 if any PDU session status indicates that it is released at the UE 100. The AMF 155 may invoke the Nsmf_PDUSession_ReleaseSMContext service operation towards the SMF 160 in order to release any network resources related to the PDU session.

In an example, the new AMF 155155 may send to a N3IWF an N2 AMF 155 mobility request 940. If the AMF 155 has changed, the new AMF 155 may create an NGAP UE 100 association towards the N3IWF to which the UE 100 is connected. In an example, the N3IWF may respond to the new AMF 155 with an N2 AMF 155 mobility response 940.

In an example, the new AMF 155 may send to the UE 100 a registration accept 955 (comprising: 5G-GUTI, registration area, mobility restrictions, PDU session status, allowed NSSAI, [mapping of allowed NSSAI], periodic registration update timer, LADN information and accepted MICO mode, IMS voice over PS session supported indication, emergency service support indicator, and/or the like). In an example, the AMF 155 may send the registration accept message to the UE 100 indicating that the registration request has been accepted. 5G-GUTI may be included if the AMF 155 allocates a new 5G-GUTI. If the AMF 155 allocates a new registration area, it may send the registration area to the UE 100 via registration accept message 955. If there is no registration area included in the registration accept message, the UE 100 may consider the old registration area as valid. In an example, mobility restrictions may be included in case mobility restrictions may apply for the UE 100 and registration type may not be emergency registration. The AMF 155 may indicate the established PDU sessions to the UE 100 in the PDU session status. The UE 100 may remove locally any internal resources related to PDU sessions that are not marked as established in the received PDU session status. In an example, when the UE 100 is connected to the two AMF 155 belonging to different PLMN via 3GPP access and non-3GPP access then the UE 100 may remove locally any internal resources related to the PDU session of the current PLMN that are not marked as established in received PDU session status. If the PDU session status information was in the registration request, the AMF 155 may indicate the PDU session status to the UE. The mapping of allowed NSSAI may be the mapping of one or more S-NSSAI of the allowed NSSAI to the S-NSSAIs of the configured NSSAI for the HPLMN. The AMF 155 may include in the registration accept message 955 the LADN information for LADNs that are available within the registration area determined by the AMF 155 for the UE. If the UE 100 included MICO mode in the request, then AMF 155 may respond whether MICO mode may be used. The AMF 155 may set the IMS voice over PS session supported Indication. In an example, in order to set the IMS voice over PS session supported indication, the AMF 155 may perform a UE/RAN radio information and compatibility request procedure to check the compatibility of the UE 100 and RAN radio capabilities related to IMS voice over PS. In an example, the emergency service support indicator may inform the UE 100 that emergency services are supported, e.g., the UE 100 may request PDU session for emergency services. In an example, the handover restriction list and UE-AMBR may be provided to NG-RAN by the AMF 155.

In an example, the UE 100 may send to the new AMF 155 a registration complete 960 message. In an example, the UE 100 may send the registration complete message 960 to the AMF 155 to acknowledge that a new 5G-GUTI may be assigned. In an example, when information about the PDU session(s) to be re-activated is not included in the registration request, the AMF 155 may release the signaling connection with the UE 100. In an example, when the follow-on request is included in the registration request, the AMF 155 may not release the signaling connection after the completion of the registration procedure. In an example, if the AMF 155 is aware that some signaling is pending in the AMF 155 or between the UE 100 and the 5GC, the AMF 155 may not release the signaling connection after the completion of the registration procedure.

Figure 10:
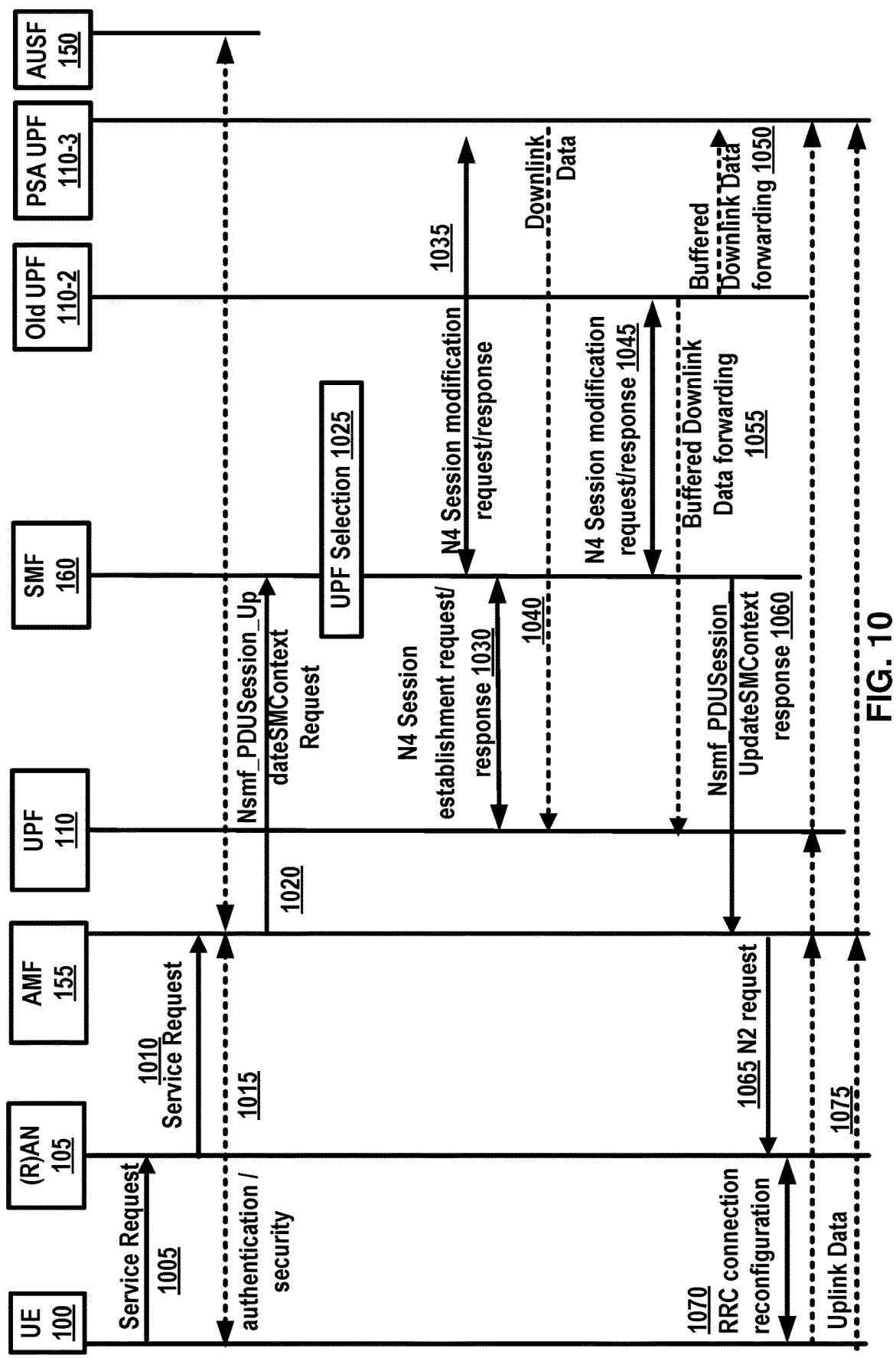
FIG. 10 is an example call flow as per an aspect of an embodiment of the present disclosure.
Figure 11:
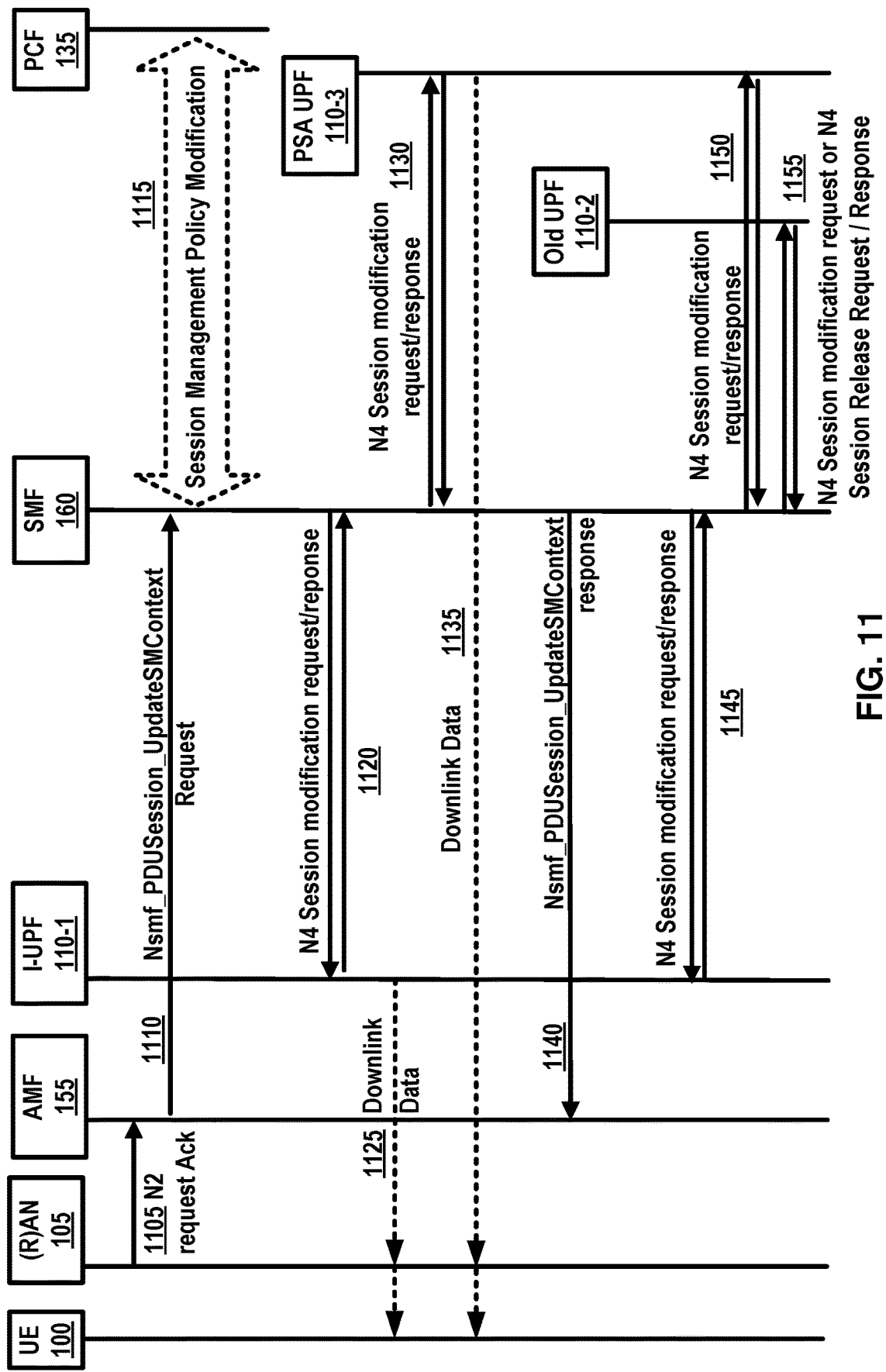
FIG. 11 is an example call flow as per an aspect of an embodiment of the present disclosure.

As depicted in example FIG. 10 and FIG. 11, a service request procedure e.g., a UE 100 triggered service request procedure may be used by a UE 100 in CM-IDLE state to request the establishment of a secure connection to an AMF 155. FIG. 11 is continuation of FIG. 10 depicting the service request procedure. The service request procedure may be used to activate a user plane connection for an established PDU session. The service request procedure may be triggered by the UE 100 or the 5GC, and may be used when the UE 100 is in CM-IDLE and/or in CM-CONNECTED and may allow selectively to activate user plane connections for some of the established PDU sessions.

In an example, a UE 100 in CM IDLE state may initiate the service request procedure to send uplink signaling messages, user data, and/or the like, as a response to a network paging request, and/or the like. In an example, after receiving the service request message, the AMF 155 may perform authentication. In an example, after the establishment of signaling connection to the AMF 155, the UE 100 or network may send signaling messages, e.g. PDU session establishment from the UE 100 to a SMF 160, via the AMF 155.

In an example, for any service request, the AMF 155 may respond with a service accept message to synchronize PDU session status between the UE 100 and network. The AMF 155 may respond with a service reject message to the UE 100, if the service request may not be accepted by the network. The service reject message may include an indication or cause code requesting the UE 100 to perform a registration update procedure. In an example, for service request due to user data, network may take further actions if user plane connection activation may not be successful. In an example FIG. 10 and FIG. 11, more than one UPF, e.g., old UPF 110-2 and PDU session Anchor PSA UPF 110-3 may be involved.

In an example, the UE 100 may send to a (R)AN 105 an AN message comprising AN parameters, mobility management, MM NAS service request 1005 (e.g., list of PDU sessions to be activated, list of allowed PDU sessions, security parameters, PDU session status, and/or the like), and/or the like. In an example, the UE 100 may provide the list of PDU sessions to be activated when the UE 100 may re-activate the PDU session(s). The list of allowed PDU sessions may be provided by the UE 100 when the service request may be a response of a paging or a NAS notification, and may identify the PDU sessions that may be transferred or associated to the access on which the service request may be sent. In an example, for the case of NG-RAN, the AN parameters may include selected PLMN ID, and an establishment cause. The establishment cause may provide the reason for requesting the establishment of an RRC connection. The UE 100 may send NAS service request message towards the AMF 155 encapsulated in an RRC message to the RAN 105.

In an example, if the service request may be triggered for user data, the UE 100 may identify, using the list of PDU sessions to be activated, the PDU session(s) for which the UP connections are to be activated in the NAS service request message. If the service request may be triggered for signaling, the UE 100 may not identify any PDU session(s). If this procedure may be triggered for paging response, and/or the UE 100 may have at the same time user data to be transferred, the UE 100 may identify the PDU session(s) whose UP connections may be activated in MM NAS service request message, by the list of PDU sessions to be activated.

In an example, if the service request over 3GPP access may be triggered in response to a paging indicating non-3GPP access, the NAS service request message may identify in the list of allowed PDU sessions the list of PDU sessions associated with the non-3GPP access that may be re-activated over 3GPP. In an example, the PDU session status may indicate the PDU sessions available in the UE 100. In an example, the UE 100 may not trigger the service request procedure for a PDU session corresponding to a LADN when the UE 100 may be outside the area of availability of the LADN. The UE 100 may not identify such PDU session(s) in the list of PDU sessions to be activated, if the service request may be triggered for other reasons.

In an example, the (R)AN 105 may send to AMF 155 an N2 Message 1010 (e.g., a service request) comprising N2 parameters, MM NAS service request, and/or the like. The AMF 155 may reject the N2 message if it may not be able to handle the service request. In an example, if NG-RAN may be used, the N2 parameters may include the 5G-GUTI, selected PLMN ID, location information, RAT type, establishment cause, and/or the like. In an example, the 5G-GUTI may be obtained in RRC procedure and the (R)AN 105 may select the AMF 155 according to the 5G-GUTI. In an example, the location information and RAT type may relate to the cell in which the UE 100 may be camping. In an example, based on the PDU session status, the AMF 155 may initiate PDU session release procedure in the network for the PDU sessions whose PDU session ID(s) may be indicated by the UE 100 as not available.

In an example, if the service request was not sent integrity protected or integrity protection verification failed, the AMF 155 may initiate a NAS authentication/security procedure 1015.

In an example, if the UE 100 triggers the service request to establish a signaling connection, upon successful establishment of the signaling connection, the UE 100 and the network may exchange NAS signaling.

In an example the AMF 155 may send to the SMF 160 a PDU session update context request 1020 e.g., Nsmf_PDUSession_UpdateSMContext request comprising PDU session ID(s), Cause(s), UE 100 location information, access type, and/or the like.

In an example, the Nsmf_PDUSession_UpdateSMContext request may be invoked by the AMF 155 if the UE 100 may identify PDU session(s) to be activated in the NAS service request message. In an example, the Nsmf_PDUSession_UpdateSMContext request may be triggered by the SMF 160 wherein the PDU session(s) identified by the UE 100 may correlate to other PDU session ID(s) than the one triggering the procedure. In an example, the Nsmf_PDUSession_UpdateSMContext request may be triggered by the SMF 160 wherein the current UE 100 location may be outside the area of validity for the N2 information provided by the SMF 160 during a network triggered service request procedure. The AMF 155 may not send the N2 information provided by the SMF 160 during the network triggered service request procedure.

In an example, the AMF 155 may determine the PDU session(s) to be activated and may send an Nsmf_PDUSession_UpdateSMContext request to SMF 160(*s*) associated with the PDU session(s) with cause set to indicate establishment of user plane resources for the PDU session(s).

In an example, if the procedure may be triggered in response to paging indicating non-3GPP access, and the list of allowed PDU sessions provided by the UE 100 may not include the PDU session for which the UE 100 was paged, the AMF 155 may notify the SMF 160 that the user plane for the PDU session may not be re-activated. The service request procedure may succeed without re-activating the user plane of any PDU sessions, and the AMF 155 may notify the UE 100.

In an example, if the PDU session ID may correspond to a LADN and the SMF 160 may determine that the UE 100 may be outside the area of availability of the LADN based on the UE 100 location reporting from the AMF 155, the SMF 160 may decide to (based on local policies) keep the PDU session, may reject the activation of user plane connection for the PDU session and may inform the AMF 155. In an example, if the procedure may be triggered by a network triggered service request, the SMF 160 may notify the UPF 110 that originated the data notification to discard downlink data for the PDU sessions and/or to not provide further data notification messages. The SMF 160 may respond to the AMF 155 with an appropriate reject cause and the user plane activation of PDU session may be stopped.

In an example, if the PDU session ID may correspond to a LADN and the SMF 160 may determine that the UE 100 may be outside the area of availability of the LADN based on the UE 100 location reporting from the AMF 155, the SMF 160 may decide to (based on local policies) release the PDU session. The SMF 160 may locally release the PDU session and may inform the AMF 155 that the PDU session may be released. The SMF 160 may respond to the AMF 155 with an appropriate reject cause and the user plane Activation of PDU session may be stopped.

In an example, if the UP activation of the PDU session may be accepted by the SMF 160, based on the location info received from the AMF 155, the SMF 160 may check the UPF 110 Selection 1025 Criteria (e.g., slice isolation requirements, slice coexistence requirements, UPF's 110 dynamic load, UPF's 110 relative static capacity among UPFs supporting the same DNN, UPF 110 location available at the SMF 160, UE 100 location information, Capability of the UPF 110 and the functionality required for the particular UE 100 session. In an example, an appropriate UPF 110 may be selected by matching the functionality and features required for a UE 100, DNN, PDU session type (i.e. IPv4, IPv6, ethernet type or unstructured type) and if applicable, the static IP address/prefix, SSC mode selected for the PDU session, UE 100 subscription profile in UDM 140, DNAI as included in the PCC rules, local operator policies, S-NSSAI, access technology being used by the UE 100, UPF 110 logical topology, and/or the like), and may determine to perform one or more of the following: continue using the current UPF(s), select a new intermediate UPF 110 (or add/remove an intermediate UPF 110), if the UE 100 has moved out of the service area of the UPF 110 that was previously connecting to the (R)AN 105, while maintaining the UPF(s) acting as PDU session anchor; may trigger re-establishment of the PDU session to perform relocation/reallocation of the UPF 110 acting as PDU session anchor, e.g. the UE 100 has moved out of the service area of the anchor UPF 110 which is connecting to RAN 105.

In an example, the SMF 160 may send to the UPF 110 (e.g., new intermediate UPF 110) an N4 session establishment request 1030. In an example, if the SMF 160 may select a new UPF 110 to act as intermediate UPF 110-2 for the PDU session, or if the SMF 160 may select to insert an intermediate UPF 110 for a PDU session which may not have an intermediate UPF 110-2, an N4 session establishment request 1030 message may be sent to the new UPF 110, providing packet detection, data forwarding, enforcement and reporting rules to be installed on the new intermediate UPF. The PDU session anchor addressing information (on N9) for this PDU session may be provided to the intermediate UPF 110-2.

In an example, if a new UPF 110 is selected by the SMF 160 to replace the old (intermediate) UPF 110-2, the SMF 160 may include a data forwarding indication. The data forwarding indication may indicate to the UPF 110 that a second tunnel endpoint may be reserved for buffered DL data from the old I-UPF.

In an example, the new UPF 110 (intermediate) may send to SMF 160 an N4 session establishment response message 1030. In case the UPF 110 may allocate CN tunnel info, the UPF 110 may provide DL CN tunnel info for the UPF 110 acting as PDU session anchor and UL CN tunnel info (e.g., CN N3 tunnel info) to the SMF 160. If the data forwarding indication may be received, the new (intermediate) UPF 110 acting as N3 terminating point may send DL CN tunnel info for the old (intermediate) UPF 110-2 to the SMF 160. The SMF 160 may start a timer, to release the resource in the old intermediate UPF 110-2.

In an example, if the SMF 160 may selects a new intermediate UPF 110 for the PDU session or may remove the old I-UPF 110-2, the SMF 160 may send N4 session modification request message 1035 to PDU session anchor, PSA UPF 110-3, providing the data forwarding indication and DL tunnel information from new intermediate UPF 110.

In an example, if the new intermediate UPF 110 may be added for the PDU session, the (PSA) UPF 110-3 may begin to send the DL data to the new I-UPF 110 as indicated in the DL tunnel information.

In an example, if the service request may be triggered by the network, and the SMF 160 may remove the old I-UPF 110-2 and may not replace the old I-UPF 110-2 with the new I-UPF 110, the SMF 160 may include the data forwarding indication in the request. The data forwarding indication may indicate to the (PSA) UPF 110-3 that a second tunnel endpoint may be reserved for buffered DL data from the old I-UPF 110-2. In this case, the PSA UPF 110-3 may begin to buffer the DL data it may receive at the same time from the N6 interface.

In an example, the PSA UPF 110-3 (PSA) may send to the SMF 160 an N4 session modification response 1035. In an example, if the data forwarding indication may be received, the PSA UPF 110-3 may become as N3 terminating point and may send CN DL tunnel info for the old (intermediate) UPF 110-2 to the SMF 160. The SMF 160 may start a timer, to release the resource in old intermediate UPF 110-2 if there is one.

In an example, the SMF 160 may send to the old UPF 110-2 an N4 session modification request 1045 (e.g., may comprise new UPF 110 address, new UPF 110 DL tunnel ID, and/or the like). In an example, if the service request may be triggered by the network, and/or the SMF 160 may remove the old (intermediate) UPF 110-2, the SMF 160 may send the N4 session modification request message to the old (intermediate) UPF 110-2, and may provide the DL tunnel information for the buffered DL data. If the SMF 160 may allocate new I-UPF 110, the DL tunnel information is from the new (intermediate) UPF 110 may act as N3 terminating point. If the SMF 160 may not allocate a new I-UPF 110, the DL tunnel information may be from the new UPF 110 (PSA) 110-3 acting as N3 terminating point. The SMF 160 may start a timer to monitor the forwarding tunnel. In an example, the old (intermediate) UPF 110-2 may send N4 session modification response message to the SMF 160.

In an example, if the I-UPF 110-2 may be relocated and forwarding tunnel was established to the new I-UPF 110, the old (intermediate) UPF 110-2 may forward its buffered data to the new (intermediate) UPF 110 acting as N3 terminating point. In an example, if the old I-UPF 110-2 may be removed and the new I-UPF 110 may not be assigned for the PDU session and forwarding tunnel may be established to the UPF 110 (PSA) 110-3, the old (intermediate) UPF 110-2 may forward its buffered data to the UPF 110 (PSA) 110-3 acting as N3 terminating point.

In an example, the SMF 160 may send to the AMF 155 an N11 message 1060 e.g., a Nsmf_PDUSession_UpdateSMContext response (comprising: N1 SM container (PDU session ID, PDU session re-establishment indication), N2 SM information (PDU session ID, QoS profile, CN N3 tunnel info, S-NSSAI), Cause), upon reception of the Nsmf_PDUSession_UpdateSMContext request with a cause including e.g., establishment of user plane resources. The SMF 160 may determine whether UPF 110 reallocation may be performed, based on the UE 100 location information, UPF 110 service area and operator policies. In an example, for a PDU session that the SMF 160 may determine to be served by the current UPF 110, e.g., PDU session anchor or intermediate UPF, the SMF 160 may generate N2 SM information and may send an Nsmf_PDUSession_UpdateSMContext response 1060 to the AMF 155 to establish the user plane(s). The N2 SM information may contain information that the AMF 155 may provide to the RAN 105. In an example, for a PDU session that the SMF 160 may determine as requiring a UPF 110 relocation for PDU session anchor UPF, the SMF 160 may reject the activation of UP of the PDU session by sending Nsmf_PDUSession_UpdateSMContext response that may contain N1 SM container to the UE 100 via the AMF 155. The N1 SM container may include the corresponding PDU session ID and PDU session re-establishment indication.

Upon reception of the Namf_EventExposure_Notify from the AMF 155 to the SMF 160, with an indication that the UE 100 is reachable, if the SMF 160 may have pending DL data, the SMF 160 may invoke the Namf_Communication_N1N2MessageTransfer service operation to the AMF 155 to establish the user plane(s) for the PDU sessions. In an example, the SMF 160 may resume sending DL data notifications to the AMF 155 in case of DL data.

In an example, the SMF 160 may send a message to the AMF 155 to reject the activation of UP of the PDU session by including a cause in the Nsmf_PDUSession_UpdateSMContext response if the PDU session may correspond to a LADN and the UE 100 may be outside the area of availability of the LADN, or if the AMF 155 may notify the SMF 160 that the UE 100 may be reachable for regulatory prioritized service, and the PDU session to be activated may not for a regulatory prioritized service; or if the SMF 160 may decide to perform PSA UPF 110-3 relocation for the requested PDU session.

In an example, the AMF 155 may send to the (R)AN 105 an N2 request message 1065 (e.g., N2 SM information received from SMF 160, security context, AMF 155 signaling connection ID, handover restriction list, MM NAS service accept, list of recommended cells/TAs/NG-RAN node identifiers). In an example, the RAN 105 may store the security context, AMF 155 signaling connection Id, QoS information for the QoS flows of the PDU sessions that may be activated and N3 tunnel IDs in the UE 100 RAN 105 context. In an example, the MM NAS service accept may include PDU session status in the AMF 155. If the activation of UP of a PDU session may be rejected by the SMF 160, the MM NAS service accept may include the PDU session ID and the reason why the user plane resources may not be activated (e.g. LADN not available). Local PDU session release during the session request procedure may be indicated to the UE 100 via the session Status.

In an example, if there are multiple PDU sessions that may involve multiple SMF 160s, the AMF 155 may not wait for responses from all SMF 160s before it may send N2 SM information to the UE 100. The AMF 155 may wait for all responses from the SMF 160s before it may send MM NAS service accept message to the UE 100.

In an example, the AMF 155 may include at least one N2 SM information from the SMF 160 if the procedure may be triggered for PDU session user plane activation. AMF 155 may send additional N2 SM information from SMF 160s in separate N2 message(s) (e.g. N2 tunnel setup request), if there is any. Alternatively, if multiple SMF 160s may be involved, the AMF 155 may send one N2 request message to (R)AN 105 after all the Nsmf_PDUSession_UpdateSMContext response service operations from all the SMF 160s associated with the UE 100 may be received. In such case, the N2 request message may include the N2 SM information received in one or more of the Nsmf_PDUSession_UpdateSMContext response and PDU session ID to enable AMF 155 to associate responses to relevant SMF 160.

In an example, if the RAN 105 (e.g., NG RAN) node may provide the list of recommended cells/TAs/NG-RAN node identifiers during the AN release procedure, the AMF 155 may include the information from the list in the N2 request. The RAN 105 may use this information to allocate the RAN 105 notification area when the RAN 105 may decide to enable RRC inactive state for the UE 100.

If the AMF 155 may receive an indication, from the SMF 160 during a PDU session establishment procedure that the UE 100 may be using a PDU session related to latency sensitive services, for any of the PDU sessions established for the UE 100 and the AMF 155 has received an indication from the UE 100 that may support the CM-CONNECTED with RRC inactive state, then the AMF 155 may include the UE's RRC inactive assistance information. In an example, the AMF 155 based on network configuration, may include the UE's RRC inactive assistance information.

In an example, the (R)AN 105 may send to the UE 100 a message to perform RRC connection reconfiguration 1070 with the UE 100 depending on the QoS information for all the QoS flows of the PDU sessions whose UP connections may be activated and data radio bearers. In an example, the user plane security may be established.

In an example, if the N2 request may include a MM NAS service accept message, the RAN 105 may forward the MM NAS service accept to the UE 100. The UE 100 may locally delete context of PDU sessions that may not be available in 5GC.

In an example, if the N1 SM information may be transmitted to the UE 100 and may indicate that some PDU session(s) may be re-established, the UE 100 may initiate PDU session re-establishment for the PDU session(s) that may be re-established after the service request procedure may be complete.

In an example, after the user plane radio resources may be setup, the uplink data from the UE 100 may be forwarded to the RAN 105. The RAN 105 (e.g., NG-RAN) may send the uplink data to the UPF 110 address and tunnel ID provided.

In an example, the (R)AN 105 may send to the AMF 155 an N2 request Ack 1105 (e.g., N2 SM information (comprising: AN tunnel info, list of accepted QoS flows for the PDU sessions whose UP connections are activated, list of rejected QoS flows for the PDU sessions whose UP connections are activated)). In an example, the N2 request message may include N2 SM information(s), e.g. AN tunnel info. RAN 105 may respond N2 SM information with separate N2 message (e.g. N2 tunnel setup response). In an example, if multiple N2 SM information are included in the N2 request message, the N2 request Ack may include multiple N2 SM information and information to enable the AMF 155 to associate the responses to relevant SMF 160.

In an example, the AMF 155 may send to the SMF 160 a Nsmf_PDUSession_UpdateSMContext request 1110 (N2 SM information (AN tunnel info), RAT type) per PDU session. If the AMF 155 may receive N2 SM information (one or multiple) from the RAN 105, then the AMF 155 may forward the N2 SM information to the relevant SMF 160. If the UE 100 time zone may change compared to the last reported UE 100 Time Zone then the AMF 155 may include the UE 100 time zone IE in the Nsmf_PDUSession_UpdateSMContext request message.

In an example, if dynamic PCC is deployed, the SMF 160 may initiate notification about new location information to the PCF 135 (if subscribed) by invoking an event exposure notification operation (e.g., a Nsmf_EventExposure_Notify service operation). The PCF 135 may provide updated policies by invoking a policy control update notification message 1115 (e.g., a Npcf_SMPolicyControl_UpdateNotify operation).

In an example, if the SMF 160 may select a new UPF 110 to act as intermediate UPF 110 for the PDU session, the SMF 160 may initiates an N4 session modification procedure 1120 to the new I-UPF 110 and may provide AN tunnel info. The downlink data from the new I-UPF 110 may be forwarded to RAN 105 and UE 100. In an example, the UPF 110 may send to the SMF 160, an N4 session modification response 1120. In an example, the SMF 160 may send to the AMF 155, an Nsmf_PDUSession_UpdateSMContext response 1140.

In an example, if forwarding tunnel may be established to the new I-UPF 110 and if the timer SMF 160 set for forwarding tunnel may be expired, the SMF 160 may sends N4 session modification request 1145 to new (intermediate) UPF 110 acting as N3 terminating point to release the forwarding tunnel. In an example, the new (intermediate) UPF 110 may send to the SMF 160 an N4 session modification response 1145. In an example, the SMF 160 may send to the PSA UPF 110-3 an N4 session modification request 1150, or N4 session release request. In an example, if the SMF 160 may continue using the old UPF 110-2, the SMF 160 may send an N4 session modification request 1155, providing AN tunnel info. In an example, if the SMF 160 may select a new UPF 110 to act as intermediate UPF 110, and the old UPF 110-2 may not be PSA UPF 110-3, the SMF 160 may initiate resource release, after timer expires, by sending an N4 session release request (release cause) to the old intermediate UPF 110-2.

In an example, the old intermediate UPF 110-2 may send to the SMF 160 an N4 session modification response or N4 session release response 1155. The old UPF 110-2 may acknowledge with the N4 session modification response or N4 session release response message to confirm the modification or release of resources. The AMF 155 may invoke the Namf_EventExposure_Notify service operation to notify the mobility related events, after this procedure may complete, towards the NFs that may have subscribed for the events. In an example, the AMF 155 may invoke the Namf_EventExposure_Notify towards the SMF 160 if the SMF 160 had subscribed for UE 100 moving into or out of area of interest and if the UE's current location may indicate that it may be moving into or moving outside of the area of interest subscribed, or if the SMF 160 had subscribed for LADN DNN and if the UE 100 may be moving into or outside of an area where the LADN is available, or if the UE 100 may be in MICO mode and the AMF 155 had notified an SMF 160 of the UE 100 being unreachable and that SMF 160 may not send DL data notifications to the AMF 155, and the AMF 155 may informs the SMF 160 that the UE 100 is reachable, or if the SMF 160 had subscribed for UE 100 reachability status, then the AMF 155 may notify the UE 100 reachability.

Figure 12:
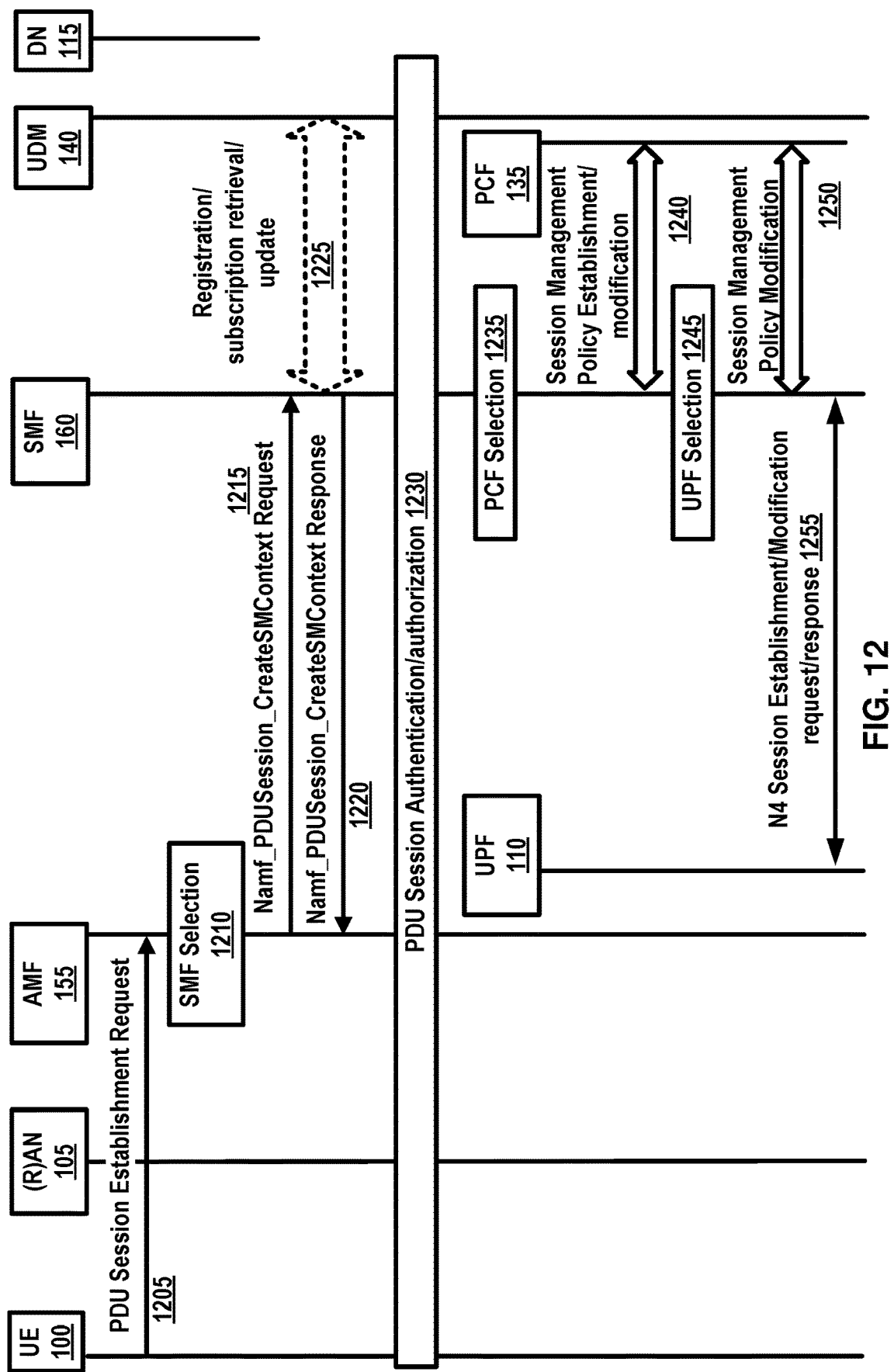
FIG. 12 is an example call flow as per an aspect of an embodiment of the present disclosure.
Figure 13:
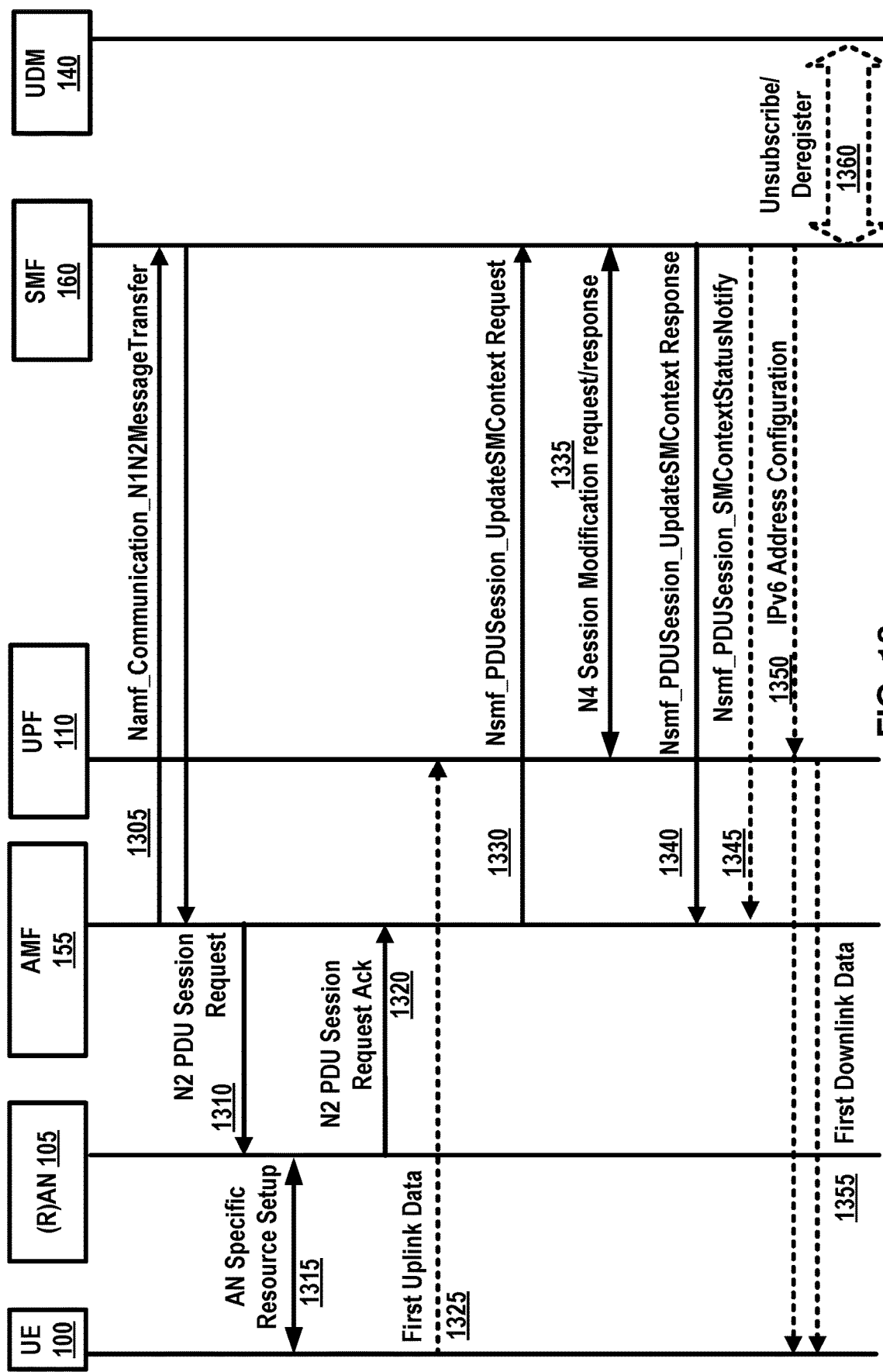
FIG. 13 is an example call flow as per an aspect of an embodiment of the present disclosure.

An example PDU session establishment procedure depicted in FIG. 12 and FIG. 13. In an example embodiment, when the PDU session establishment procedure may be employed, the UE 100 may send to the AMF 155 a NAS Message 1205 (or a SM NAS message) comprising NSSAI, S-NSSAI (e.g., requested S-NSSAI, allowed S-NSSAI, subscribed S-NSSAI, and/or the like), DNN, PDU session ID, request type, old PDU session ID, N1 SM container (PDU session establishment request), and/or the like. In an example, the UE 100, in order to establish a new PDU session, may generate a new PDU session ID. In an example, when emergency service may be required and an emergency PDU session may not already be established, the UE 100 may initiate the UE 100 requested PDU session establishment procedure with a request type indicating emergency request. In an example, the UE 100 may initiate the UE 100 requested PDU session establishment procedure by the transmission of the NAS message containing a PDU session establishment request within the N1 SM container. The PDU session establishment request may include a PDU type, SSC mode, protocol configuration options, and/or the like. In an example, the request type may indicate initial request if the PDU session establishment is a request to establish the new PDU session and may indicate existing PDU session if the request refers to an existing PDU session between 3GPP access and non-3GPP access or to an existing PDN connection in EPC. In an example, the request type may indicate emergency request if the PDU session establishment may be a request to establish a PDU session for emergency services. The request type may indicate existing emergency PDU session if the request refers to an existing PDU session for emergency services between 3GPP access and non-3GPP access. In an example, the NAS message sent by the UE 100 may be encapsulated by the AN in a N2 message towards the AMF 155 that may include user location information and access technology type information. In an example, the PDU session establishment request message may contain SM PDU DN request container containing information for the PDU session authorization by the external DN. In an example, if the procedure may be triggered for SSC mode 3 operation, the UE 100 may include the old PDU session ID which may indicate the PDU session ID of the on-going PDU session to be released, in the NAS message. The old PDU session ID may be an optional parameter which may be included in this case. In an example, the AMF 155 may receive from the AN the NAS message (e.g., NAS SM message) together with user location information (e.g. cell ID in case of the RAN 105). In an example, the UE 100 may not trigger a PDU session establishment for a PDU session corresponding to a LADN when the UE 100 is outside the area of availability of the LADN.

In an example, the AMF 155 may determine that the NAS message or the SM NAS message may correspond to the request for the new PDU session based on that request type indicates initial request and that the PDU session ID may not be used for any existing PDU session(s) of the UE 100. If the NAS message does not contain an S-NSSAI, the AMF 155 may determine a default S-NSSAI for the requested PDU session either according to the UE 100 subscription, if it may contain only one default S-NSSAI, or based on operator policy. In an example, the AMF 155 may perform SMF 160 selection 1210 and select an SMF 160. If the request type may indicate initial request or the request may be due to handover from EPS, the AMF 155 may store an association of the S-NSSAI, the PDU session ID and a SMF 160 ID. In an example, if the request type is initial request and if the old PDU session ID indicating the existing PDU session may be contained in the message, the AMF 155 may select the SMF 160 and may store an association of the new PDU session ID and the selected SMF 160 ID.

In an example, the AMF 155 may send to the SMF 160, an N11 message 1215, e.g., Nsmf_PDUSession_CreateSMContext request (comprising: SUPI or PEI, DNN, S-NSSAI, PDU session ID, AMF 155 ID, request type, N1 SM container (PDU session establishment request), user location information, access type, PEI, GPSI), or Nsmf_PDUSession_UpdateSMContext request (SUPI, DNN, S-NSSAI, PDU session ID, AMF 155 ID, request type, N1 SM container (PDU session establishment request), user location information, access type, RAT type, PEI). In an example, if the AMF 155 may not have an association with the SMF 160 for the PDU session ID provided by the UE 100 (e.g. when request type indicates initial request), the AMF 155 may invoke the Nsmf_PDUSession_CreateSMContext request, but if the AMF 155 already has an association with an SMF 160 for the PDU session ID provided by the UE 100 (e.g. when request type indicates existing PDU session), the AMF 155 may invoke the Nsmf_PDUSession_UpdateSMContext request. In an example, the AMF 155 ID may be the UE's GUAMI which uniquely identifies the AMF 155 serving the UE 100. The AMF 155 may forward the PDU session ID together with the N1 SM container containing the PDU session establishment request received from the UE 100. The AMF 155 may provide the PEI instead of the SUPI when the UE 100 has registered for emergency services without providing the SUPI. In case the UE 100 has registered for emergency services but has not been authenticated, the AMF 155 may indicate that the SUPI has not been authenticated.

In an example, if the request type may indicate neither emergency request nor existing emergency PDU session and, if the SMF 160 has not yet registered and subscription data may not be available, the SMF 160 may register with the UDM 140, and may retrieve subscription data 1225 and subscribes to be notified when subscription data may be modified. In an example, if the request type may indicate existing PDU session or existing emergency PDU session, the SMF 160 may determine that the request may be due to handover between 3GPP access and non-3GPP access or due to handover from EPS. The SMF 160 may identify the existing PDU session based on the PDU session ID. The SMF 160 may not create a new SM context but instead may update the existing SM context and may provide the representation of the updated SM context to the AMF 155 in the response. if the request type may be initial request and if the old PDU session ID may be included in Nsmf_PDUSession_CreateSMContext request, the SMF 160 may identify the existing PDU session to be released based on the old PDU session ID.

In an example, the SMF 160 may send to the AMF 155, the N11 message response 1220, e.g., either a PDU session create/update response, Nsmf_PDUSession_CreateSMContext response 1220 (cause, SM context ID or N1 SM container (PDU session reject(cause))) or an Nsmf_PDUSession_UpdateSMContext response.

In an example, if the SMF 160 may perform secondary authorization/authentication 1230 during the establishment of the PDU session by a DN-AAA server, the SMF 160 may select a UPF 110 and may trigger a PDU session establishment authentication/authorization.

In an example, if the request type may indicate initial request, the SMF 160 may select an SSC mode for the PDU session. The SMF 160 may select one or more UPFs as needed. In case of PDU type IPv4 or IPv6, the SMF 160 may allocate an IP address/prefix for the PDU session. In case of PDU type IPv6, the SMF 160 may allocate an interface identifier to the UE 100 for the UE 100 to build its link-local address. For Unstructured PDU type the SMF 160 may allocate an IPv6 prefix for the PDU session and N6 point-to-point tunneling (based on UDP/IPv6).

In an example, if dynamic PCC is deployed, the may SMF 160 performs PCF 135 selection 1235. If the request type indicates existing PDU session or existing emergency PDU session, the SMF 160 may use the PCF 135 already selected for the PDU session. If dynamic PCC is not deployed, the SMF 160 may apply local policy.

In an example, the SMF 160 may perform a session management policy establishment procedure 1240 to establish a PDU session with the PCF 135 and may get the default PCC Rules for the PDU session. The GPSI may be included if available at the SMF 160. If the request type in 1215 indicates existing PDU session, the SMF 160 may notify an event previously subscribed by the PCF 135 by a session management policy modification procedure and the PCF 135 may update policy information in the SMF 160. The PCF 135 may provide authorized session-AMBR and the authorized 5QI and ARP to SMF 160. The PCF 135 may subscribe to the IP allocation/release event in the SMF 160 (and may subscribe other events).

In an example, the PCF 135, based on the emergency DNN, may set the ARP of the PCC rules to a value that may be reserved for emergency services.

In an example, if the request type in 1215 indicates initial request, the SMF 160 may select an SSC mode for the PDU session. The SMF 160 may select 1245 one or more UPFs as needed. In case of PDU type IPv4 or IPv6, the SMF 160 may allocate an IP address/prefix for the PDU session. In case of PDU type IPv6, the SMF 160 may allocate an interface identifier to the UE 100 for the UE 100 to build its link-local address. For unstructured PDU type the SMF 160 may allocate an IPv6 prefix for the PDU session and N6 point-to-point tunneling (e.g., based on UDP/IPv6). In an example, for Ethernet PDU type PDU session, neither a MAC nor an IP address may be allocated by the SMF 160 to the UE 100 for this PDU session.

In an example, if the request type in 1215 is existing PDU session, the SMF 160 may maintain the same IP address/prefix that may be allocated to the UE 100 in the source network.

In an example, if the request type in 1215 indicates existing PDU session referring to an existing PDU session moved between 3GPP access and non-3GPP access, the SMF 160 may maintain the SSC mode of the PDU session, e.g., the current PDU session Anchor and IP address. In an example, the SMF 160 may trigger e.g. new intermediate UPF 110 insertion or allocation of a new UPF 110. In an example, if the request type indicates emergency request, the SMF 160 may select 1245 the UPF 110 and may select SSC mode 1.

In an example, the SMF 160 may perform a session management policy modification 1250 procedure to report some event to the PCF 135 that has previously subscribed. If request type is initial request and dynamic PCC is deployed and PDU type is IPv4 or IPv6, the SMF 160 may notify the PCF 135 (that has previously subscribed) with the allocated UE 100 IP address/prefix.

In an example, the PCF 135 may provide updated policies to the SMF 160. The PCF 135 may provide authorized session-AMBR and the authorized 5QI and ARP to the SMF 160.

In an example, if request type indicates initial request, the SMF 160 may initiate an N4 session establishment procedure 1255 with the selected UPF 110. The SMF 160 may initiate an N4 session modification procedure with the selected UPF 110. In an example, the SMF 160 may send an N4 session establishment/modification request 1255 to the UPF 110 and may provide packet detection, enforcement, reporting rules, and/or the like to be installed on the UPF 110 for this PDU session. If CN tunnel info is allocated by the SMF 160, the CN tunnel info may be provided to the UPF 110. If the selective user plane deactivation is required for this PDU session, the SMF 160 may determine the Inactivity Timer and may provide it to the UPF 110. In an example, the UPF 110 may acknowledges by sending an N4 session establishment/modification response 1255. If CN tunnel info is allocated by the UPF, the CN tunnel info may be provided to SMF 160. In an example, if multiple UPFs are selected for the PDU session, the SMF 160 may initiate N4 session establishment/modification procedure 1255 with one or more UPF 110 of the PDU session.

In an example, the SMF 160 may send to the AMF 155 an Namf_Communication_N1N2MessageTransfer 1305 message (comprising PDU session ID, access type, N2 SM information (PDU session ID, QFI(s), QoS profile(s), CN tunnel info, S-NSSAI, session-AMBR, PDU session type, and/or the like), N1 SM container (PDU session establishment accept (QoS Rule(s), selected SSC mode, S-NSSAI, allocated IPv4 address, interface identifier, session-AMBR, selected PDU session type, and/or the like))). In case of multiple UPFs are used for the PDU session, the CN tunnel info may comprise tunnel information related with the UPF 110 that terminates N3. In an example, the N2 SM information may carry information that the AMF 155 may forward to the (R)AN 105 (e.g., the CN tunnel info corresponding to the core network address of the N3 tunnel corresponding to the PDU session, one or multiple QoS profiles and the corresponding QFIs may be provided to the (R)AN 105, the PDU session ID may be used by AN signaling with the UE 100 to indicate to the UE 100 the association between AN resources and a PDU session for the UE 100, and/or the like). In an example, a PDU session may be associated to an S-NSSAI and a DNN. In an example, the N1 SM container may contain the PDU session establishment accept that the AMF 155 may provide to the UE 100. In an example, multiple QoS rules and QoS profiles may be included in the PDU session establishment accept within the N1 SM and in the N2 SM information. In an example, the Namf_Communication_N1N2MessageTransfer 1305 may further comprise the PDU session ID and information allowing the AMF 155 to know which access towards the UE 100 to use.

In an example, the AMF 155 may send to the (R)AN 105 an N2 PDU session request 1310 (comprising N2 SM information, NAS message (PDU session ID, N1 SM container (PDU session establishment accept, and/or the like))). In an example, the AMF 155 may send the NAS message 1310 that may comprise PDU session ID and PDU session establishment accept targeted to the UE 100 and the N2 SM information received from the SMF 160 within the N2 PDU session request 1310 to the (R)AN 105.

In an example, the (R)AN 105 may issue AN specific signaling exchange 1315 with the UE 100 that may be related with the information received from SMF 160. In an example, in case of a 3GPP RAN 105, an RRC connection reconfiguration procedure may take place with the UE 100 to establish the necessary RAN 105 resources related to the QoS Rules for the PDU session request 1310. In an example, (R)AN 105 may allocate (R)AN 105 N3 tunnel information for the PDU session. In case of dual connectivity, the master RAN 105 node may assign some (zero or more) QFIs to be setup to a master RAN 105 node and others to the secondary RAN 105 node. The AN tunnel info may comprise a tunnel endpoint for one or more involved RAN 105 nodes, and the QFIs assigned to one or more tunnel endpoints. A QFI may be assigned to either the master RAN 105 node or the secondary RAN 105 node. In an example, (R)AN 105 may forward the NAS message 1310 (PDU session ID, N1 SM container (PDU session establishment accept)) to the UE 100. The (R)AN 105 may provide the NAS message to the UE 100 if the necessary RAN 105 resources are established and the allocation of (R)AN 105 tunnel information are successful.

In an example, the N2 PDU session response 1320 may comprise a PDU session ID, cause, N2 SM information (PDU session ID, AN tunnel info, list of accepted/rejected QFI(s)), and/or the like. In an example, the AN tunnel info may correspond to the access network address of the N3 tunnel corresponding to the PDU session.

In an example, the AMF 155 may forward the N2 SM information received from (R)AN 105 to the SMF 160 via a Nsmf_PDUSession_UpdateSMContext request 1330 (comprising: N2 SM information, request type, and/or the like). In an example, if the list of rejected QFI(s) is included in N2 SM information, the SMF 160 may release the rejected QFI(s) associated QoS profiles.

In an example, the SMF 160 may initiate an N4 session modification procedure 1335 with the UPF 110. The SMF 160 may provide AN tunnel info to the UPF 110 as well as the corresponding forwarding rules. In an example, the UPF 110 may provide an N4 session modification response 1335 to the SMF 160160.

In an example, the SMF 160 may send to the AMF 155 an Nsmf_PDUSession_UpdateSMContext response 1340 (Cause). In an example, the SMF 160 may subscribe to the UE 100 mobility event notification from the AMF 155 (e.g. location reporting, UE 100 moving into or out of area of interest), after this step by invoking Namf_EventExposure_Subscribe service operation. For LADN, the SMF 160 may subscribe to the UE 100 moving into or out of LADN service area event notification by providing the LADN DNN as an indicator for the area of interest. The AMF 155 may forward relevant events subscribed by the SMF 160.

In an example, the SMF 160 may send to the AMF 155, a Nsmf_PDUSession_SMContextStatusNotify (release) 1345. In an example, if during the procedure, any time the PDU session establishment is not successful, the SMF 160 may inform the AMF 155 by invoking Nsmf_PDUSession_SMContextStatusNotify (release) 1345. The SMF 160 may releases any N4 session(s) created, any PDU session address if allocated (e.g. IP address) and may release the association with the PCF 135.

In an example, in case of PDU type IPv6, the SMF 160 may generate an IPv6 Router Advertisement 1350 and may send it to the UE 100 via N4 and the UPF 110.

In an example, if the PDU session may not be established, the SMF 160 may unsubscribe 1360 to the modifications of session management subscription data for the corresponding (SUPI, DNN, S-NSSAI), using Nudm_SDM_Unsubscribe (SUPI, DNN, S-NSSAI), if the SMF 160 is no more handling a PDU session of the UE 100 for this (DNN, S-NSSAI). In an example, if the PDU session may not be established, the SMF 160 may deregister 1360 for the given PDU session using Nudm_UECM_Deregistration (SUPI, DNN, PDU session ID).

Figure 14:
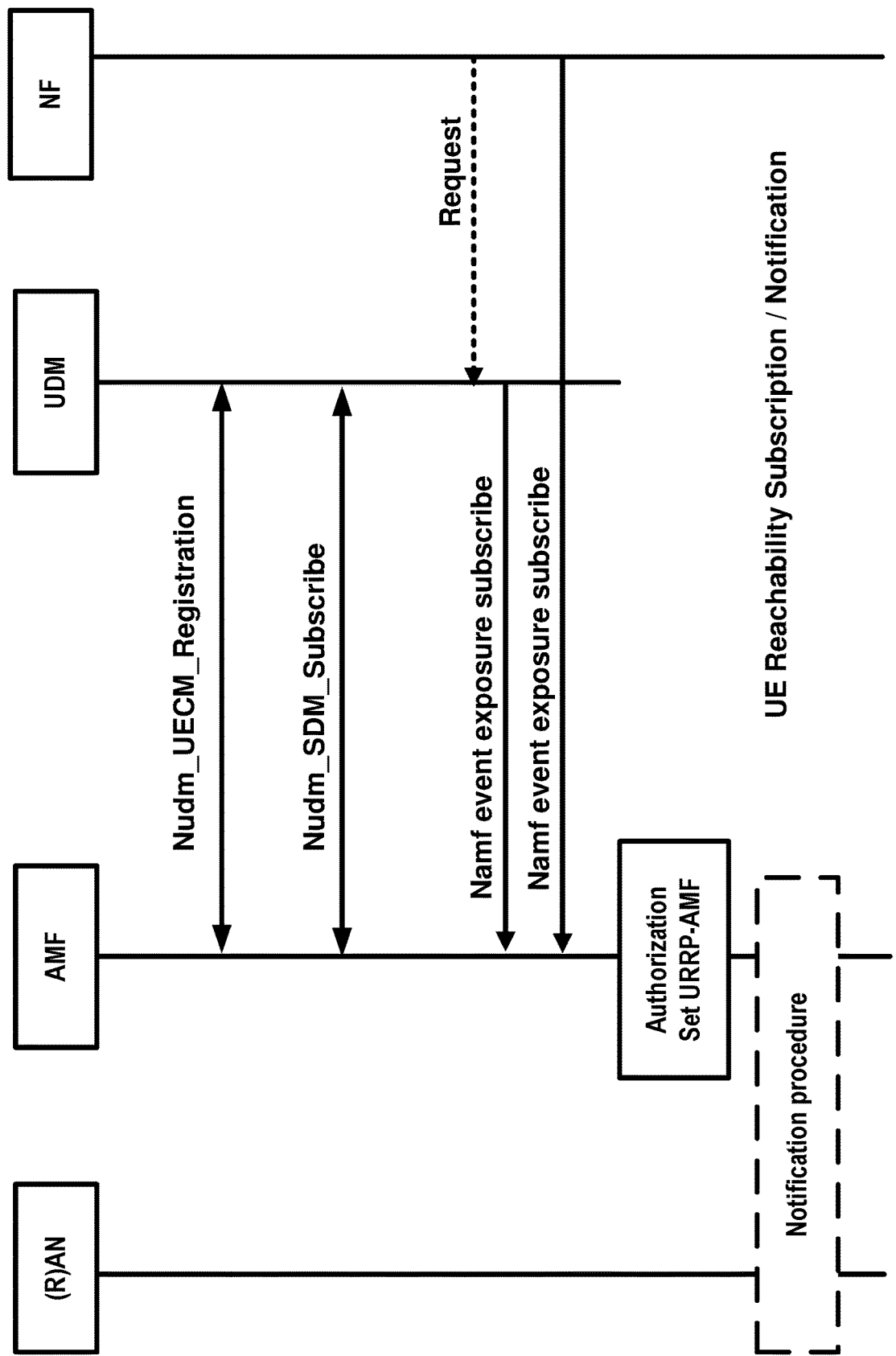
FIG. 14 is an example call flow as per an aspect of an embodiment of the present disclosure.

In an example embodiment as depicted in example FIG. 14, a UE reachability notification procedure may be employed.

In an example, during a registration or subscription update procedure, a UDM may inform an AMF of the identities (e.g. FQDNs, NF ID, and/or the like) of the network functions (NF) that are authorized to request notifications on the reachability of the UE via a registration service procedure such as Nudm_UECM_Registration, Nudm_SubscriberData_Update service operation, and/or the like.

In an example, if a service-related entity requests the UDM to provide an indication regarding UE reachability, the UDM may check that the service-related entity is authorized to perform this request on the subscriber associated to the UE. In an example, if the entity is not authorized, the request may be rejected (e.g. if the requesting entity is recognized as being a valid entity, but not authorized for that subscriber) or silently discarded (e.g. if the requesting entity is not recognized).

In an example, the UDM may store the identity of the service-related entity and may set the URRP-AMF parameter to indicate that such request is received. If the value of URRP-AMF parameter has changed from "not set" to "set", the UDM may initiate Namf_EventExposure_Subscribe_service operation (URRP-AMF) towards the AMF. The UDM may indicate if direct notification to the NF may be used. In an example, the UDM may trigger UE reachability notification request procedure with two different AMFs for the UE which may be connected to 5G core network over 3GPP access and non-3GPP access simultaneously. In an example, the UDM may trigger UE reachability notification request procedure with a mobility management entity, MME.

In an example, the AMF may check that the requesting entity is authorized to perform the request on the subscriber. In an example, if the entity is not authorized, the request may be rejected (e.g. if the requesting entity is recognized as being a valid entity, but not authorized for the subscriber) or silently discarded (e.g. if the requesting entity is not recognized).

In an example, if the AMF has a MM Context for the user or the UE, the AMF may set URRP-AMF to indicate the need to report to the UDM information regarding changes in UE reachability, e.g. when the next NAS activity with that UE is detected.

In an example, if the UE state in the AMF is CM-CONNECTED state, the AMF may initiate N2 notification procedure with reporting type set to single RRC-Connected state notification.

Figure 15:
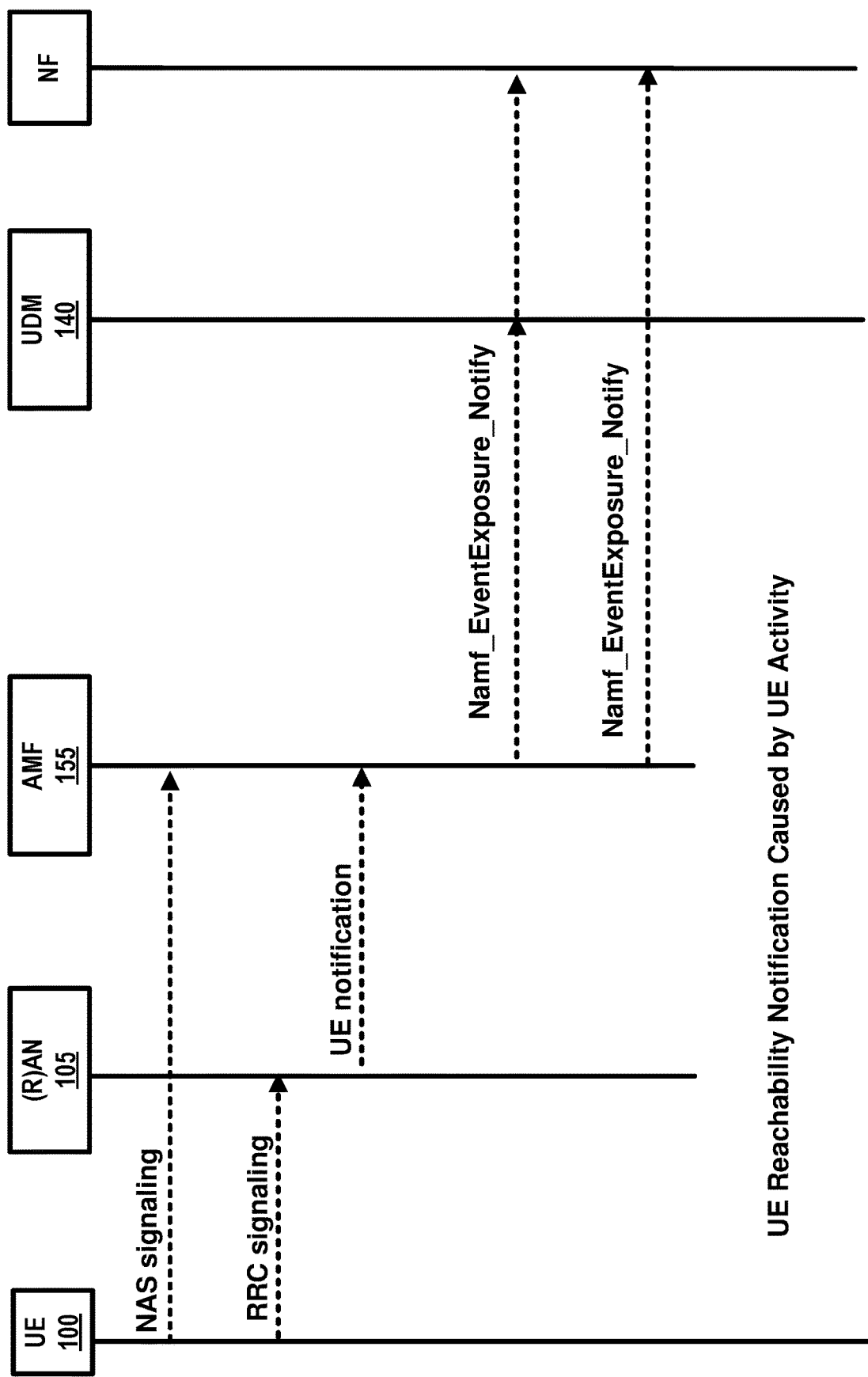
FIG. 15 is an example call flow as per an aspect of an embodiment of the present disclosure.

In an example embodiment as depicted in example FIG. 15, a UE activity notification procedure may be employed for reachability of a UE.

In an example, an AMF may receive an (N1) NAS signaling for a UE in CM-IDLE that may imply UE reachability, e.g. a registration request or service request message from the UE. In an example, AMF may receive an (N2) UE Notification or an (N2) Path Switch Request from the RAN for a UE in CM-CONNECTED state.

In an example, if the AMF has a MM context for the UE and the URRP-AMF is set to report once that the UE is reachable, the AMF may initiate a notification e.g., an Namf_EventExposure_Notify service operation (e.g., comprising SUPI, UE-Reachable, and/or the like) message to the UDM or directly to the NF (if previously indicated to the AMF). The AMF may clear the corresponding URRP-AMF for the UE.

In an example, when the UDM receives the Namf_EventExposure_Notify service operation (SUPI, UE-Reachable) message or Nudm_UECM_Registration service for a UE that has URRP-AMF set, the UDM may trigger appropriate notifications to the NFs (e.g. SMSF or SMS-GMSC, NEF, and/or the like) that have subscribed to the UDM for the reachability notification.

Figure 16:
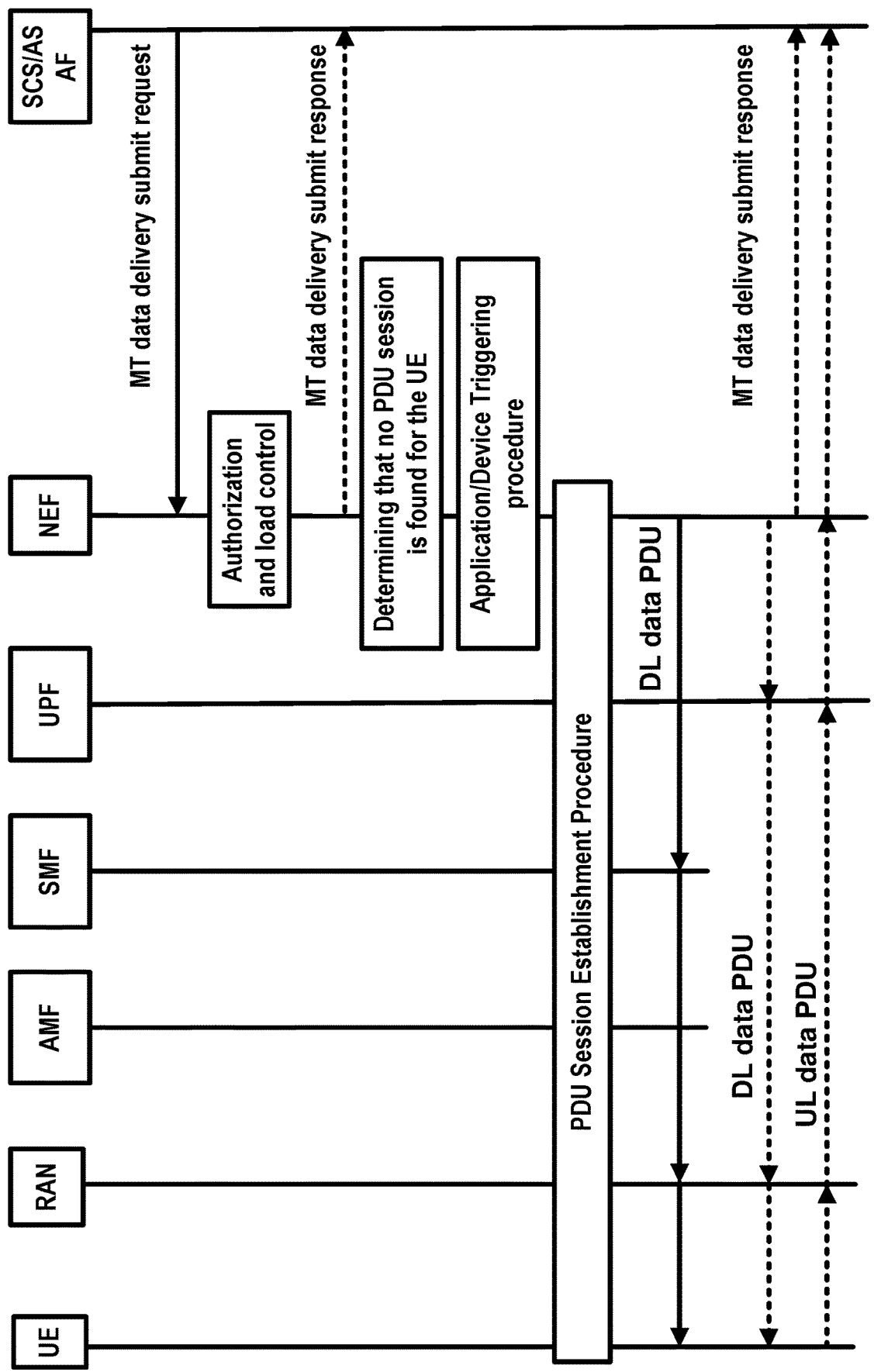
FIG. 16 is an example call flow as per an aspect of an embodiment of the present disclosure.

In an example embodiment as depicted in example FIG. 16, the 5GS may support unstructured data transmission or non-IP data delivery transmission (NIDD). The UE may support a NIDD client, for delivery of Unstructured (Non-IP) data. The SCS/AS or AF may send and receive messages to/from a given UE identified by an External Identifier, MSISDN, and/or the like. The UE may have an Unstructured PDU session activated and the message on the Nm or T8 API may be mapped to DL non-IP data PDU or from UL non-IP data PDU delivered to/from the UE. In an example, for the direct model case, the DL and UL data PDUs may be transmitted directly between the UPF and the SCS/AS or AF.

In an example, an SCS/AS or AF may send a MT submit request with small data using T8 API, Nm API, and/or the like to a NEF.

The NEF may determine the UE based on established connections and the external identifier or MSISDN included in the MT submit request. The NEF may perform authorization and quota checks. If there is no established connection corresponding to the external identifier or MSISDN, NEF may send a MT submit response with appropriate error cause value. In an example, if there is no established connection corresponding to the external identifier or MSISDN, the NEF may perform device triggering towards the UE to establish a connection.

The NEF may send a DL data PDU towards the UE using the IP address associated with the connection established by the UE. If the NEF expects no acknowledgement on the message with the DL data PDU, the NEF may send a MT submit response to the SCS/AS informing that an unacknowledged transmission to the UE has been made.

In an example, the UE may send an UL data PDU to the NEF. The NEF may determine if the received UL data is an acknowledgement of the DL data. If the UL data PDU is an acknowledgement, the NEF may send a MT Submit Response to the SCS/AS informing that an acknowledged transmission to the UE has been made.

In an example embodiment, a reliable data service (RDS) may be used by the UE and NEF for reliable (small) data delivery of unstructured PDU. The RDS may provide a mechanism for the NEF to determine if the data was successfully delivered to the UE and for the UE to determine if the data was successfully delivered to the NEF. In an example, when a requested acknowledgement is not received, the reliable data service may retransmit the packet. In an example, the RDS may employ NAS transport between the UE and the AMF for small data delivery. This may apply to both 3GPP and non-3GPP accesses. In an example, the RDS may require support for the AMF determining the NEF for a UE. In an example, the NEF may support subscription checking and actual transmission of MO/MT small data delivery by the NEF to the AF/UE. In an example, the RDS may support MO/MT small data delivery for both roaming and non-roaming scenarios, unstructured PDU, and/or API exposure for reliable data service towards third party application providers.

In an example, during a registration procedure, a UE may provide RDS supported indication over NAS signaling indicating the UE's capability for support of RDS. In an example, the RDS supported indication may indicate whether the UE may support reliable small data delivery over NAS via 3GPP access or via both 3GPP and non-3GPP access. If the core network supports RDS functionality, the AMF may include RDS supported indication to the UE, and whether RDS delivery over NAS via 3GPP access or via both the 3GPP and non-3GPP access is accepted by the network.

In an example, RDS packets may be transmitted over NAS without the need to establish data radio bearers, via NAS transport message, which can carry RDS payload. PDU session establishment may not be needed. The UE and network may support RDS protocol. In an example, when the RDS is enabled, a protocol may be used between the end-points, e.g., between the UE and the NEF. The protocol may employ an RDS header to identify if the packet requires no acknowledgement, requires an acknowledgement, or is an acknowledgment and to allow detection and elimination of duplicate PDUs at the receiving endpoint. In an example, port numbers in the header may be used to identify the application on the originator and to identify the application on the receiver.

In an example embodiment, an application function, an application server, and/or the like, may request a trigger for a wireless device, or an application on the wireless device to perform an action, such as a PDU session establishment, NIDD connection/session establishment, transmit data, and/or the like. The application function may submit the request via a network exposure function (NEF). The NEF may employ a session management function (SMF) for delivery of the trigger that comprises a trigger payload. The trigger payload comprises a set of actions for the wireless device or the application on the wireless device. Based on a local configuration, the NEF may employ the SMF for the trigger. Implementation of an example embodiment may increase network resource utilization efficiency by reducing unnecessary signaling procedures.

In an example embodiment, the network may support a device/application triggering procedure. The device/application triggering procedure may comprise a device triggering or application triggering message.

In an example, the device triggering or application triggering message may comprise information that may allow a network to route messages to a wireless device or a UE. In an example, the UE may route the message to an application. The triggering message may comprise a trigger indication, information to route the triggering message, trigger payload, and/or the like. A trigger payload may comprise information destined to the application. In an example, the application in the UE may perform actions indicated by the trigger payload when the trigger payload is received at the UE. For example, the action may comprise initiation of immediate or later communication with an application server or an application function, and/or the like based on the information contained in the trigger payload. In an example, the action may comprise a PDU session establishment procedure if the related PDU session is not already established.

As depicted in example FIG. 16, the SCS/AS, or an application function (AF) may send a MT NIDD submit request (external identifier or MSISDN, non-IP data, priority, PDN/PDU connection establishment option) message to a NEF. A maximum latency parameter may be employed as a field that is used to indicate maximum delay acceptable for downlink data and may be used to configure the buffer duration. A maximum latency of 0 may indicate that buffering is not allowed. If maximum latency is not provided, the NEF may determine the acceptable delay based on local polices. Priority may be employed to indicate the priority of the non-IP data packet relative to other non-IP data packets. PDU/PDN connection establishment option may be employed to indicate what the NEF or the SMF may do if the UE has not established a PDU session (e.g., wait for the UE to establish a PDU session, respond with an error cause, send a device/application trigger, and/or the like). If PDU session establishment option or PDN connection establishment option is not provided with the non-IP packet, the NEF may use the PDU session establishment option or the PDN connection establishment option that was provided during NIDD configuration to decide how to handle the absence of a PDU session.

The NEF or the SMF may determine the PDU session based on the S-NSSAI and DNN associated with the NIDD configuration and the user identity. If a PDU session context has been found but the non-IP packet size is larger than the maximum packet size that was provided to the SCS/AS during NIDD Configuration, the SMF may send a NIDD submit response (cause) with a cause value indicating the reason for the failure condition.

In an example, if no PDU session is found, then the NEF may send a NIDD submit response (cause) with appropriate error cause value, or perform/invoke the device/application triggering procedure towards the UE to establish a PDU session. The NEF may use a priority to configure the priority of the device trigger and may use maximum latency to configure the validity period of the device trigger. The NEF may send a NIDD submit response (buffered indication, trigger indication, cause) with an appropriate cause value. The buffered indication may indicate if the NEF buffered the non-IP data. The trigger indication may be employed to indicate that a trigger was sent in order to establish the PDU session.

In an example, if a PDU session context corresponding to the external identifier or MSISDN is found but the UE is currently not reachable, then the NEF may inform the SCS/AS about the unreachability of the UE. The NEF may provide information when the transmission may be attempted again (re-requested re-transmission time) based on how long the UE is expected to be unreachable. In an example, the NEF may employ a UE reachability service operation provided by an AMF.

In an example, the SMF may buffer the (downlink) data and wait for the UE to become reachable.

If the UE is reachable, the NEF may send the downlink data to the SMF. The SMF may encapsulate the downlink data as payload in an SM data transfer message (e.g., a NAS message, SM-NAS, NAS-SM, and/or the like). In an example, the SMF may forward the SM data transfer message, and the PDU session ID to the AMF (e.g., using the Namf_Communication_N1N2MessageTransfer service operation). Downlink data may be delivered to the UE and the SMF may send an MT NIDD submit response to the SCS/AS via the NEF. In an example, uplink data, if available, may be sent to the SCS/AS.

Figure 17:
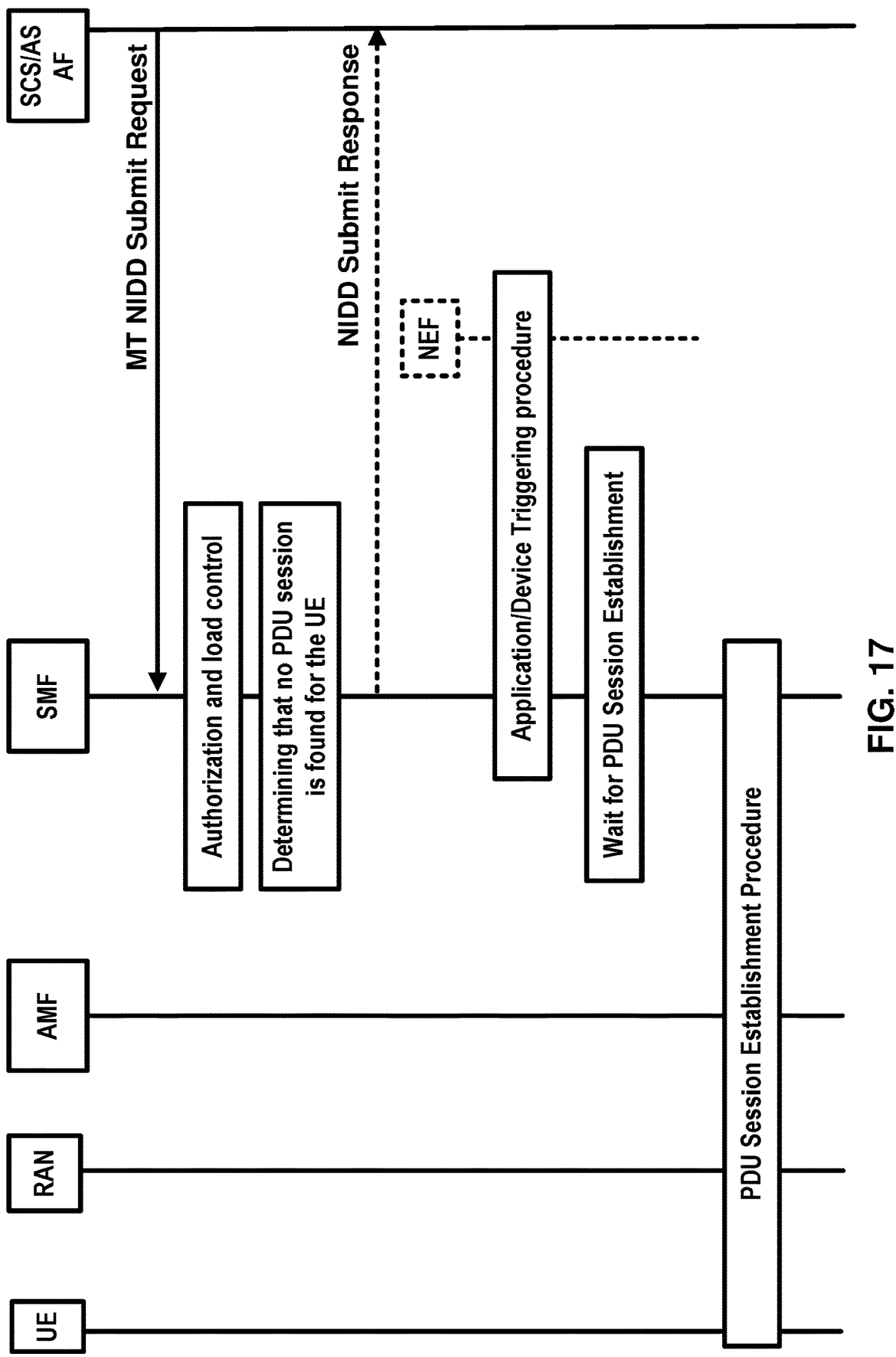
FIG. 17 is an example call flow as per an aspect of an embodiment of the present disclosure.

As depicted in example FIG. 17, the SCS/AS, or an application function (AF) may send a MT NIDD submit request (external identifier or MSISDN, non-IP data, priority, PDN/PDU connection establishment option) message to a SMF. A maximum latency parameter may be employed as a field that is used to indicate maximum delay acceptable for downlink data and may be used to configure the buffer duration. A maximum latency of 0 may indicate that buffering is not allowed. If maximum latency is not provided, the SMF may determine the acceptable delay based on local polices. Priority may be employed to indicate the priority of the non-IP data packet relative to other non-IP data packets. PDU/PDN connection establishment option may be employed to indicate what the SMF should do if the UE has not established the PDU session (e.g., wait for the UE to establish a PDU session, respond with an error cause, send a device/application trigger, and/or the like). If PDU session establishment option or PDN connection establishment option is not provided with the non-IP packet, the SMF may use the PDU session establishment option or the PDN connection establishment option that was provided during NIDD configuration to decide how to handle the absence of a PDU session.

The SMF may determine the PDU session based on the S-NSSAI and DNN associated with the NIDD configuration and the user identity. If a PDU session context has been found but the non-IP packet size is larger than the maximum packet size that was provided to the SCS/AS during NIDD Configuration, the SMF may send a NIDD submit response (cause) with a cause value indicating the reason for the failure condition.

In an example, if no PDU session is found, then the SMF may send a NIDD submit response (cause) with appropriate error cause value, or perform/invoke the device/application triggering procedure towards the UE (e.g., via the NEF, or via the AMF, and/or as described in example embodiments) to establish a PDU session. The SMF may use priority to configure the priority of the device trigger and may use maximum latency to configure the validity period of the device trigger. The SMF may send a NIDD submit response (buffered indication, trigger indication, cause) with an appropriate cause value. The buffered indication may indicate if the SMF buffered the non-IP data. The trigger indication may be employed to indicate that a trigger was sent in order to establish the PDU session.

In an example, if a PDU session context corresponding to the identifier of the UE or the external identifier or MSISDN is found but the UE is currently not reachable, then the SMF may inform the SCS/AS about the unreachability of the UE. The SMF may provide information when the transmission may be attempted again (re-requested re-transmission time) based on how long the UE is expected to be unreachable.

In an example, the SMF may buffer the (downlink) data and wait for the UE to become reachable.

If the UE is reachable, the SMF encapsulates the downlink data as payload in an SM data transfer message. In an example, the SMF may forward the SM data transfer message, and the PDU session ID to the AMF (e.g., using the Namf_Communication_N1N2MessageTransfer service operation). Downlink data may be delivered to the UE and the SMF may send an MT NIDD submit response to the SCS/AS. In an example, uplink data, if available, may be sent to the SCS/AS.

Figure 18:
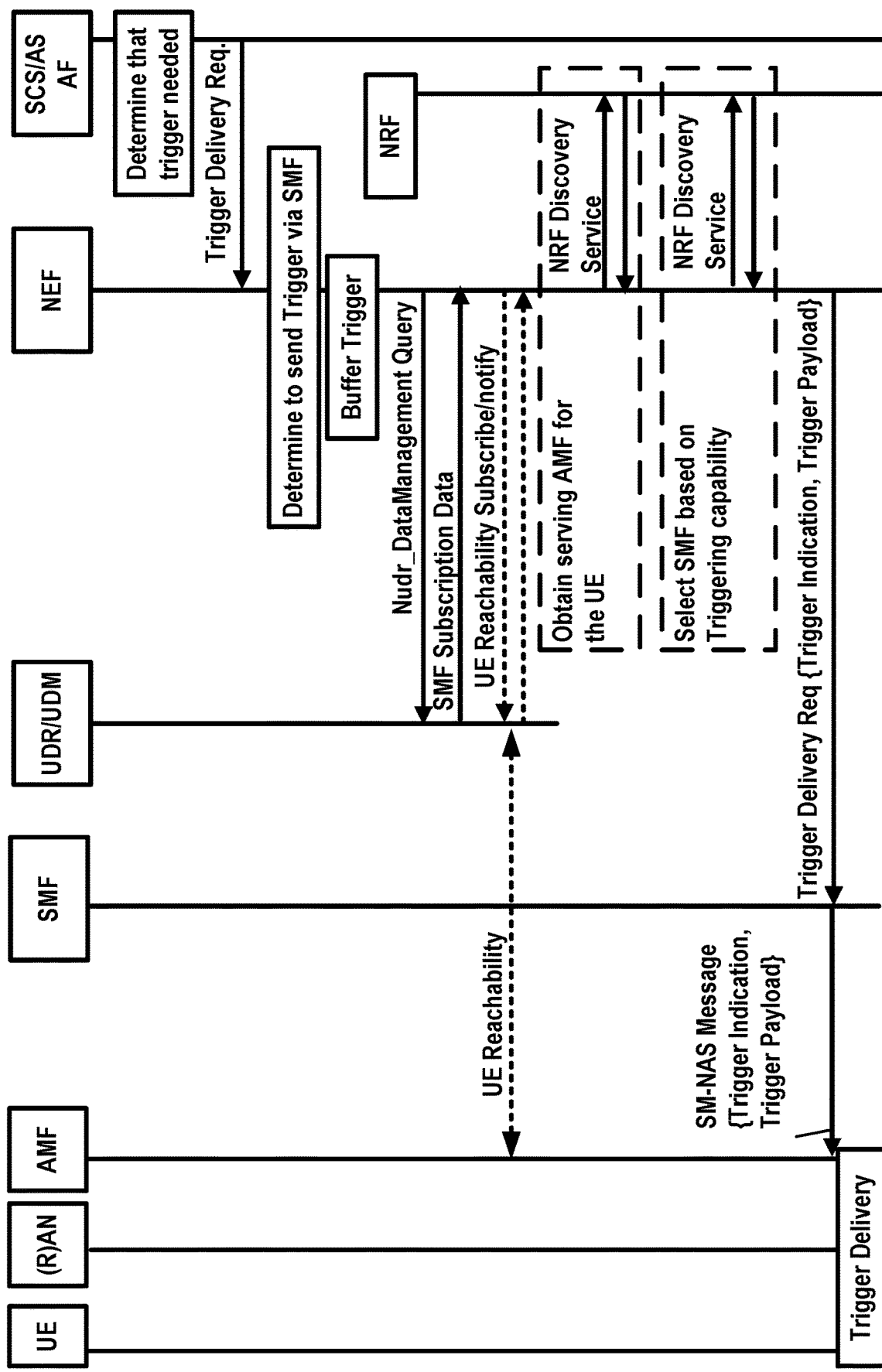
FIG. 18 is an example call flow as per an aspect of an embodiment of the present disclosure.
Figure 19:
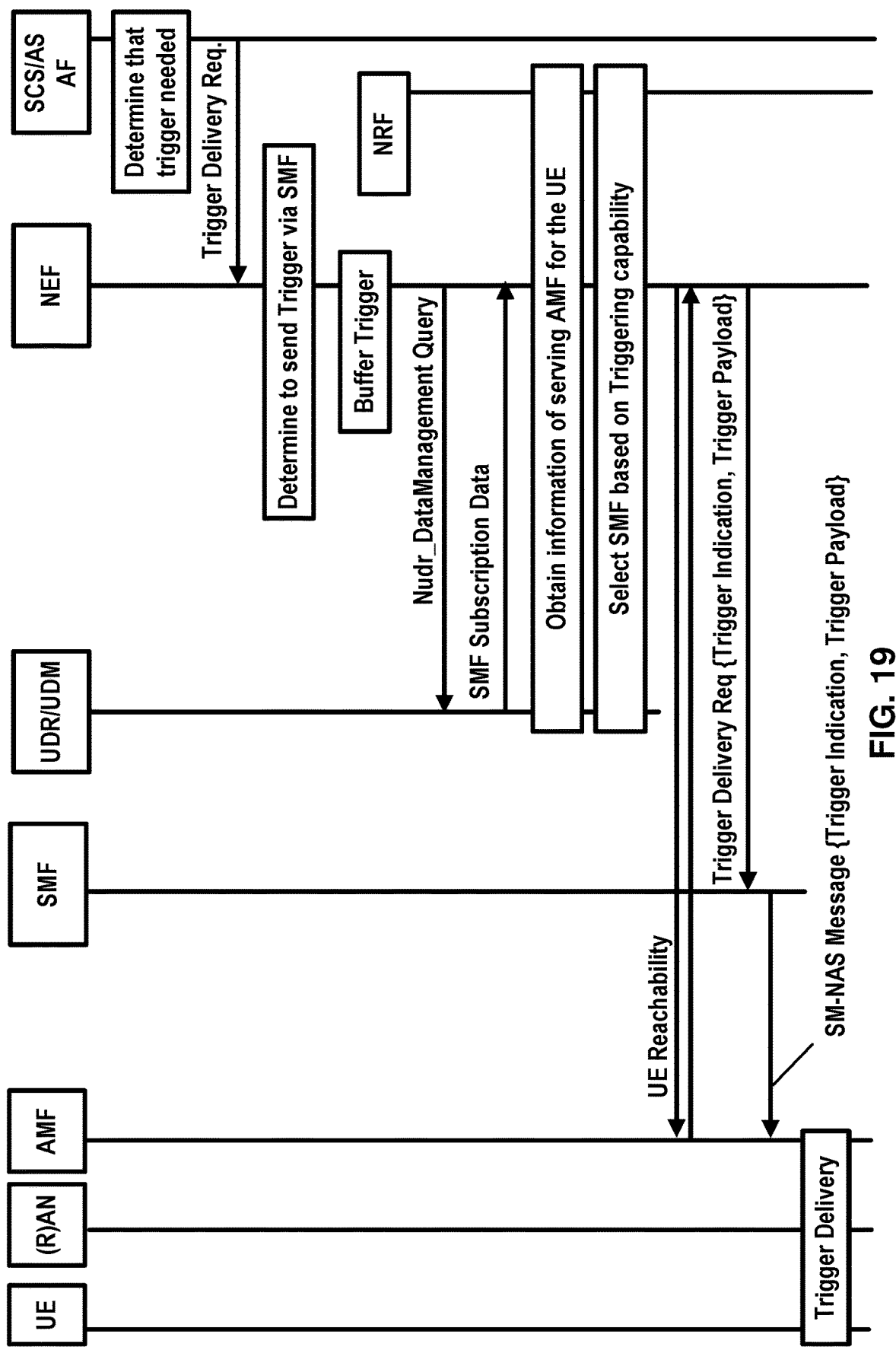
FIG. 19 is an example call flow as per an aspect of an embodiment of the present disclosure.

In an example embodiment as depicted in FIG. 18 and FIG. 19, an application function may invoke the device triggering procedure to send a trigger to an application on wireless device to perform an action. The action may be establishment of a PDU session, an NIDD connection establishment, transmission of data, and/or the like. In an example, a network exposure function (NEF) may receive from the AF, a first request message for delivery of a trigger to the wireless device. The first request message may comprise a trigger payload. The trigger payload may comprise information for an application on the wireless device to establish a packet data unit (PDU) session. The NEF may select, a session management function (SMF) for transmitting the trigger payload to the wireless device. The NEF may send to the SMF, a second request message for delivery of the trigger to the wireless device. The second request message may comprise a trigger indication identifying the second request message carries the trigger payload, the trigger payload, and/or the like. The NEF may receive from the SMF, a connection request for establishing the PDU session for the application based on the trigger payload.

In an example embodiment, an application function, application server, and/or the like may send the first request message to a network exposure function (NEF). In an example, the first request message may be a trigger delivery request message, a device triggering, an application triggering (request), a trigger request, and/or the like. In an example, the trigger delivery request message may indicate a trigger request (e.g., application trigger, device trigger, and/or the like) for a wireless device. In an example, the trigger delivery request message may employ a service by the NEF (e.g., Nnef_Trigger_Delivery request, and/or the like). In an example, an application programming interface (API) may be employed by the AF to submit a trigger delivery request via the NEF. In an example, the trigger delivery request message may comprise a trigger payload, an indication for the trigger delivery via the SMF, a trigger reference number, an identifier of the application function, a priority indication, a validity period, a generic public subscription identifier (GPSI) of the wireless device, an identifier of the UE (UE ID), and/or the like.

In an example, the NEF may check whether the AF is authorized to send trigger requests and that the AF has not exceeded its quota or rate of trigger submission over Nnef. If this check fails, the NEF may send an Nnef_Trigger_Request response with a cause value indicating the reason for the failure condition.

In an example, the NEF may invoke to a UDM or a UDR, a query e.g., a Nudm_SDM_Get message. The query may comprise: an identifier translation, GPSI, an identifier of the AF, and/or the like to resolve the GPSI to SUPI. In an example, the UDM may invoke to a UDR, a query service (e.g., Nudr_DM_Query service, and/or the like) to retrieve a list of AFs that are allowed to trigger the UE and may determines, based on UDM policy, which identifier (SUPI or MSISDN) may be used to trigger the UE. The UDM may provide to the NEF, a Nudm_SDM_Get response comprising: a SUPI, a MSISDN, and/or the like. If the AF is not allowed to send a trigger message to this UE, or there is no valid subscription information for the UE or AF, the NEF may send an Nnef_Trigger_Request response with a cause value indicating the reason for the failure condition. In an example, the presence of an MSISDN in the response may indicate to the NEF that MSISDN may be employed to identify the UE. In an example, IMSI may be provided by the UDM and may be employed to identify the UE.

In an example, the NEF may determine to employ a SMF for delivery of the trigger request. In an example, the NEF may invoke to the UDM, a Nudm_UECM_Get message comprising the SUPI, and/or SMF to indicate that retrieval of a SMF (SMF ID) for the UE is requested. In an example, the UDM may invoke the Nudr_DM_Query service to retrieve the UE SMF identities. The UDM provides a Nudm_UECM_Get response with the corresponding UE SMF identities. UDM policy (possibly dependent on the VPLMN ID) may determine/influence which SMF serving node identities may be returned. In an example, the NEF may buffer/cache serving SMF node information for the UE. In an example, the NEF may select a suitable SMF based on configured information.

In an example, the NEF may be an MTC-IWF. The NEF may send a submit trigger request message. The submit trigger request message may comprise the GPSI, the SUPI, AF identifier, a trigger reference number, validity period, priority, SMF ID(s), the trigger payload, the trigger indication, and/or the like to the SMF.

In an example, if the NEF indicates that absent subscriber indication was received from the UDM, the NEF may not send the submit trigger request message. The NEF may store/buffer the trigger request message.

In an example, the SMF may send to the NEF a submit trigger confirm message to the to confirm that the submission of the trigger has been accepted by the SMF. The NEF may send a Nnef_Trigger_Delivery response to the AF to indicate if the device trigger request has been accepted for delivery to the UE.

In an example, the NEF may obtain/select/determine the serving AMF for the UE. In an example, the submit trigger request message (sent from NEF to the SMF) may comprise an identifier of the AMF, an address of the AMF, and/or the like.

In an example, the NEF or SMF may obtain/select/determine the AMF that serves the UE. The NEF or the SMF may employ/utilize an NRF, UDM, UDR, and/or the like to discover and/or select the AMF (instance(s)). In an example, the AMF(s) that may support the UE may be available locally or configured locally in the NEF or the SMF. The NRF may provide an identifier of the AMF, an address (e.g., IP address, FQDN, and/or the like) of AMF instance(s) or endpoint address(es) of AMF service instance(s), and/or the like to the NEF or to the SMF. In an example, the NEF or the SMF may employ/utilize a GUAMI, a TAI, and/or the like to discover the AMF instance(s) and the NRF may provide the IP address, or the FQDN of the associated AMF instance(s) or the endpoint address(es) of the associated AMF service instance(s) if it is available. If the associated AMF is unavailable due to AMF planned removal, a backup AMF may be employed for planned removal may be provided by the NRF. If the associated AMF is unavailable due to AMF failure, the backup AMF may be employed for failure is provided by the NRF. If no AMF instances related to the indicated GUAMI may be found or AMF pointer value used by more than one AMF is found, a list of candidate AMF instances in the same AMF set with additional information (e.g. priority) may be provided by the NRF to the NEF or the SMF. In an example, the NRF may provide the TAI(s), if available. In an example, the NEF or the SMF may select any AMF instance from the list of candidate AMF instances.

In an example, the SMF may send an N11 message to an AMF. In an example, the SMF may receive an identifier of the AMF from the NEF. In an example, the SMF may select the AMF.

In an example, the N11 message may comprise an Namf_Communication_N1N2MessageTransfer, and/or the like. The Namf_Communication_N1N2MessageTransfer may comprise one or more elements of the submit trigger request message (e.g., the trigger indication, the trigger payload, and/or the like), the SUPI, a PDU session ID, N2 SM information (QFI(s), QoS profile(s), CN N3 Tunnel Info, S-NSSAI, paging policy indication), area of validity for N2 SM information, ARP, paging policy indication, 5QI, N1N2TransferFailure Notification Target Address, an N1 message, and/or the like.

In an example, the SMF may employ a non-access stratum (NAS) message for delivery of the device/application trigger. In an example, the NAS message may be a session management NAS (SM-NAS, NAS-SM, and/or the like).

In an example, the SMF may send to the AMF in response to receiving the submit trigger request message, a request over N11 interface (e.g., via an Namf service procedure API, and/or the like). The request (e.g. a trigger request) may comprise the GPSI, the SUPI, AF identifier, the trigger reference number, validity period, priority, the trigger payload, the trigger indication, and/or the like. The AMF may send the trigger request to the UE via a NAS message (e.g., NAS-MM, MM-NAS, and/or the like).

In an example, the SMF may provide the routing information that it received from the NEF to the AMF. The SMF may generate necessary charging data record (CDR) information and may include the AF identifier. In an example, AF information, and the trigger indication included in the N11 message may be employed to enable differentiated charging. In an example, the SMF may store/buffer/cache the trigger payload.

In an example, if the trigger delivery message fails (either directly or when validity period of the trigger message expires) or when the message delivery succeeds, the SMF may send a message delivery report (e.g., comprising a cause code, trigger reference number, AF identifier, and/or the like) to the NEF. The NEF may send/provide a Nnef_Trigger_DeliveryNotify message to the AF with a delivery report indicating the trigger delivery outcome/result (e.g. succeeded, unknown or failed and the reason for the failure, and/or the like). The NEF may generate necessary CDR information including the GPSI and AF identifier.

In an example, in response to the received device trigger, the UE may take one or more actions and may take into consideration the content of the trigger payload. In an example, the action may comprise initiation of immediate or later communication with the AF, establishment of a PDU session for IP, non-IP, ethernet, unstructured data, sending data packets, and/or the like. In an example, the action may comprise a push notification from a AS, SCS/AS, AF and/or the like.

In an example, the SMF may invoke Namf_MT_EnableUEReachability service operation to AMF. The AMF may page the UE. In an example, the UE may respond to the paging with the service request procedure. In an example, the SMF may subscribe to the reachability of the UE via the AMF (e.g., Namf_MT_EnableUEReachability, and/or the like).

In an example, if the UE access to the AMF via both 3GPP access and non-3GPP access, the AMF may determine the access type to transfer the NAS message (comprising the trigger) based on operator local policy.

In an example, when the NEF receives the trigger request or the trigger delivery request, the NEF may obtain the AMF information that serves the UE. The NEF may determine via the AMF that the wireless device is not reachable. The NEF may employ the UE reachability procedure (e.g., via the AMF and Namf_MT_EnableUEReachability, and/or the like). In an example, the NEF may send a request to the AMF to subscribe to notifications on the reachability of the UE via Namf_EventExposure_Subscribe_service operation provided by the AMF. In an example, the Namf_EventExposure_Subscribe message may comprise: an identifier of the NEF (NEF ID), target of the subscription: identifier of UE(s) (e.g., SUPI or Internal Group Identifier or indication that any UE is targeted, and/or the like), (set of) event ID(s) such as are of interest, access type, location, reachability, and/or the like. In an example, when the AMF receives the Namf_EventExposure_Subscribe_service operation from the NEF, (or the UDM indicates that the notification needs to be sent to the NEF), the AMF may initiate the Namf_EventExposure_Notify service operation (SUPI, UE-Reachable) message directly to the NEF.

In an example, the NEF may buffer the trigger. When the UE becomes reachable, the AMF may notify the NEF that the UE is reachable.

In an example embodiment, the NEF may determine to send the trigger (e.g., trigger message) via a SMF based on whether the short messaging service (SMS) is supported, based on a local configuration, policy, and/or the like. In an example, when the SMS is not supported by the network or not allowed for the UE based on subscription, policy and/or the like, the NEF may determine to send the trigger via the SMF. The NEF may select the SMF based on an identifier of the UE (UE ID), subscriber permanent identifier (SUPI), GPSI, DNAI, S-NSSAI, location information of the UE, subscribed DNN list, default DNN, subscription information of the UE, and/or the like.

In an example, the NEF may select the SMF based on query from a UDR, UDM, NRF, and/or the like. The NEF may query the UDR, UDM, and/or the NRF and provided one or more identifier of the UE, type of requested service (e.g., device/application triggering service), and/or the like. The UDR/UDM may send to the NEF, UE subscription data, and one or more data sets to assist the NEF to select the SMF and determine the AMF that is serving the UE.

In an example, the NEF may send a query to a UDM to determine the SMF and/or the AMF that serves the UE. In an example, the NEF may invoke a Nudm_UEContextManagement_Get service operation. The service operation may comprise a query such as Nudm_UECM_Get message and/or the like. The query may comprise the UE ID, NF type (e.g., SMF, AMF, and/or the like), and/or the like. In an example, when the NF type is AMF, the query may further comprise an access type. In response to the query, the UDM may provide the SUPI, NF ID (SMF ID, AMF ID, and/or the like) of the NF corresponding to the NF type requested by the NEF.

In an example, the NEF may obtain from a UDR and/or a UDM, parameters for selecting the SMF. In an example, the NEF may invoke a UDR data management service operation. In an example, the UDR data management service operation may comprise a query service operation such as Nudr_DM_Query service. In an example, the NEF may send to the UDR a query message such as Nudr_DM_Query. The query message may comprise a SUPI, DNN, S-NSSAI, and/or the like. In an example, the UDR may provide the NEF in response to the query, SMF selection subscription data, AMF subscription data, UE context in SMF data, slice selection subscription data, session management information, status of a PDU session, an IP address of the UE, DNAI, N6 traffic routing information, and/or the like.

In an example, the NEF may select the SMF or the AMF by sending a query to a network repository function (NRF). In an example, a Nnrf_NFDiscovery service operation may be employed. The NEF may send a query (e.g., a Nnrf_NFDiscovery_Request) to the NRF. The query may comprise an capability information indicating the trigger service support requirement, one or more target NF service name(s) (e.g., SMF), NF type of the target NF, NF type of the NF service consumer (NEF), S-NSSAI and the associated NSI ID (if available), DNN, target NF/NF service PLMN ID, NRF to be used to select NFs/services within HPLMN, serving PLMN ID, the NF service consumer ID, AMF set, SUPI, data set identifier(s). (UE) IP address or (UE) IPV6 prefix, and/or the like.

In an example, the NRF may send to the NEF a query response. The query response may comprise FQDN of the SMF, IP address(es) or Endpoint Addresses for the target service name (e.g., SMF), or all the services supported by the SMF, NSI ID associated with the S-NSSAI, and/or the like.

In an example embodiment, the NEF may send to the SMF, the second request message requesting the trigger delivery for the wireless device. In an example, the second request message may comprise a trigger indication, the trigger payload, a trigger reference number, an identifier of the application function, a priority indication, a validity period, a generic public subscription identifier (GPSI) of the wireless device, a subscriber permanent identifier (SUPI) of the wireless device, and/or the like. In an example, the second request message may be a trigger request, a trigger delivery request, and/or the like. The trigger request may employ an API or a service by the SMF such as SMF trigger service operation.

Figure 20:
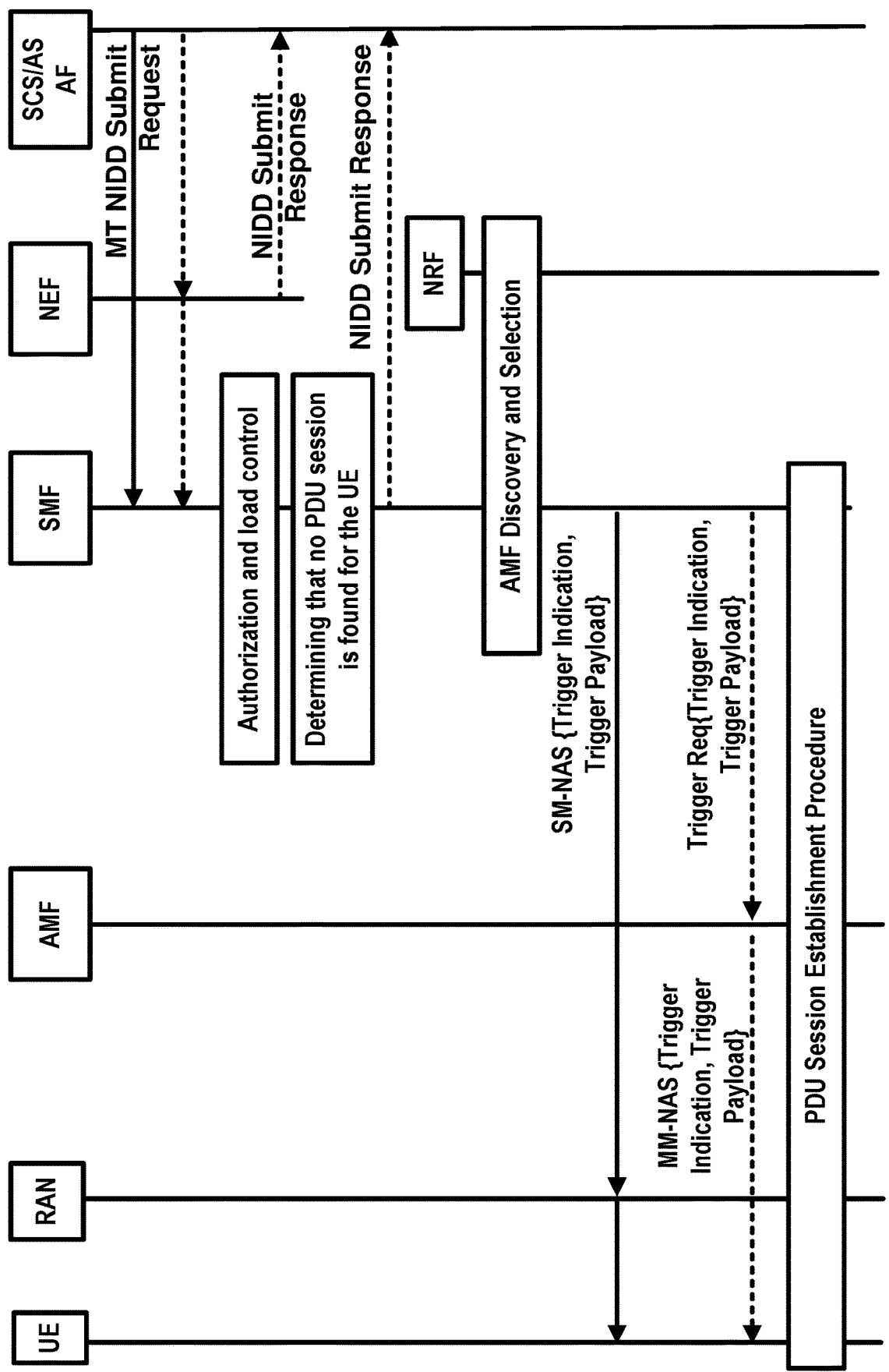
FIG. 20 is an example call flow as per an aspect of an embodiment of the present disclosure.

In an example embodiment as depicted in FIG. 20, an application function may invoke the device triggering procedure to send a trigger to an application on wireless device to perform an action. The action may be establishment of a PDU session, an NIDD connection establishment, transmission of data, and/or the like. In an example, a SMF may receive a request message for a delivery of a trigger to a wireless device. The request message may comprise a trigger payload comprising information for an application on the wireless device to establish a packet data unit (PDU) session, one or more actions, and/or the like, a trigger indication identifying the request message carries the trigger payload, an identifier of the wireless device (e.g., a UE ID, SUPI, GPSI, MSISDN, and/or the like). The SMF may send to an access and mobility management function (AMF), a reachability request message to request whether the wireless device identified by the identifier is reachable. The SMF may receive from the AMF, a response message indicating that the wireless device is reachable. In an example, the SMF may send to the wireless device via an access and mobility management function (AMF), a non-access stratum (NAS) message (e.g., SM-NAS, NAS-SM, and/or the like). The NAS message may comprise the trigger indication, the trigger payload, and/or the like. The SMF may receive from the wireless device via the AMF, a session establishment request for establishing the PDU session for the application based on the trigger payload. The SMF may send to the NEF, a connection request for establishing the PDU session for the application.

In an example embodiment, when the application function, application server, and/or the like sends the first request message to the network exposure function (NEF), the NEF may send a request message to the SMF. In an example, the request message may be the trigger delivery request message, the device triggering, the application triggering (request), the trigger request, and/or the like. In an example, the trigger delivery request message may indicate the trigger request (e.g., application trigger, device trigger, and/or the like) for the wireless device. In an example, the trigger delivery request message may employ the service by the SMF (e.g., Nsmf_Trigger_Delivery request, and/or the like). In an example, an application programming interface (API) may be employed by the NEF, AF and/or the AS to submit a trigger delivery request to the SMF (via the NEF). In an example, the trigger delivery request message may comprise a trigger payload, an indication for the trigger delivery via the SMF, a trigger reference number, an identifier of the application function, a priority indication, a validity period, a generic public subscription identifier (GPSI) of the wireless device, an identifier of the UE (UE ID), and/or the like.

In an example, the SMF may check whether the NEF or AF is authorized to send trigger requests and has not exceeded its quota or rate of trigger submission over Nsmf. If this check fails, the SMF may send an Nsmf_Trigger_Request response with a cause value indicating the reason for the failure condition.

In an example, the SMF may invoke to a UDM or a UDR, a query e.g., a Nudm_SDM_Get message. The query may comprise: an identifier translation, GPSI, an identifier of the AF, and/or the like to resolve the GPSI to SUPI. In an example, the UDM may invoke to a UDR, a query service (e.g., Nudr_DM_Query service, and/or the like) to retrieve a list of AFs that are allowed to trigger the UE and may determines, based on UDM policy, which identifier (SUPI or MSISDN) may be used to trigger the UE. The UDM may provide to the SMF, a Nudm_SDM_Get response comprising: a SUPI, a MSISDN, and/or the like. If the AF is not allowed to send a trigger message to this UE, or there is no valid subscription information for the UE or AF, the SMF may send an Nsmf_Trigger_Request response with a cause value indicating the reason for the failure condition. In an example, the presence of an MSISDN in the response may indicate to the SMF that MSISDN may be employed to identify the UE. In an example, IMSI may be provided by the UDM and may be employed to identify the UE.

In an example, the SMF may invoke to the UDM, a Nudm_UECM_Get message comprising the SUPI, SMF ID, indication that AMF information is requested, and/or the like to indicate that retrieval of a AMF (AMF ID) for the UE is requested. In an example, the UDM may invoke the Nudr_DM_Query service to retrieve/obtain the UE AMF identities. The UDM provides a Nudm_UECM_Get response with the corresponding UE AMF identities. UDM policy (possibly dependent on the VPLMN ID) may determine/influence which AMF(s) serving node identities may be returned. In an example, the SMF may select a suitable AMF based on configured information.

In an example, the NEF may be an MTC-IWF. The NEF may send a submit trigger request message (e.g., the request message). The submit trigger request message may comprise the GPSI, the SUPI, AF identifier, a trigger reference number, validity period, priority, SMF ID(s), the trigger payload, the trigger indication, and/or the like to the SMF.

In an example, if the SMF or the NEF indicates that absent subscriber indication was received from the UDM, the SMF or NEF may not send the submit trigger request message. The SMF or NEF may store/buffer the trigger request message.

In an example, the SMF may send to the NEF a submit trigger confirm message to the to confirm that the submission of the trigger has been accepted by the SMF. The NEF may send a Nnef_Trigger_Delivery response to the AF to indicate if the device trigger request has been accepted for delivery to the UE.

In an example, the SMF may obtain/select/determine the serving AMF for the UE. In an example, if the NEF selects the AMF, the submit trigger request message (sent from NEF to the SMF) may comprise an identifier of the AMF, an address of the AMF, and/or the like.

In an example, SMF may obtain/select/determine the AMF that serves the UE. The SMF may employ/utilize an NRF to discover and/or select the AMF (instance(s)). In an example, the AMF(s) that may support the UE may be available locally or configured locally in the SMF. The NRF may provide an identifier of the AMF, an address (e.g., IP address, FQDN, and/or the like) of AMF instance(s) or endpoint address(es) of AMF service instance(s), and/or the like to the SMF. In an example, the SMF may employ/utilize a GUAMI, a TAI, and/or the like to discover the AMF instance(s) and the NRF may provide the IP address, or the FQDN of the associated AMF instance(s) or the endpoint address(es) of the associated AMF service instance(s) if it is available. If the associated AMF is unavailable due to AMF planned removal, a backup AMF may be employed for planned removal may be provided by the NRF. If the associated AMF is unavailable due to AMF failure, the backup AMF may be employed for failure is provided by the NRF. If no AMF instances related to the indicated GUAMI may be found or AMF pointer value used by more than one AMF is found, a list of candidate AMF instances in the same AMF set with additional information (e.g. priority) may be provided by the NRF the SMF. In an example, the NRF may provide the TAI(s), if available. In an example, the SMF may select any AMF instance from the list of candidate AMF instances.

In an example, the SMF may send an N11 message to the AMF. In an example, the N11 message may comprise an Namf_Communication_N1N2MessageTransfer. The Namf_Communication_N1N2MessageTransfer may comprise one or more elements of the submit trigger request message (e.g., the trigger indication, the trigger payload, and/or the like), the SUPI, a PDU session ID, N2 SM information (QFI(s), QoS profile(s), CN N3 Tunnel Info, S-NSSAI, paging policy indication), area of validity for N2 SM information, ARP, paging policy indication, 5QI, N1N2TransferFailure Notification Target Address, an N1 message, and/or the like.

In an example, the SMF may employ a non-access stratum (NAS) message for delivery of the device/application trigger. In an example, the NAS message may be a session management NAS (SM-NAS, NAS-SM, and/or the like).

Figure 21:
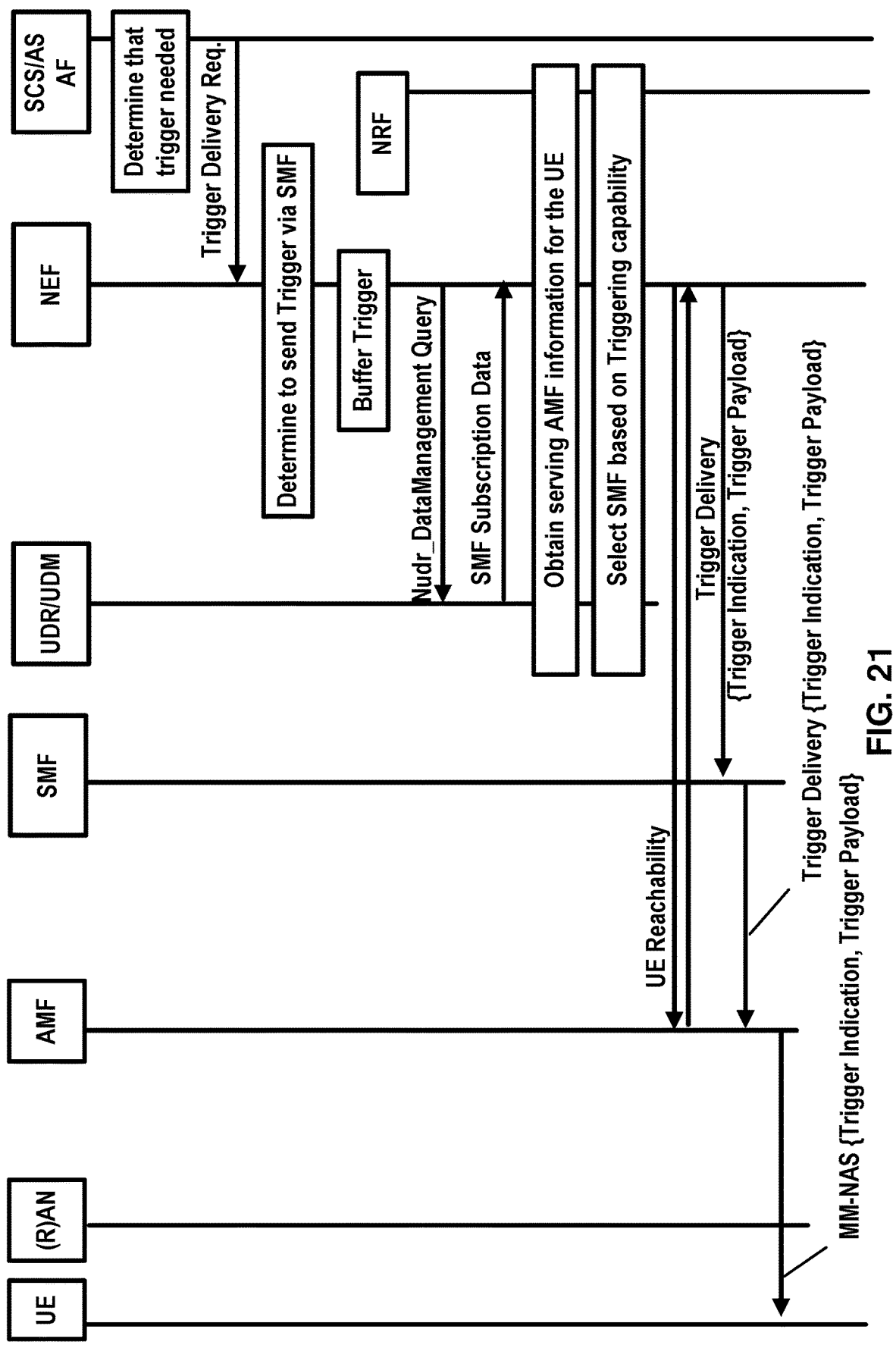
FIG. 21 is an example call flow as per an aspect of an embodiment of the present disclosure.

In an example as depicted in FIG. 21, the SMF may send to the AMF in response to receiving the submit trigger request message, a request over N11 interface (e.g., via an Namf service procedure API, and/or the like). The request (e.g. a trigger request) may comprise the GPSI, the SUPI, AF identifier, the trigger reference number, validity period, priority, the trigger payload, the trigger indication, and/or the like. The AMF may send the trigger request to the UE via a NAS message (e.g., NAS-MM, MM-NAS, and/or the like).

Figure 22:
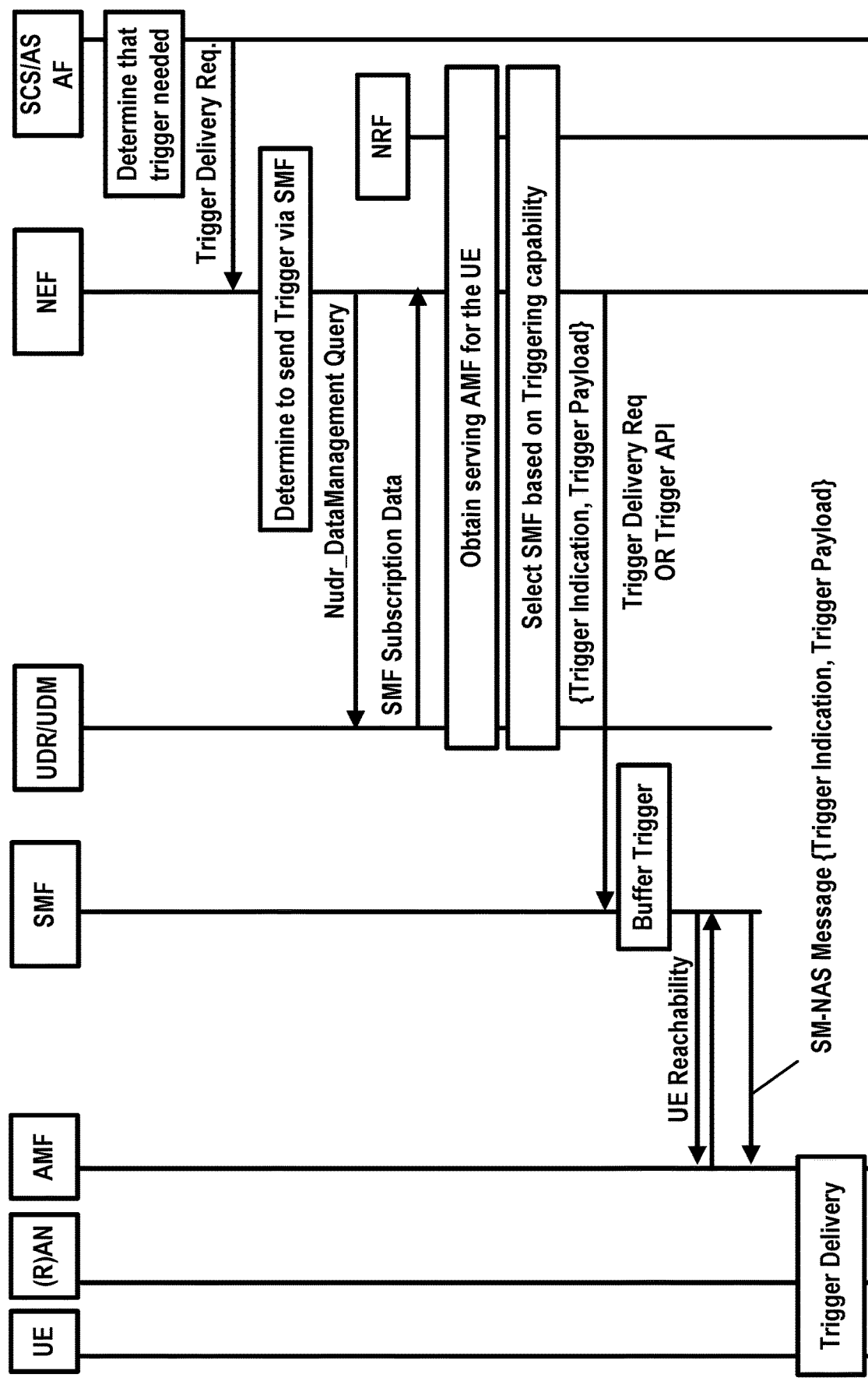
FIG. 22 is an example call flow as per an aspect of an embodiment of the present disclosure.

In an example embodiment, the SMF may provide the routing information that it received from the NEF to the AMF. The SMF may generate necessary charging data record (CDR) information and may include the AF identifier. In an example, AF information, and the trigger indication included in the N11 message may be employed to enable differentiated charging. In an example as depicted in FIG. 22, the SMF may store/buffer/cache the trigger payload.

In an example, if the trigger delivery message fails (either directly or when validity period of the trigger message expires) or when the message delivery succeeds, the SMF may send a message delivery report (e.g., comprising a cause code, trigger reference number, AF identifier, and/or the like) to the NEF. The NEF may send/provide a Nnef_Trigger_DeliveryNotify message to the AF with a delivery report indicating the trigger delivery outcome/result (e.g. succeeded, unknown or failed and the reason for the failure, and/or the like). The NEF may generate necessary CDR information including the GPSI and AF identifier.

Figure 23:
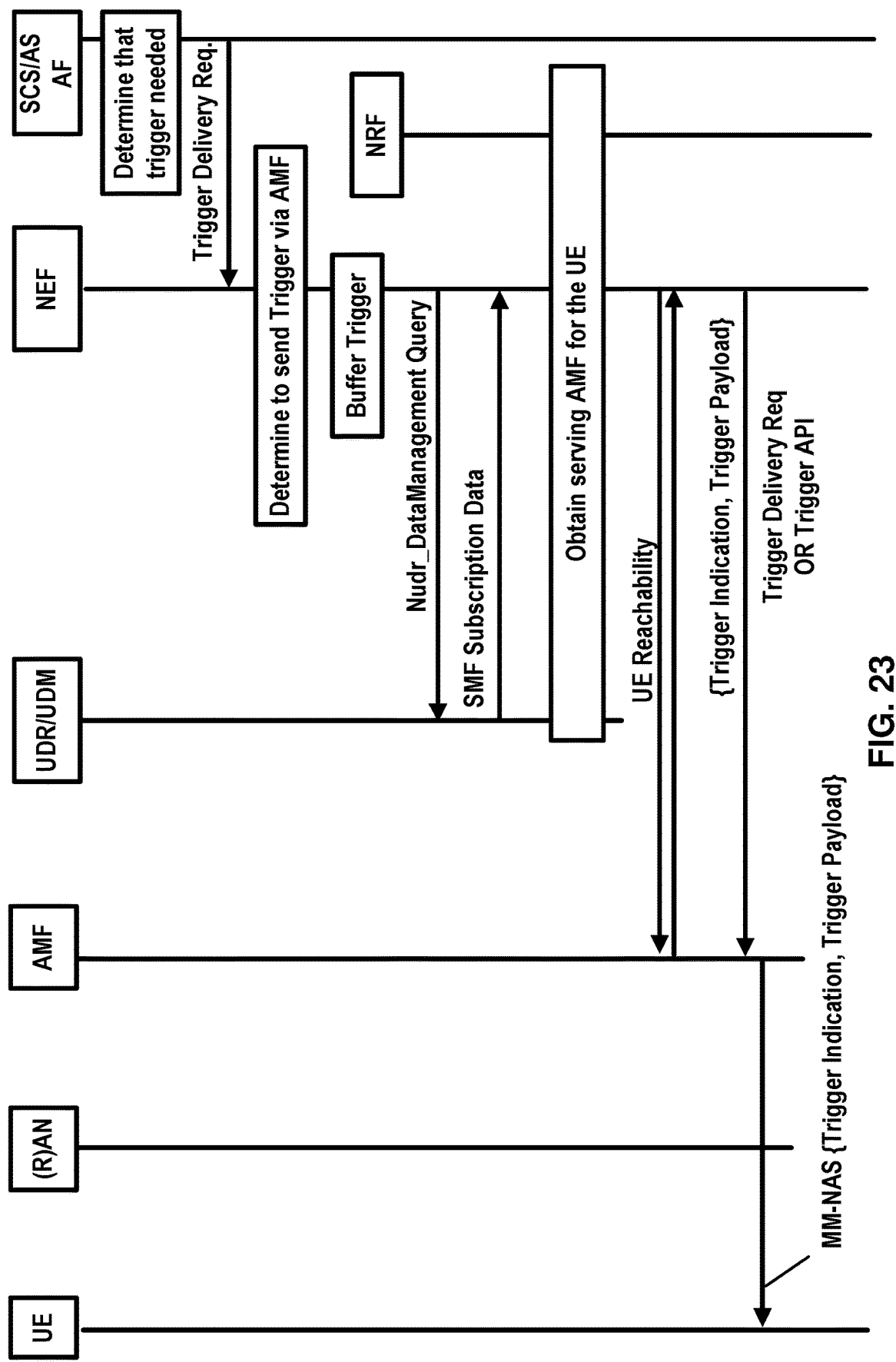
FIG. 23 is an example call flow as per an aspect of an embodiment of the present disclosure.
Figure 24:
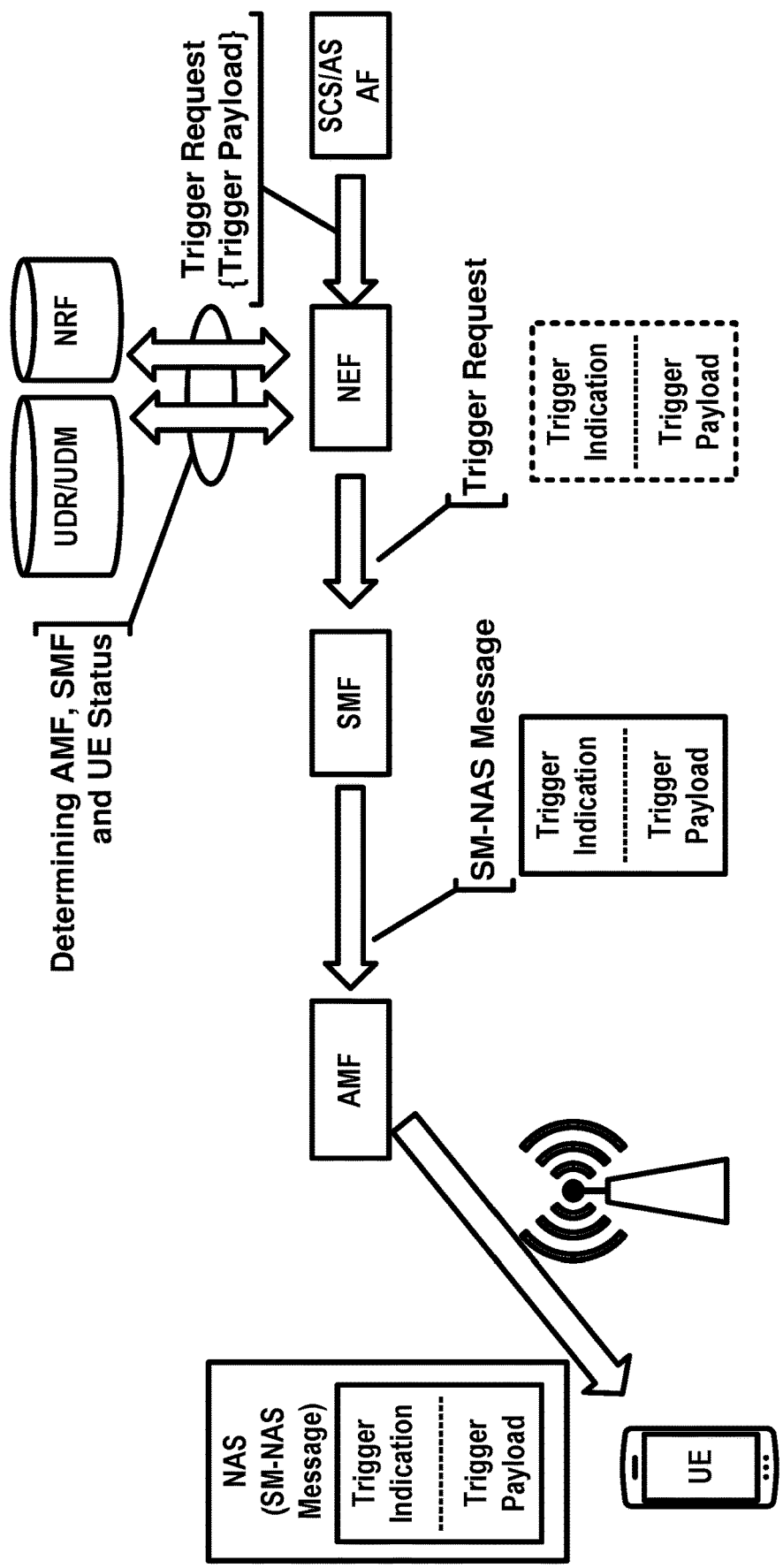
FIG. 24 is an example diagram as per an aspect of an embodiment of the present disclosure.
Figure 25:
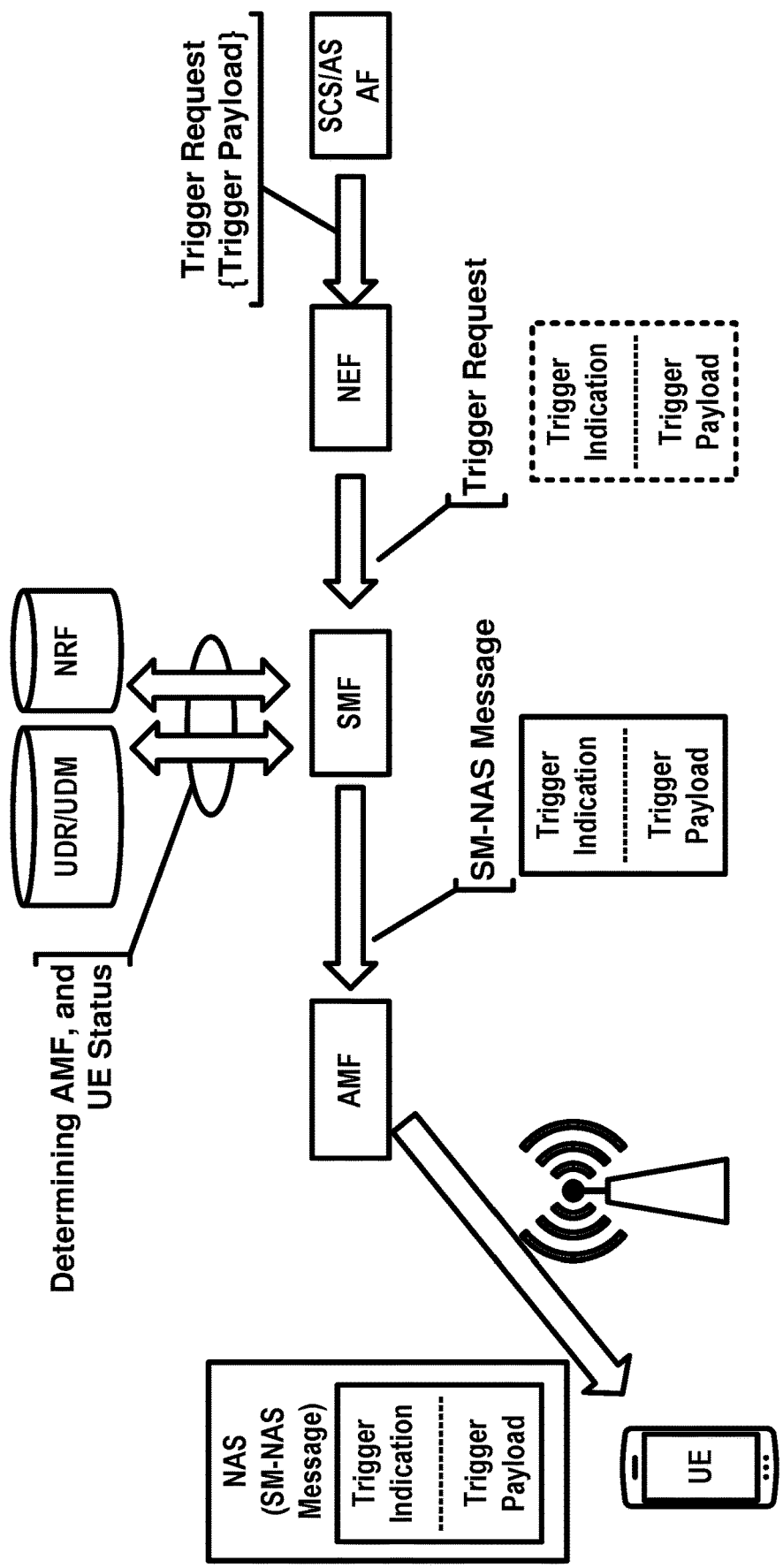
FIG. 25 is an example diagram as per an aspect of an embodiment of the present disclosure.
Figure 26:
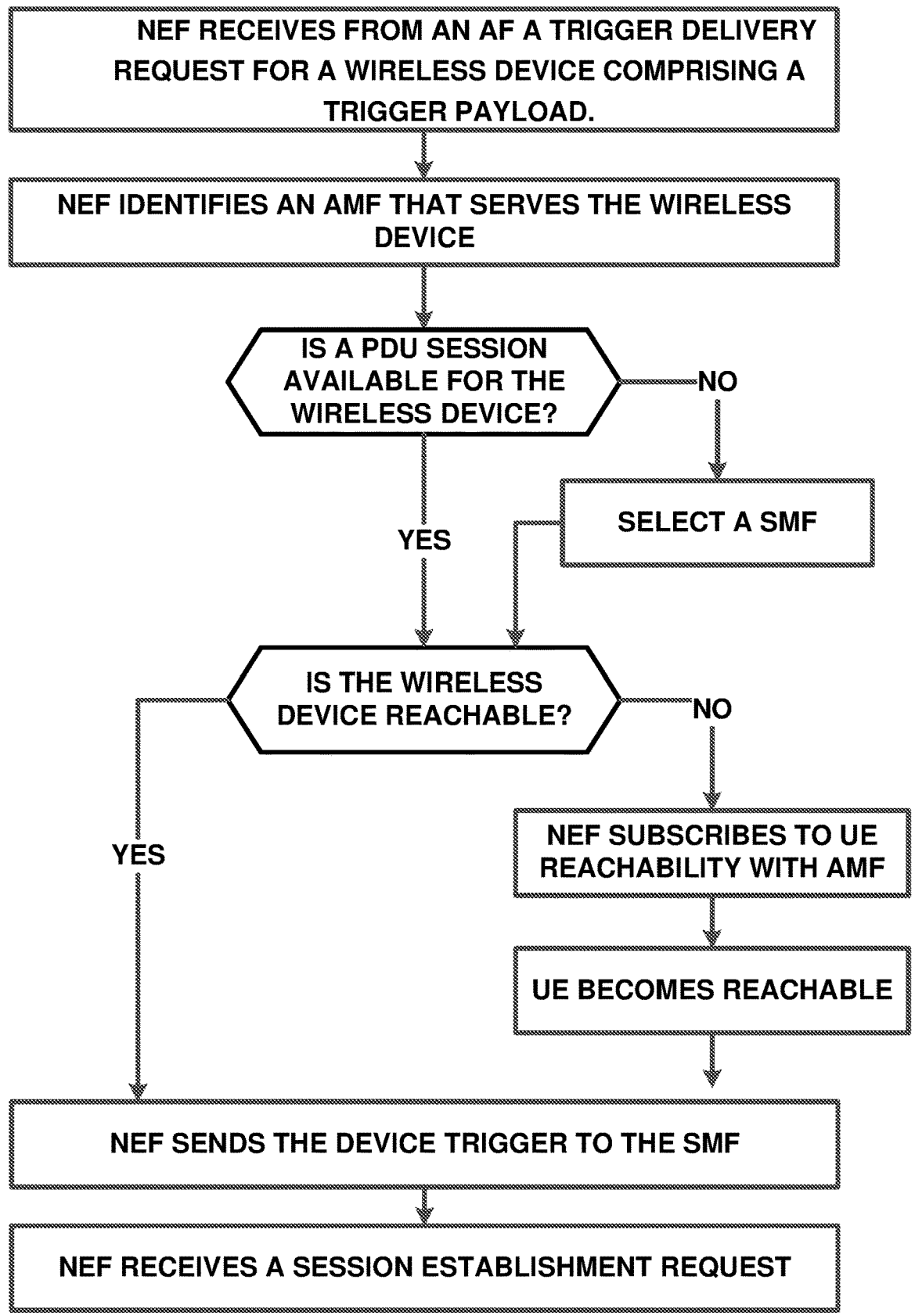
FIG. 26 is an example diagram as per an aspect of an embodiment of the present disclosure.
Figure 27:
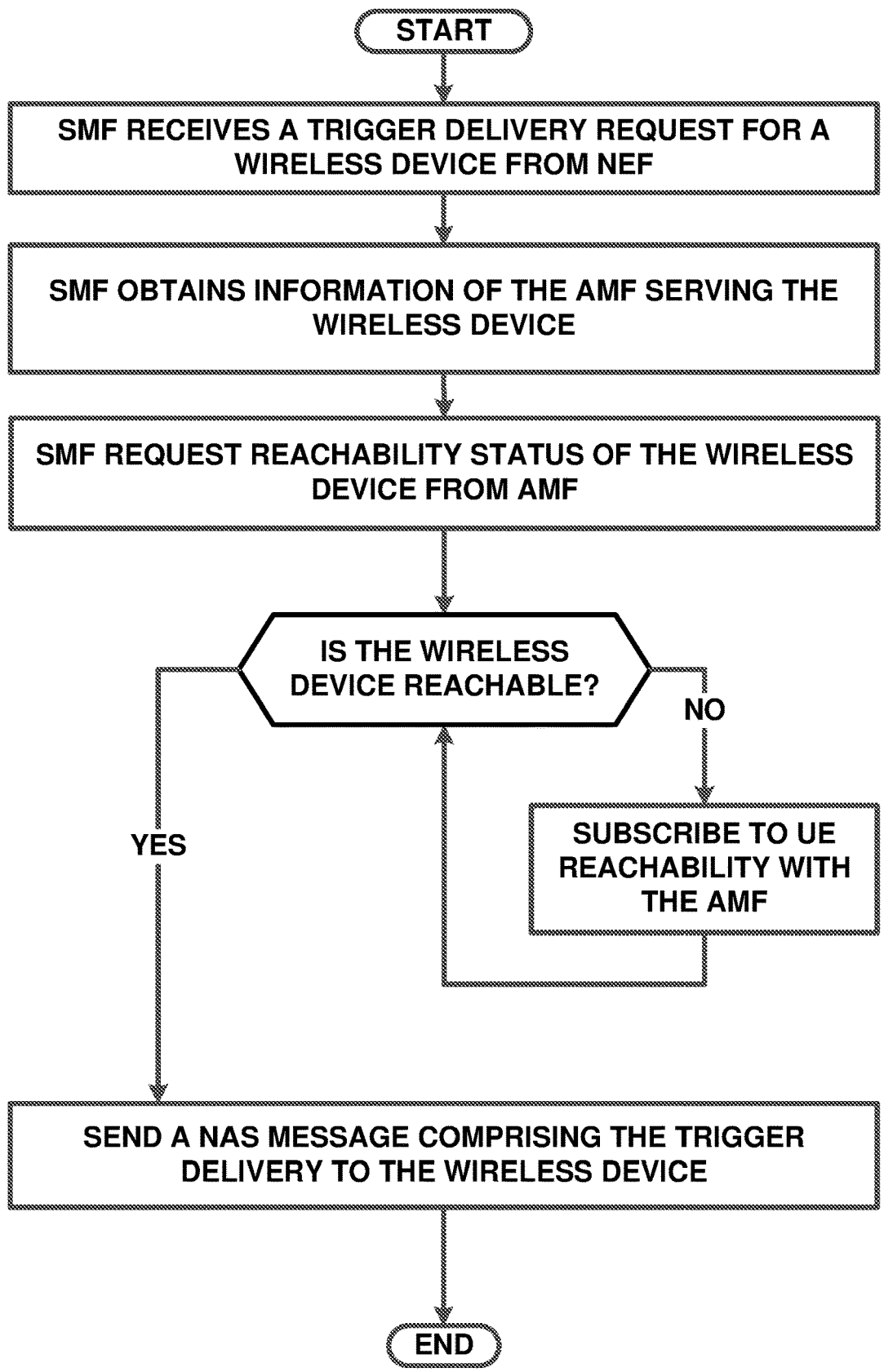
FIG. 27 is an example diagram as per an aspect of an embodiment of the present disclosure.
Figure 28:
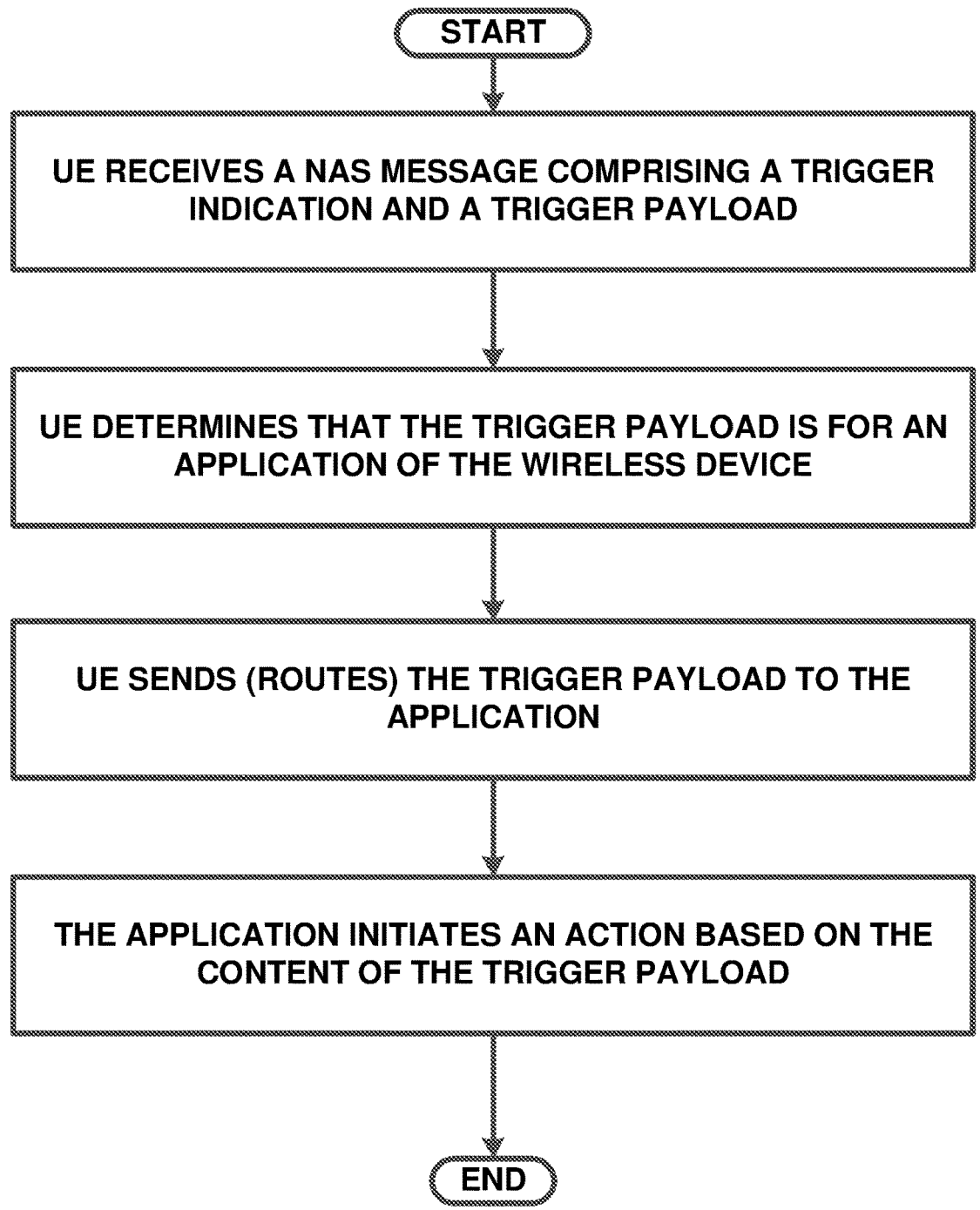
FIG. 28 is an example diagram as per an aspect of an embodiment of the present disclosure.

In an example embodiment as depicted in FIG. 23, the NEF may receive the first request message (the trigger delivery request). In an example, the NEF may obtain the AMF that serves the UE. The NEF may perform UE reachability procedure with the AMF. In response to receiving a notification from the AMF that the UE is reachable, the NEF may send a trigger delivery request comprising one or more elements of the first request message, the trigger indication, the trigger payload, and/or the like to the AMF. The AMF may page the UE. The AMF may send a NAS message comprising the trigger indication, the trigger payload, and/or the like to the UE. The NAS message may be MM-NAS, NAS-MM and/or the like.

In an example, in response to the received device trigger, the UE may take one or more actions and may take into consideration the content of the trigger payload. In an example, the action may comprise initiation of immediate or later communication with the AF, establishment of a PDU session for IP, non-IP, ethernet, unstructured data, sending data packets, and/or the like. In an example, the action may comprise a push notification from a AS, SCS/AS, AF and/or the like.

In an example, the SMF may invoke Namf_MT_EnableUEReachability service operation to the AMF. The AMF may page the UE. In an example, the UE may respond to the paging with the service request procedure. In an example, the SMF may subscribe to the reachability of the UE via the AMF (e.g., Namf_MT_EnableUEReachability, and/or the like).

In an example, if the UE access to the AMF via both 3GPP access and non-3GPP access, the AMF may determine the access type to transfer the NAS message (comprising the trigger) based on operator local policy.

In an example, when the SMF receives the trigger request or the trigger delivery request, the SMF may obtain the AMF information that serves the UE. The SMF may determine via the AMF that the wireless device is not reachable. The SMF may employ the UE reachability procedure (e.g., via the AMF and Namf_MT_EnableUEReachability, and/or the like). In an example, the SMF may send a request to the AMF to subscribe to notifications on the reachability of the UE via Namf_EventExposure_Subscribe service operation provided by the AMF. In an example, the Namf_EventExposure_Subscribe message may comprise: an identifier of the SMF (SMF ID), target of the subscription: identifier of UE(s) (e.g., SUPI or Internal Group Identifier or indication that any UE is targeted, and/or the like), (set of) event ID(s) such as are of interest, access type, location, reachability, and/or the like. In an example, when the AMF receives the Namf_EventExposure_Subscribe service operation from the SMF, (or the UDM indicates that the notification needs to be sent to the SMF), the AMF may initiate the Namf_EventExposure_Notify service operation (SUPI, UE-Reachable) message directly to the SMF.

In an example, the SMF may buffer the trigger. When the UE becomes reachable, the AMF may notify the SMF that the UE is reachable.

In an example embodiment, the SMF may select the AMF based on an identifier of the UE (UE ID), subscriber permanent identifier (SUPI), GPSI, DNAI, S-NSSAI, location information of the UE, subscribed DNN list, default DNN, subscription information of the UE, and/or the like.

In an example, the SMF may select the AMF based on query from a UDR, UDM, NRF, and/or the like. The SMF may query the UDR, UDM, and/or the NRF and may provide one or more identifier of the UE, type of requested service (e.g., device/application triggering service), and/or the like. The UDR/UDM may send to the SMF, UE subscription data, and one or more data sets to assist the SMF to select the AMF and determine the AMF that is serving the UE.

In an example, the SMF may send a query to a UDM to determine the AMF and/or the AMF that serves the UE. In an example, the SMF may invoke a Nudm_UEContextManagement_Get service operation. The service operation may comprise a query such as Nudm_UECM_Get message and/or the like. The query may comprise the UE ID, NF type (e.g., SMF, AMF, and/or the like), and/or the like. In an example, when the NF type is AMF, the query may further comprise an access type. In response to the query, the UDM may provide the SUPI, NF ID (SMF ID, AMF ID, and/or the like) of the NF corresponding to the NF type requested by the SMF.

In an example, the SMF may obtain from a UDR and/or a UDM, parameters for selecting the AMF. In an example, the SMF may invoke a UDR data management service operation. In an example, the UDR data management service operation may comprise a query service operation such as Nudr_DM_Query service. In an example, the SMF may send to the UDR a query message such as Nudr_DM_Query. The query message may comprise a SUPI, DNN, S-NSSAI, and/or the like. In an example, the UDR may provide the SMF in response to the query, AMF selection subscription data, AMF subscription data, UE context in AMF data, slice selection subscription data, session management information, status of a PDU session, an IP address of the UE, DNAI, N6 traffic routing information, and/or the like.

In an example, the SMF may select the AMF by sending a query to a network repository function (NRF). In an example, a Nnrf_NFDiscovery service operation may be employed. The NEF may send a query (e.g., a Nnrf_NF-Discovery_Request) to the NRF. The query may comprise an capability information indicating the trigger service support requirement, one or more target NF service name(s) (e.g., AMF), NF type of the target NF, NF type of the NF service consumer (NEF), S-NSSAI and the associated NSI ID (if available), DNN, target NF/NF service PLMN ID, NRF to be used to select NFs/services within HPLMN, serving PLMN ID, the NF service consumer ID, AMF set, SUPI, data set identifier(s). (UE) IP address or (UE) IPV6 prefix, and/or the like.

In an example, the NRF may send to the SMF a query response. The query response may comprise FQDN of the AMF, IP address(es) or endpoint addresses for the target service name (e.g., AMF), or all the services supported by the AMF, NSI ID associated with the S-NSSAI, and/or the like.

In an example embodiment, the AF, AS, SCS/AS, and/or the like may request the device/application trigger to be delivered to the wireless device. The trigger may be in response to a request by the network to establish a PDU session, establish a NIDD connection between the wireless device and the AF/AS, and/or the like. In an example, when the wireless device receives the trigger request (e.g., a NAS message comprising the trigger indication, the trigger payload, and/or the like), and the application on the wireless device may perform a NIDD session/connection establishment, the wireless device may perform the PDU session establishment procedure.

In an example, the wireless device (UE) may send a PDU session establishment request message as SM payload of a NAS transport message to the AMF. The NAS transport message may comprise a PDU session ID, DNN, S-NSSAI, an indication that the PDU session establishment may be for a NIDD connection, and/or the like. The AMF may determine if the PDU Session uses NAS-SM to transfer PDUs. If the PDU session employ NAS-SM to transfer PDUs, the AMF may select an SMF that supports Data over NAS-SM if available for the requested DNN, and S-NSSAI. The AMF may store the association of the PDU Session ID and the selected SMF ID in the UE context. In an example, the AMF may employ the SMF that sent the device trigger for the UE.

The AMF may invoke Nsmf_PDUSession_CreateSMContext request including DNN, S-NSSAI, PDU Session ID, and/or the like. The SMF may reply with an Nsmf_PDUSession_CreateSMContext Response. The AMF may indicate to the SMF if the PDU session uses NAS-SM to transfer PDUs.

In an example, based on the indication that the PDU session establishment may be for the NIDD connection, the SMF may send a NEF connection request to the NEF.

In an example, the SMF may register with the UDM and may retrieve the session management subscription data for the corresponding SUPI, DNN and S-NSSAI. If the subscription includes an invoke NEF selection indication for the DNN and S-NSSAI indicated by UE, the SMF retrieves the NIDD information such as external group identifier, external identifier or MSISDN, AF ID and may transfer data to the DN via NEF. The SMF may select the NEF based on the UE subscription profile. In an example, the SMF may use the NEF that sent the trigger request.

In an example, the SMF may receive from the UDM the session management subscription data for the corresponding SUPI, DNN and S-NSSAI that is associated with an invoke NIDD API indication, NEF ID and NIDD information such as External Group Identifier, external identifier or MSISDN and AF ID. In an example, the SMF may receive one or more of invoke NIDD API indication, NEF ID and NIDD information such as external group identifier, external identifier or MSISDN, AF ID, and/or the like, via the NAS-SM message.

In an example, based on DNN, S-NSSAI, indication to invoke NIDD API indication, and/or the like, the SMF may create a PDU session towards the NEF. The SMF may send a create NEF connection request (user identity, PDU session ID, NEF ID, NIDD information, S-NSSAI, DNN) message towards the NEF. If an IWK-NEF receives the create NEF connection request message from the SMF, it may forward it toward the NEF.

In an example, the NEF may initiate a NIDD configuration by NEF procedure with the AF.

In an example, the NEF may create an NEF PDU session context for the user identified via user identity and PDU session ID. The NEF may send a create NEF connection response (user identity, PDU session ID, NEF ID, S-NSSAI, DNN) message towards the SMF confirming establishment of the PDU session to the NEF for the UE. If the IWK-NEF receives the Create NEF connection response message from the NEF, it may forward it toward the SMF.

In an example embodiment, the NIDD configuration by NEF procedure may be initiated by the NEF. The NEF may send an NIDD configuration trigger (external group identifier, external identifier or MSISDN, AF ID, NEF ID) message to the AF for asking the NIDD configuration request for the UE identified by external identifier or MSISDN. The AF may send an NIDD configuration request message to the NEF. The NIDD configuration request may comprise an authorization token. The authorization token may be employed for authorizing the AF by the UDM (the authorization token may share between UDM and AF during a SLA). The NEF may send an NIDD authorization request (external group identifier, external identifier or MSISDN, S-NSSAI, DNN, AF ID, authorization token) message to the UDM to authorize the NIDD configuration request for the received external identifier or MSISDN. The UDM may examine the NIDD authorization request message with authorization token. If this check fails, the UDM may provide a result indicating the reason for the failure condition to the NEF. The UDM may send an NIDD authorization response (SUPI and MSISDN or external identifier, result)

message to the NEF to acknowledge acceptance of the NIDD authorization request. The SUPI and, if available, the MSISDN (when NIDD configuration request contains an external identifier) or if available, external identifier(s) (when NIDD configuration request contains an MSISDN) are returned by the UDM in this message. This may enable the NEF to correlate the AF request of this procedure with the PDU session to be established for the subscriber if this procedure takes place during a PDU session establishment procedure. The NEF may send an NIDD configuration response message to the AF to acknowledge acceptance of the NIDD configuration request. If the NIDD configuration was accepted, the NEF may assign a TLTRI to the NIDD configuration and may create an association between the TLTRI, external identifier or MSISDN, SUPI, and PDU session ID which is received from the SMF during the PDU session establishment procedure. In the MT NIDD procedure, the NEF may employ TLTRI and external identifier or MSISDN to determine the SUPI and PDU session ID of PDU session for delivering non-IP data. In the MO NIDD procedure, the NEF may employ the SUPI and PDU session ID to obtain the TLTRI, external identifier or MSISDN.

In an example embodiment, a network exposure function (NEF) may receive from an application function (AF), a first request message for delivery of a trigger to a wireless device. The first request message may comprise a trigger payload. The trigger payload may comprise information for an application on the wireless device to establish a packet data unit (PDU) session. The NEF may select, a session management function (SMF) for transmitting the trigger payload to the wireless device. The NEF may send to the SMF, a second request message for delivery of the trigger to the wireless device. The second request message may comprise a trigger indication identifying the second request message carries the trigger payload, the trigger payload, and/or the like. The NEF may receive from the SMF, a connection request for establishing the PDU session for the application based on the trigger payload.

In an example, the NEF may receive from the SMF, a first confirmation message indicating the delivery of the trigger to the wireless device. In an example, the NEF may send to the AF, a second confirmation message indicating the delivery of the trigger to the wireless device.

In an example, the first request message may further comprise: an indication for the trigger delivery via the SMF, a trigger reference number, an identifier of the application function, a priority indication, a validity period, a generic public subscription identifier (GPSI) of the wireless device, and/or the like.

In an example, the second request message may further comprise: a trigger reference number, an identifier of the application function, a priority indication, a validity period, a generic public subscription identifier (GPSI) of the wireless device, a subscriber permanent identifier (SUPI) of the wireless device, and/or the like.

In an example, the NEF may send to a UDM, a request for a subscriber permanent identifier (SUPI) of the wireless device. The request may comprise a GPSI of the wireless device. The NEF may receive from the UDM, the SUPI of the wireless device.

In an example, the NEF may send to a network repository function (NRF), a network function discovery request for the SMF comprising: the SUPI of the wireless device, the trigger indication, and/or the like. The NEF may receive from the NRF, an identifier of the SMF that supports trigger functionality and may serve the wireless device.

The NEF may buffer a trigger information. The NEF may determine whether the wireless device is reachable. In an example, the determining may comprise sending by the NEF to a unified data repository (UDR), a query to determine a reachability status of the wireless device. In an example, the determining may comprise sending by the NEF to a unified data management (UDM), a query to determine a reachability status of the wireless device.

In an example, the NEF may from the SMF a session establishment request for the wireless device.

In an example, the trigger indication may comprise an information element to differentiate a mobile terminating message comprising triggering information. The information element may indicate to the wireless device to establish a PDU session. In an example, the trigger payload may comprise information for the application on the wireless device to perform an action.

In an example, the trigger payload may comprise an identifier of an application on the wireless device.

In an example, the NEF may determine/obtain an identifier of an access and mobility management function (AMF) for the wireless device. The NEF may determine whether the wireless device is reachable.

In an example embodiment, a session management function (SMF) may receive from a network exposure function (NEF), a request message for a delivery of a trigger to a wireless device. The request message may comprise: a trigger payload comprising information for an application on the wireless device to establish a packet data unit (PDU) session, a trigger indication identifying the request message carries the trigger payload, an identifier of the wireless device, and/or the like. The SMF may send to an access and mobility management function (AMF), a reachability request message to request whether the wireless device identified by the identifier is reachable. In an example, the SMF may receive from the AMF, a response message indicating that the wireless device is reachable. The SMF may send to the wireless device via an access and mobility management function (AMF), a non-access stratum message comprising: the trigger indication, the trigger payload, and/or the like. The SMF may receive from the wireless device via the AMF, a session establishment request for establishing the PDU session for the application based on the trigger payload. The SMF may to the NEF, a connection request for establishing the PDU session for the application.

In an example, the request message may further comprise a trigger reference number, an identifier of the application function, a priority indication, a validity period, a generic public subscription identifier (GPSI) of the wireless device, a subscriber permanent identifier (SUPI) of the wireless device, and/or the like.

In an example, the NEF may send to a UDM, a request for determining a SUPI of the wireless device. The request may comprise a GPSI of the wireless device, an identifier of an AF, and/or the like. The NEF may receive from the UDM, the SUPI of the wireless device. The NEF may sending to a network repository function (NRF), a network function discovery request for the SMF. The NEF may receive from the NRF, an identifier of the SMF.

The NEF may receive from an application function (AF), a request for delivery of a trigger to a wireless device. The request for delivery may comprise an indication for the trigger delivery via the SMF, a trigger reference number, an identifier of the application function, a priority indication, a validity period, a generic public subscription identifier (GPSI) of the wireless device, and/or the like.

In an example, the NEF may send to the AF, a trigger delivery report. The SMF may receive from the wireless device, a confirmation message indicating the delivery of the trigger to the wireless device.

In an example, the SMF may send to the access and mobility management function (AMF), a reachability status request for the wireless device comprising the identifier of the wireless device. The SMF may receive from the AMF a reachability status notification for the wireless device.

In an example, the SMF may send to a unified data management UDM, a reachability status request for the wireless device comprising the identifier of the wireless device. The SMF may receive from the UDM a reachability status notification for the wireless device.

In an example, the SMF may select a user plane function (UPF) for the session. The SMF may send to the user plane function (UPF), a session establishment request. The SMF may receive from the UPF, a session establishment response message.

In an example, the non-access stratum message is a session management non-access stratum (SM-NAS, NAS-SM, and/or the like) message.

In an example, the AMF may send to the wireless device a paging message.

In an example, the NEF, may determine an identifier of an access and mobility management function (AMF) for the wireless device.

In an example, the trigger payload may comprise information for the application on the wireless device to perform an action. The trigger payload may comprise an identifier of an application on the wireless device.

In an example, the SMF may buffer a trigger information.

In an example, the SMF may send to the NEF a trigger delivery report.

In an example, the SMF may select the AMF. The SMF may send to a network repository function (NRF), a network function discovery request for the AMF comprising a SUPI of the wireless device. The SMF may receive from the NRF, an identifier of the AMF for the wireless device.

In an example embodiment, a wireless device may receive from a session management function (SMF) via an access and mobility management function, a non-access stratum message comprising: a trigger indication, a trigger payload, and/or the like. The wireless device may determine based on the trigger indication, that the trigger payload is for an application of the wireless device. The wireless device may send to the SMF via the AMF, a delivery report message indicating a result of a trigger delivery. The wireless device may send to the SMF via the AMF, a session establishment request message for the application.

Existing technologies employ special servers such as SMS functions (node/server), application servers (e.g. dedicated or third party servers), MMS (multimedia messaging systems) servers, and/or application triggering servers for application triggering procedures to send triggering messages to wireless devices. For example, an NEF sends a triggering messages to an SMS function. An SMS function sends the triggering messages to instruct the wireless device to perform actions, such as PDU session establishment, service request or the like. The wireless device receives triggering messages from the SMS function. Implementation of existing technologies using SMS functions, special servers such as SMS functions (node/server), application servers (e.g. dedicated or third party servers), MMS (multimedia messaging systems) servers, and/or application triggering servers for application triggering procedures reduces reliability and increase signaling and network complexity. For example, using SMS to deliver the trigger messages may be unreliable due to priority handling by the network. The SMS delivery may incur delays or may not be delivered. This unreliable aspect of SMS may cause problems for real time applications (e.g., IoT applications), delay sensitive trigger notifications, and time sensitive communications (e.g., time sensitive networks, audio video bridge). Some wireless devices do not support SMS functionality. This limitation may be based on a wireless device capability or user subscription. This limitation may be based on the network support of SMS. The NEF may need to discover SMS function(s) within the network. In existing technology technologies, if the network does not deploy and/or support SMS functionality, the application triggering procedure may fail.

Example embodiments implement new call flows and message formats to implement application triggering procedures without involving the special servers. Example embodiments implements triggering call flow and messages using 3GPP network nodes such NEF, SMF, and/or AMF and NAS messages such SM-NAS messages. An application function submits trigger messages via a network exposure function (NEF). Based on a local configuration, the NEF may employ the SMF for the trigger. The NEF may employ a session management function (SMF) to deliver the trigger messages. The SMF may employ SM-NAS messages to deliver the triggering messages. Enhanced procedures and message formats are introduced to enable applicating triggering procedures using 3GPP network nodes. According to an embodiment, the NEF may determine a SMF node that serves the wireless device to deliver the trigger message via SM-NAS message. This allows delivery of the trigger message even when SMS functionality (or other special servers) is not available. Example embodiments enable the wireless device to receive the trigger message via a session management NAS message that does not require SMS support. For example, this allows trigger messages to be sent to any wireless device regardless of whether that wireless device can receive SMS. The SMF may determine a reachability status of wireless device. The trigger messages may include a trigger payload that comprises a set of actions for the wireless device (or an application on the wireless device). Example embodiments may employ control plane sessions for delivery of the trigger messages. This increases network resource utilization efficiency by reducing unnecessary signaling procedures. Example embodiments yield to simplified network operation and architecture. Example embodiments improve reliability of trigger payload delivery.

FIG. 29 is a flow diagram as per an aspect of an example embodiment. At 2910, a session management function (SMF) may receive from a network exposure function (NEF), a request message for a delivery of a trigger to a wireless device. The request message may comprise a trigger payload comprising information for an application on the wireless device, and a trigger indication identifying that the request message carries the trigger payload. At 2920, the SMF may send to the wireless device, a non-access stratum (NAS) message comprising the trigger indication, and the trigger payload.

FIG. 30 is a flow diagram as per an aspect of an embodiment. At 3010, a network exposure function (NEF) may receive from an application function (AF), a first request message for delivery of a trigger payload comprising information for an application on a wireless device to establish a packet data unit (PDU) session. At 3020, the NEF may send to a session management function (SMF), a second request message for delivery of the trigger payload to the wireless device. The second request message may comprise a trigger indication identifying the second request message carrying the trigger payload, and the trigger payload.

Figure 31:
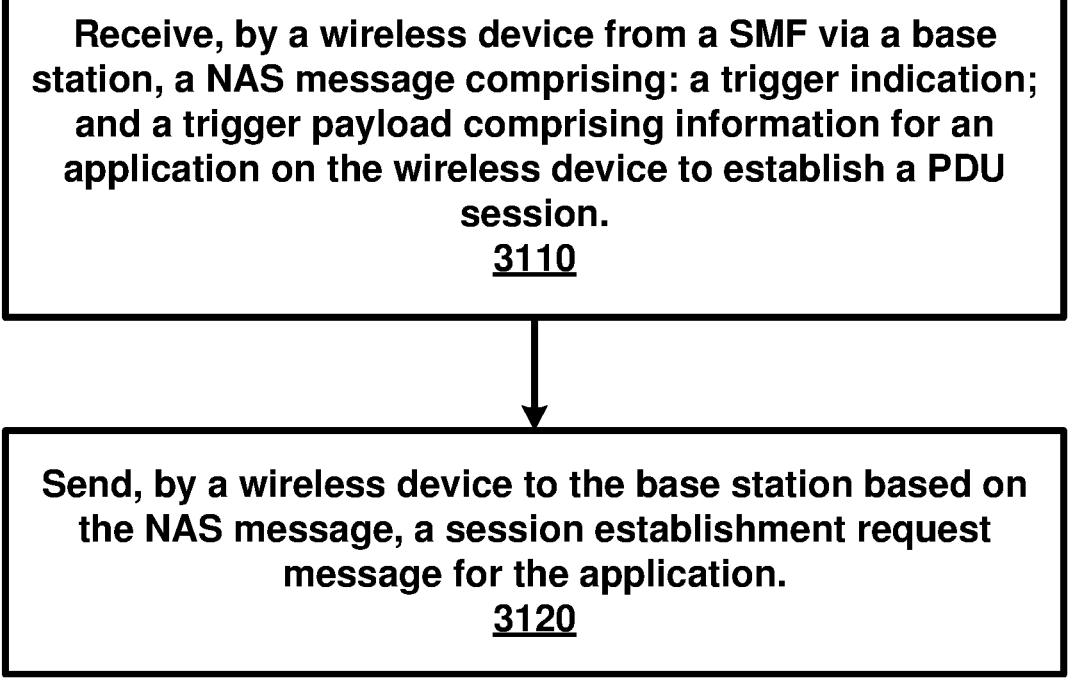
FIG. 31 is a flow diagram of an aspect of an example embodiment of the present disclosure.

FIG. 31 is a flow diagram as per an aspect of an embodiment. At 3110, a wireless device may receive from a session management function (SMF) via a base station, a non-access stratum (NAS) message. The NAs message may comprise a trigger indication, a trigger payload comprising information for an application on the wireless device to establish a packet data unit (PDU) session. At 3120, the wireless device may send to the base station based on the NAS message, a session establishment request message for the application.

In this specification, a and an and similar phrases are to be interpreted as at least one and one or more. In this specification, the term may is to be interpreted as may, for example. In other words, the term may is indicative that the phrase following the term may is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e. hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often employed in combination to achieve the result of a functional module.

Example embodiments of the invention may be implemented using various physical and/or virtual network elements, software defined networking, virtual network functions.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using 5G AN. However, one skilled in the art will recognize that embodiments of the invention may also be implemented in a system comprising one or more legacy systems or LTE. The disclosed methods and systems may be implemented in wireless or wireline systems. The features of various embodiments presented in this invention may be combined. One or many features (method or system) of one embodiment may be implemented in other embodiments. A limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes. The disclosed architecture is sufficiently flexible and configurable, such that it may be utilized in ways other than that shown. For example, the actions listed in any flowchart may be re-ordered or optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language means for or step for be interpreted under 35 U.S.C. 112. Claims that do not expressly include the phrase means for or step for are not to be interpreted under 35 U.S.C. 112.

What is claimed is:
1. A method comprising:
  receiving, by a session management function (SMF) from a network exposure function (NEF), a request message for delivering a trigger to a wireless device, the request message comprising:
    a trigger payload comprising information, for an application on the wireless device, indicating a request to establish a packet data unit (PDU) session; and
    a trigger indication identifying that the request message carries the trigger payload;

sending, by the SMF to the wireless device via an access and mobility management function (AMF), a non-access stratum (NAS) message comprising:
the trigger indication; and
the trigger payload; and
receiving, by the SMF from the wireless device via the AMF and based on the trigger payload, a session establishment request to establish the PDU session for the application.

2. The method of claim 1, further comprising:
sending, by the SMF to the NEF and based on the received request, a connection request to establish the PDU session for the application.

3. The method of claim 1, wherein the request message comprises an identifier of the wireless device.

4. The method of claim 1, further comprising:
receiving, by the SMF from the wireless device, a confirmation message indicating a delivery of the trigger to the wireless device.

5. The method of claim 1, further comprising:
sending, by the SMF to the AMF, a reachability request message to request whether the wireless device identified by an identifier is reachable; and
receiving, by the SMF from the AMF, a response message indicating that the wireless device having the identifier is reachable.

6. The method of claim 1, further comprising:
sending, by the SMF to a unified data management (UDM), a reachability request message to request whether the wireless device identified by an identifier is reachable; and
receiving, by the SMF from the UDM, a response message indicating that the wireless device having the identifier is reachable.

7. The method of claim 1, further comprising:
selecting, by the SMF, a user plane function (UPF) for a session;
sending, by the SMF to the UPF, the session establishment request; and
receiving, by the SMF from the UPF, a session establishment response message.

8. The method of claim 1, wherein the NAS message comprises a session management non-access stratum (SM-NAS) message.

9. The method of claim 1, wherein the information comprises an identifier of the application on the wireless device.

10. A session management function (SMF) comprising:
one or more processors; and
memory storing instructions that, when executed by the one or more processors, cause the session management function to:
receive, from a network exposure function (NEF), a request message for delivering a trigger to a wireless device, the request message comprising:
a trigger payload comprising information, for an application on the wireless device, indicating a request to establish a packet data unit (PDU) session; and
a trigger indication identifying that the request message carries the trigger payload;
send, to the wireless device via an access and mobility management function (AMF), a non-access stratum (NAS) message comprising:
the trigger indication; and
the trigger payload; and
receive, from the wireless device via the AMF and based on the trigger payload, a session establishment request to establish PDU session for the application.

11. The SMF of claim 10, wherein the instructions further cause the SMF to:
send, to the NEF and based on the received request, a connection request to establish the PDU session for the application.

12. The SMF of claim 10, wherein the request message comprises an identifier of the wireless device.

13. The SMF of claim 10, wherein the instructions further cause the SMF to:
receive, from the wireless device, a confirmation message indicating a delivery of the trigger to the wireless device.

14. The SMF of claim 10, wherein the instructions further cause the SMF to:
send, to the AMF, a reachability request message to request whether the wireless device identified by an identifier is reachable; and
receive, from the AMF, a response message indicating that the wireless device having the identifier is reachable.

15. The SMF of claim 10, wherein the instructions further cause the SMF to:
send, to a unified data management (UDM), a reachability request message to request whether the wireless device identified by an identifier is reachable; and
receive, from the UDM, a response message indicating that the wireless device having the identifier is reachable.

16. The SMF of claim 10, wherein the instructions further cause the SMF to:
select a user plane function (UPF) for a session;
send the session establishment request to the UPF; and
receive a session establishment response message from the UPF.

17. The SMF of claim 10, wherein the NAS message comprises a session management non-access stratum (SM-NAS) message.

18. A system comprising:
a session management function (SMF) comprising: one or more first processors and first memory storing instructions that, when executed by the first one or more processors, cause the SMF to:
receive, from a network exposure function (NEF), a request message for delivering a trigger to a wireless device, the request message comprising:
a trigger payload comprising information, for an application on the wireless device, indicating a request to establish a packet data unit (PDU) session; and
a trigger indication identifying that the request message carries the trigger payload;
send, to the wireless device via an access and mobility management function (AMF), a non-access stratum (NAS) message comprising:
the trigger indication; and
the trigger payload; and
receive, from the wireless device via the AMF and based on the trigger payload, a session establishment request to establish the PDU session for the application; and
the AMF, wherein the AMF comprises: one or more second processors and second memory storing instructions that, when executed by the one or more second processors, cause the AMF to:

send, to the wireless device, the NAS message received from the SMF; and send, to the SMF, the session establishment request received from the wireless device.

* * * * *